US012614234B2

(12) United States Patent
Fields et al.

(10) Patent No.: US 12,614,234 B2
(45) Date of Patent: Apr. 28, 2026

(54) GROUND TRUTH INSURANCE DATABASE

(71) Applicant: STATE FARM MUTUAL AUTOMOBILE INSURANCE COMPANY, Bloomington, IL (US)

(72) Inventors: Brian Mark Fields, Phoenix, AZ (US); Nathan L. Tofte, Downs, IL (US); Joseph Robert Brannan, Bloomington, IL (US); Vicki King, Bloomington, IL (US); Justin Davis, Bloomington, IL (US)

(73) Assignee: STATE FARM MUTUAL AUTOMOBILE INSURANCE, Bloomington, IL (US)

( * ) Notice: Subject to any disclaimer, the term of this patent is extended or adjusted under 35 U.S.C. 154(b) by 53 days.

(21) Appl. No.: 18/204,625

(22) Filed: Jun. 1, 2023

(65) Prior Publication Data

US 2024/0281890 A1 Aug. 22, 2024

Related U.S. Application Data

(60) Provisional application No. 63/455,154, filed on Mar. 28, 2023, provisional application No. 63/453,285, (Continued)

(51) Int. Cl.
G06Q 40/08 (2012.01)
G06F 40/40 (2020.01)
(Continued)

(52) U.S. Cl.
CPC ............. *G06Q 40/08* (2013.01); *H04L 51/02* (2013.01); *G06F 40/40* (2020.01); *G06Q 50/26* (2013.01)

(58) Field of Classification Search
CPC ...... G06Q 40/08; G06Q 50/26; G06F 40/284; G06F 40/40; H04L 51/02
See application file for complete search history.

(56) References Cited

U.S. PATENT DOCUMENTS 7,698,342 B1 4/2010 Evans et al.
8,095,393 B2 1/2012 Seifert et al.
(Continued)

FOREIGN PATENT DOCUMENTS

CA 3227939 A1 2/2023
CN 112164391 A 1/2021
(Continued)

OTHER PUBLICATIONS

Anonymous, Roots Automation Introduces InsurGPT - the World's Most Advanced Generative AI Model for Insurance. Retrieved from the Internet at: https://ffnews.com/newsarticle/roots-automation-introduces-insurgpt-the-worlds-most-advanced-generative-ai-model-for-insurance/ (published May 15, 2023).
(Continued)

*Primary Examiner* — Raven E Yono
(74) *Attorney, Agent, or Firm* — MARSHALL, GERSTEIN & BORUN LLP; William J. Samore

(57) ABSTRACT

The following relates generally to building a ground truth insurance database. In some embodiments, one or more processors: (1) receive potential insurance database information comprising (i) insurance company application (app) information, (ii) anonymized insurance claim information, (iii) police report information, and/or (iv) auxiliary information; (2) retrieve, from an insurance ground truth insurance database, existing ground truth insurance information by querying the ground truth database based upon the potential insurance database information; (3) determine if the potential insurance database information should be added to the insurance ground truth database by comparing
(Continued)

1700 the potential insurance database information to the existing ground truth insurance information; and/or (4) if the potential insurance database information should be added to the insurance ground truth database, add the potential insurance database information to the insurance ground truth database.

23 Claims, 18 Drawing Sheets

Related U.S. Application Data filed on Mar. 20, 2023, provisional application No. 63/452,035, filed on Mar. 14, 2023, provisional application No. 63/450,837, filed on Mar. 8, 2023, provisional application No. 63/447,757, filed on Feb. 23, 2023, provisional application No. 63/447,745, filed on Feb. 23, 2023, provisional application No. 63/447,391, filed on Feb. 22, 2023, provisional application No. 63/446,952, filed on Feb. 20, 2023, provisional application No. 63/446,941, filed on Feb. 20, 2023.

(51) Int. Cl.
*G06Q 50/26* (2024.01)
*H04L 51/02* (2022.01)

(56) References Cited

U.S. PATENT DOCUMENTS

| | | | |
|---|---|---|---|
| 8,346,563 B1 | 1/2013 | Hjelm et al. | |
| 9,830,748 B2 | 11/2017 | Rosenbaum | |
| 9,990,782 B2 | 6/2018 | Rosenbaum | |
| 10,043,217 B1 | 8/2018 | Bolden et al. | |
| 10,055,793 B1 | 8/2018 | Call et al. | |
| 10,181,159 B1 | 1/2019 | Allen et al. | |
| 10,217,068 B1 | 2/2019 | Davis et al. | |
| 10,229,394 B1 | 3/2019 | Davis et al. | |
| 10,269,190 B2 | 4/2019 | Rosenbaum | |
| 10,387,966 B1 | 8/2019 | Shah et al. | |
| 10,467,824 B2 | 11/2019 | Rosenbaum | |
| 10,482,554 B1 | 11/2019 | Vukich et al. | |
| 10,497,250 B1 | 12/2019 | Hayward et al. | |
| 10,535,104 B1 | 1/2020 | Mitchell et al. | |
| 10,579,971 B1 | 3/2020 | Davis et al. | |
| 10,635,751 B1 | 4/2020 | Relangi et al. | |
| 10,679,296 B1 | 6/2020 | Devereaux et al. | |
| 10,769,953 B1 | 9/2020 | Salles et al. | |
| 11,038,821 B1 | 6/2021 | Harding et al. | |
| 11,087,404 B1 | 8/2021 | Devereaux et al. | |
| 11,127,081 B1 | 9/2021 | Kullman et al. | |
| 11,227,452 B2 | 1/2022 | Rosenbaum | |
| 11,238,506 B1 | 2/2022 | Tomlinson et al. | |
| 11,250,515 B1 | 2/2022 | Feiteira et al. | |
| 11,407,410 B2 | 8/2022 | Rosenbaum | |
| 11,438,283 B1 | 9/2022 | White et al. | |
| 11,518,391 B1* | 12/2022 | Sanchez ............... G06N 20/00 | |
| 11,524,707 B2 | 12/2022 | Rosenbaum | |
| 11,544,807 B1 | 1/2023 | Breitweiser et al. | |
| 11,594,083 B1 | 2/2023 | Rosenbaum | |
| 11,669,907 B1 | 6/2023 | Behrens et al. | |
| 11,693,726 B2 | 7/2023 | Lozano et al. | |
| 11,720,903 B1 | 8/2023 | Henryson et al. | |
| 11,757,807 B2 | 9/2023 | Bhardwaj et al. | |
| 11,783,421 B2 | 10/2023 | Huls | |
| 11,790,296 B1 | 10/2023 | Henryson et al. | |
| 11,818,111 B1 | 11/2023 | Debolt | |
| 11,836,805 B1 | 12/2023 | Culbertson et al. | |
| 11,837,004 B1 | 12/2023 | Agrahari et al. | |
| 11,922,515 B1 | 3/2024 | Lombard et al. | |
| 12,087,152 B1 | 9/2024 | Buentello et al. | |
| 12,217,606 B1 | 2/2025 | Cheng et al. | |
| 12,236,377 B2 | 2/2025 | Sohum et al. | |
| 12,248,993 B2 | 3/2025 | Brannan et al. | |
| 2001/0027403 A1 | 10/2001 | Peterson et al. | |
| 2001/0037265 A1 | 11/2001 | Kleinberg | |
| 2002/0002475 A1 | 1/2002 | Freedman et al. | |
| 2002/0112011 A1 | 8/2002 | Washington | |
| 2003/0028448 A1 | 2/2003 | Joseph et al. | |
| 2006/0212566 A1 | 9/2006 | Boujard et al. | |
| 2008/0056473 A1 | 3/2008 | Kent et al. | |
| 2009/0125320 A1 | 5/2009 | Bickett | |
| 2009/0240531 A1 | 9/2009 | Hilborn | |
| 2009/0287509 A1 | 11/2009 | Basak et al. | |
| 2010/0145734 A1 | 6/2010 | Becerra et al. | |
| 2011/0119574 A1* | 5/2011 | Rogers ................... G06F 40/18 | |
| | | | 715/239 |
| 2011/0295623 A1 | 12/2011 | Behringer et al. | |
| 2011/0313794 A1 | 12/2011 | Feeney | |
| 2012/0101852 A1 | 4/2012 | Albert | |
| 2012/0124485 A1 | 5/2012 | Scherpa et al. | |
| 2012/0143634 A1 | 6/2012 | Beyda et al. | |
| 2012/0303390 A1 | 11/2012 | Brook et al. | |
| 2013/0204619 A1 | 8/2013 | Berman et al. | |
| 2013/0218603 A1 | 8/2013 | Hagelstein et al. | |
| 2013/0226624 A1 | 8/2013 | Blessman et al. | |
| 2014/0094991 A1* | 4/2014 | Bouillet ........... G06Q 10/08355 | |
| | | | 701/1 |
| 2014/0100892 A1 | 4/2014 | Collopy et al. | |
| 2014/0222469 A1 | 8/2014 | Stahl et al. | |
| 2014/0358731 A1 | 12/2014 | Itte et al. | |
| 2014/0379385 A1 | 12/2014 | Duncan et al. | |
| 2015/0170288 A1 | 6/2015 | Harton et al. | |
| 2015/0213556 A1 | 7/2015 | Haller, Jr. | |
| 2015/0338235 A1 | 11/2015 | Schmidt et al. | |
| 2015/0339759 A1 | 11/2015 | Pope et al. | |
| 2016/0041069 A1 | 2/2016 | Huang et al. | |
| 2016/0071217 A1 | 3/2016 | Edwards et al. | |
| 2016/0086231 A1 | 3/2016 | Darey | |
| 2016/0238397 A1 | 8/2016 | Caira et al. | |
| 2016/0273181 A1 | 9/2016 | Smith | |
| 2017/0004508 A1 | 1/2017 | Mansfield et al. | |
| 2017/0060694 A1 | 3/2017 | Makhov et al. | |
| 2017/0103346 A1 | 4/2017 | Bodell et al. | |
| 2017/0132643 A1* | 5/2017 | Sagade ............. G06Q 30/0201 | |
| 2017/0132666 A1 | 5/2017 | Slavin | |
| 2017/0191848 A1 | 7/2017 | Jones | |
| 2018/0047288 A1 | 2/2018 | Cordell et al. | |
| 2018/0075538 A1 | 3/2018 | Konrardy et al. | |
| 2018/0082683 A1 | 3/2018 | Chen et al. | |
| 2018/0173999 A1 | 6/2018 | Renard | |
| 2018/0293483 A1 | 10/2018 | Abramson et al. | |
| 2018/0293660 A1 | 10/2018 | Rakshe et al. | |
| 2018/0334176 A1 | 11/2018 | Park | |
| 2019/0037077 A1 | 1/2019 | Konig et al. | |
| 2019/0095822 A1 | 3/2019 | Rugel et al. | |
| 2019/0114715 A1 | 4/2019 | Hessinger et al. | |
| 2019/0122121 A1 | 4/2019 | Yu | |
| 2019/0306327 A1 | 10/2019 | Matysiak et al. | |
| 2019/0332661 A1* | 10/2019 | Halprin Limor ...... G06Q 40/08 | |
| 2019/0391827 A1 | 12/2019 | Simanovich et al. | |
| 2020/0019893 A1 | 1/2020 | Lu | |
| 2020/0042649 A1 | 2/2020 | Bakis et al. | |
| 2020/0104876 A1 | 4/2020 | Chintakindi et al. | |
| 2020/0143481 A1 | 5/2020 | Brown et al. | |
| 2020/0154170 A1 | 5/2020 | Wu et al. | |
| 2020/0167134 A1 | 5/2020 | Dey et al. | |
| 2020/0210490 A1 | 7/2020 | Hutchins | |
| 2020/0274962 A1 | 8/2020 | Martin et al. | |
| 2020/0285225 A1 | 9/2020 | Lankehanumaiah et al. | |
| 2020/0339160 A1 | 10/2020 | Rosenbaum | |
| 2021/0064932 A1* | 3/2021 | Wang ................. G06F 16/3329 | |
| 2021/0073330 A1 | 3/2021 | Inagaki et al. | |
| 2021/0117923 A1 | 4/2021 | Gray et al. | |
| 2021/0152496 A1 | 5/2021 | Kim et al. | |
| 2021/0200950 A1 | 7/2021 | Basu et al. | |
| 2021/0203784 A1 | 7/2021 | Konig et al. | |
| 2021/0256616 A1 | 8/2021 | Hayward et al. | |
| 2021/0271820 A1 | 9/2021 | Raghupatruni et al. | |
| 2021/0273892 A1 | 9/2021 | Rakshit | |
| 2021/0295203 A1 | 9/2021 | Liao et al. | |
| 2021/0350357 A1 | 11/2021 | Lafontaine | |

(56) References Cited

U.S. PATENT DOCUMENTS

| | | |
|---|---|---|
| 2021/0357771 A1 | 11/2021 | Flowers et al. |
| 2021/0357790 A1 | 11/2021 | Volkov et al. |
| 2021/0365955 A1 | 11/2021 | Galante et al. |
| 2021/0366048 A1 | 11/2021 | Westhues et al. |
| 2021/0374092 A1 | 12/2021 | Sahay |
| 2021/0390950 A1 | 12/2021 | Kumar et al. |
| 2021/0406938 A1 | 12/2021 | Thakral |
| 2022/0004630 A1* | 1/2022 | Almukaynizi .......... G06F 21/57 |
| 2022/0019496 A1 | 1/2022 | Lozano et al. |
| 2022/0091957 A1 | 3/2022 | Szczepanik et al. |
| 2022/0092893 A1 | 3/2022 | Rosenbaum |
| 2022/0094789 A1 | 3/2022 | Lau et al. |
| 2022/0114594 A1 | 4/2022 | Nunes et al. |
| 2022/0136847 A1 | 5/2022 | Higuchi et al. |
| 2022/0176971 A1 | 6/2022 | Nordh |
| 2022/0198531 A1 | 6/2022 | Cleaver et al. |
| 2022/0261535 A1* | 8/2022 | Madaan ................ G06F 40/166 |
| 2022/0269583 A1 | 8/2022 | Plawecki |
| 2022/0279014 A1 | 9/2022 | Stokes et al. |
| 2022/0293107 A1 | 9/2022 | Leaman et al. |
| 2022/0300993 A1 | 9/2022 | Chaudhry et al. |
| 2022/0308943 A1 | 9/2022 | Srinivasan et al. |
| 2022/0340148 A1 | 10/2022 | Rosenbaum |
| 2022/0366459 A1 | 11/2022 | Vieyra |
| 2023/0005070 A1 | 1/2023 | Nguyen et al. |
| 2023/0017739 A1 | 1/2023 | Feldman et al. |
| 2023/0023869 A1 | 1/2023 | Ganesan et al. |
| 2023/0060300 A1 | 3/2023 | Rosenbaum |
| 2023/0064816 A1 | 3/2023 | Matsuoka et al. |
| 2023/0105564 A1 | 4/2023 | Breitweiser et al. |
| 2023/0108454 A1 | 4/2023 | Gidwaney et al. |
| 2023/0110941 A1 | 4/2023 | Makhija et al. |
| 2023/0116639 A1 | 4/2023 | Patt et al. |
| 2023/0140931 A1 | 5/2023 | Anderson et al. |
| 2023/0141853 A1 | 5/2023 | Vu et al. |
| 2023/0244938 A1 | 8/2023 | Wei et al. |
| 2023/0259821 A1 | 8/2023 | Travalini et al. |
| 2023/0267512 A1 | 8/2023 | Isackson et al. |
| 2023/0267694 A1 | 8/2023 | Breitweiser et al. |
| 2023/0290502 A1* | 9/2023 | Zhi ........................ G06N 3/044 |
| 2023/0298567 A1 | 9/2023 | Tan et al. |
| 2023/0316412 A1 | 10/2023 | Behrens et al. |
| 2023/0343149 A1 | 10/2023 | Volos et al. |
| 2023/0385939 A1 | 11/2023 | Tsuchiyma et al. |
| 2023/0410801 A1 | 12/2023 | Mishra |
| 2024/0073219 A1 | 2/2024 | Maizels et al. |
| 2024/0102814 A1 | 3/2024 | Karri et al. |
| 2024/0119424 A1 | 4/2024 | Lofvers et al. |
| 2024/0167864 A1 | 5/2024 | Donovan et al. |
| 2024/0168611 A1 | 5/2024 | Pham et al. |
| 2024/0248920 A1 | 7/2024 | Qiao et al. |
| 2024/0249557 A1 | 7/2024 | Chavali |
| 2024/0256780 A1 | 8/2024 | Douglas et al. |
| 2024/0281888 A1 | 8/2024 | Fields et al. |
| 2024/0281889 A1 | 8/2024 | Fields et al. |
| 2024/0281891 A1 | 8/2024 | Fields et al. |
| 2024/0289362 A1 | 8/2024 | Williams et al. |
| 2024/0289596 A1 | 8/2024 | Williams et al. |
| 2024/0289851 A1 | 8/2024 | Williams et al. |
| 2024/0291777 A1 | 8/2024 | Fields et al. |
| 2024/0303745 A1 | 9/2024 | Fields et al. |
| 2024/0311271 A1 | 9/2024 | Fields et al. |
| 2024/0311921 A1 | 9/2024 | Fields et al. |
| 2024/0311922 A1 | 9/2024 | Fields et al. |
| 2024/0328410 A1 | 10/2024 | Williams et al. |
| 2024/0331047 A1 | 10/2024 | Williams et al. |
| 2024/0331068 A1 | 10/2024 | Williams et al. |
| 2024/0362686 A1 | 10/2024 | Williams et al. |
| 2024/0371367 A1* | 11/2024 | Churgin .............. H04M 3/5175 |
| 2024/0371376 A1 | 11/2024 | Bohl et al. |
| 2024/0395138 A1 | 11/2024 | Brannan et al. |
| 2024/0395145 A1 | 11/2024 | Brannan et al. |
| 2024/0403596 A1 | 12/2024 | Brannan et al. |
| 2024/0412294 A1 | 12/2024 | Brannan et al. |
| 2024/0414105 A1 | 12/2024 | Brannan et al. |
| 2025/0013555 A1 | 1/2025 | Papadopoulos et al. |

FOREIGN PATENT DOCUMENTS

| | | |
|---|---|---|
| EP | 2946168 A1 | 11/2015 |
| EP | 3239686 A1 | 11/2017 |
| EP | 3578433 B1 | 8/2020 |
| EP | 3730375 B1 | 10/2021 |
| EP | 3960576 A1 | 3/2022 |
| EP | 4190659 A1 | 6/2023 |
| EP | 4190660 A1 | 6/2023 |
| IN | 201741025968 | 12/2017 |
| KR | 10-2148616 B1 | 8/2020 |
| WO | 2013/059620 A2 | 4/2013 |
| WO | 2023/021162 A2 | 2/2023 |

OTHER PUBLICATIONS

Introducing Agent M—a powerful Large Language model or ChatGPT based Master Agent developer framework, powered by Floatbot platform, that lets you create multiple application—specific LLM-based Agent(s). Retrieved from the internet at: <URL:https://www.linkedin.com/posts/jimmypadia_nyse-floor-talk-floatbot-activity-7089664064603234304-60TU?utm_source=share&utm_medium=member_android> (2023).

Isenberg, The Compliance Tasks ChatGPT Can (and Can't) Handle, Ignites (published Apr. 3, 2023).

Morelli, Will ChatGPT, artificial intelligence replace financial professionals any time soon?, Insurance NewsNet. Retrieved from the Internet at: <https://insurancenewsnet.com/innarticle/will-chatgpt-artificial-intelligence-replace-financial-professionals-any-time-soon> (published Jan. 23, 2023).

Morris, Morgan Stanley Developing Chatbot with OpenAI, Ignites (published Mar. 15, 2023).

Munk, Will AI models like ChatGPT take your insurance job?, Life Annuity Speciality (published Mar. 7, 2023).

Rengachary et al., ChatGPT: A Conversation About Underwriting and Life Insurance. Retrieved from the internet at: https://www.coverager.com/chatgpt-a-conversation-about-underwriting-and-life-insurance/ (published Apr. 3, 2023).

Smith, Insurer Zurich experiments with ChatGPT for claims and data mining, Financial Times (published Mar. 24, 2023).

Tuohy, What ChatGPT's Chores May Look Like in Life Insurance Industry, Life Annuity Specialist (published Apr. 21, 2023).

Wilson, Should Financial Services Companies Consider Open AI?, LIMRA.com MarketFacts (published Mar. 2023).

Dickson, How to create a private ChatGPT that interacts with your local documents, TechTalks. Retrieved from the Internet at: <URL:https://bdtechtalks.com/2023/06/01/create-privategpt-local-llm/> (Jun. 2023).

OpenPR Worldwide Public Relations, Press release, "Floatbot.AI Unveils Revolutionary Agent M—Generative AI (LLM or ChatGPT) Based Master Agent developer framework," Web page downloaded from Internet at <https://www.openpr.com/news/3147235/floatbot-ai-unveils-revolutionary-aqent-m-qenerative-ai-llm>. Retrieved from Internet on Aug. 1, 2023.

The Future of Car Insurance #2: How AI Is Transforming Auto Insurance for Companies and Drivers, Brogan Woodburn, Rashawn Mitchner, dated Jun. 22, 2023. (Year: 2023).

STIC EIC Search Report for U.S. Appl. No. 18/196,691 (Year: 2024).

Wang et al., Transfer learning-based query classification for intelligent building information spoken dialogue. Automation in Construction. Sep. 1, 2022; 141:104403. (Year: 2022).

A. Wang N, Issa RR, Anumba CJ. Transfer learning-based query classification for intelligent building information spoken dialogue. Automation in Construction. Sep. 1, 2022; 141:104403. (Year: 2022).

ip.com NPL Search History (2025).

Mleczko, K. (2021). Chatbot as a tool for knowledge sharing in the maintenance and repair processes. Multidisciplinary Aspects of

(56)              References Cited

OTHER PUBLICATIONS

Production Engineering, 4(1), 499-508. (Year: 2021).

"Encrypt Team," "ChatGPT—AI Chat bot—A Complete Guide," www.theencrypt.com 2022 (Year: 2022).

Hossen et al., Controlling home appliances adopting chatbot using machine learning approach. In International Conference on Intelligent Computing & Optimization, pp. 253-264, Springer International Publishing (Oct. 2022).

Jadhav et al., "Design and Development of Chatbot Based on Reinforcement Learning," Chapter 12, https://doi.org/10.1002/9781119861850.ch12 2022 (Year: 2022).

Sankaranarayanan et al., Flood prediction based on weather parameters using deep learning, Journal of Water and Climate Change, 2020 (Year: 2020).

Zhang et al. ("DIALOGPT : Large-Scale Generative Pre-training for Conversational Response Generation", A collaboration between Microsoft Research and Microsoft Dynamics 365 Al Research, pp. 270-278, Jul. 5-Jul. 10, 2020.) (Year: 2020).

* cited by examiner

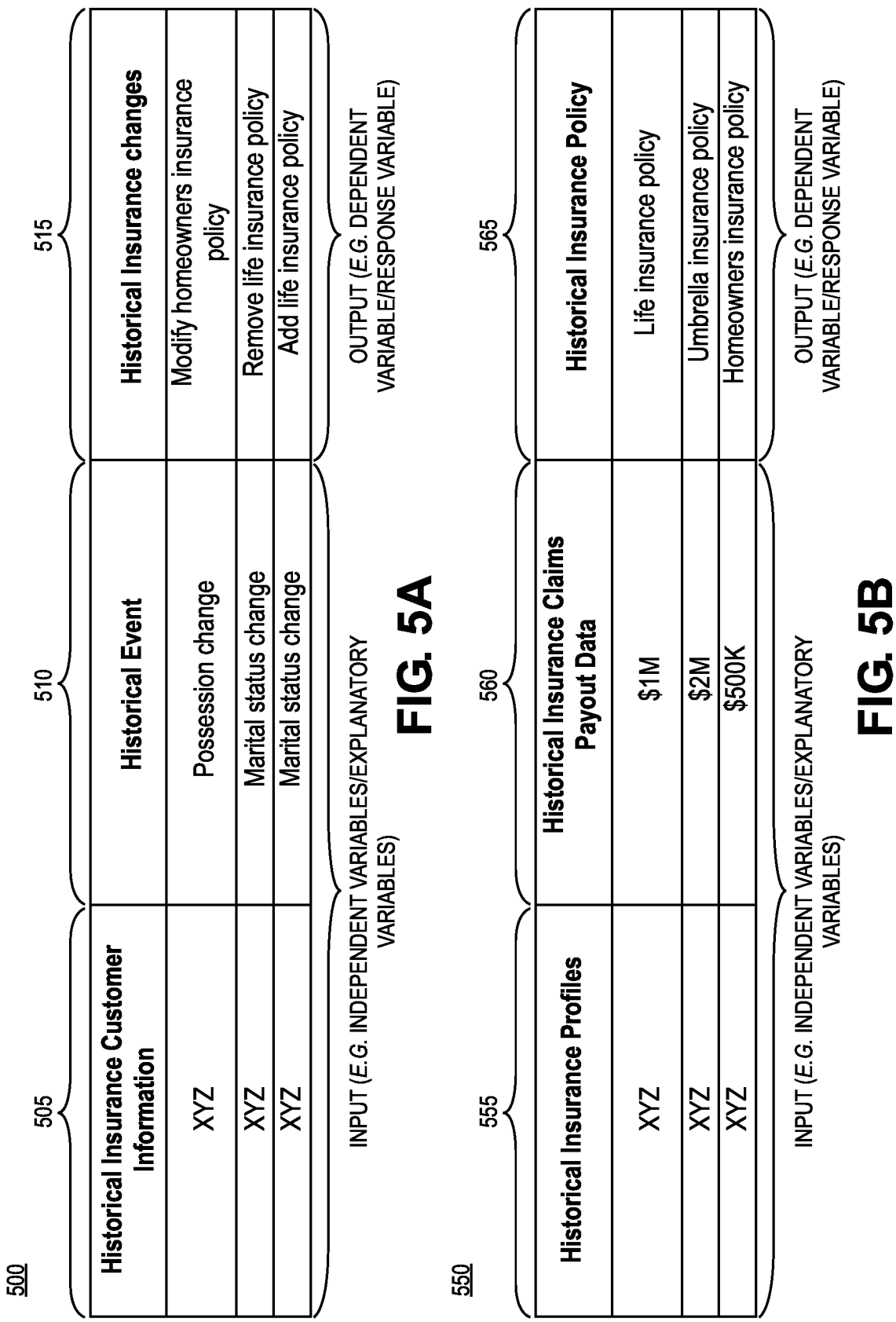

500

| Historical Insurance Customer Information | Historical Event | Historical Insurance changes |
|---|---|---|
| 505 | 510 | 515 |
| XYZ | Possession change | Modify homeowners insurance policy |
| XYZ | Marital status change | Remove life insurance policy |
| XYZ | Marital status change | Add life insurance policy |
| INPUT (E.G. INDEPENDENT VARIABLES/EXPLANATORY VARIABLES) | | OUTPUT (E.G. DEPENDENT VARIABLE/RESPONSE VARIABLE) |

| Historical Insurance Profiles | Historical Insurance Claims Payout Data | Historical Insurance Policy |
|---|---|---|
| 555 | 560 | 565 |
| XYZ | $1M | Life insurance policy |
| XYZ | $2M | Umbrella insurance policy |
| XYZ | $500K | Homeowners insurance policy |
| INPUT (E.G. INDEPENDENT VARIABLES/EXPLANATORY VARIABLES) | | OUTPUT (E.G. DEPENDENT VARIABLE/RESPONSE VARIABLE) |

RECEIVE CUSTOMER INFORMATION — 610

DETERMINE INSURANCE CHANGE RECOMMENDATION TRIGGER — 620

DETERMINE RECOMMENDATION FOR AN INSURANCE POLICY CHANGE — 630

SEND RECOMMENDATION FOR AN INSURANCE POLICY CHANGE — 640

DISPLAY RECOMMENDATION FOR AN INSURANCE POLICY CHANGE — 650

900

1000

CHATBOT RECEIVES INPUT COMMAND OR QUESTION — 1010

CHATBOT GENERATES DRAFT RESPONSE — 1020

USER MODIFIES DRAFT RESPONSE — 1030

USER SENDS MODIFIED DRAFT RESPONSE — 1040

RECEIVE POTENTIAL INSURANCE DATABASE INFORMATION — 1050

1100

GENERATE COMPARISON DOCUMENT(S) AND/OR SUMMARY DOCUMENT(S) — 1110

SEND COMPARISON DOCUMENT(S) AND/OR SUMMARY DOCUMENT(S) — 1120

RECEIVE DETERMINATION OF IF THE POTENTIAL INSURANCE DATABASE INFORMATION SHOULD BE ADDED TO THE INSURANCE GROUND TRUTH DATABASE — 1130

Figure 13:
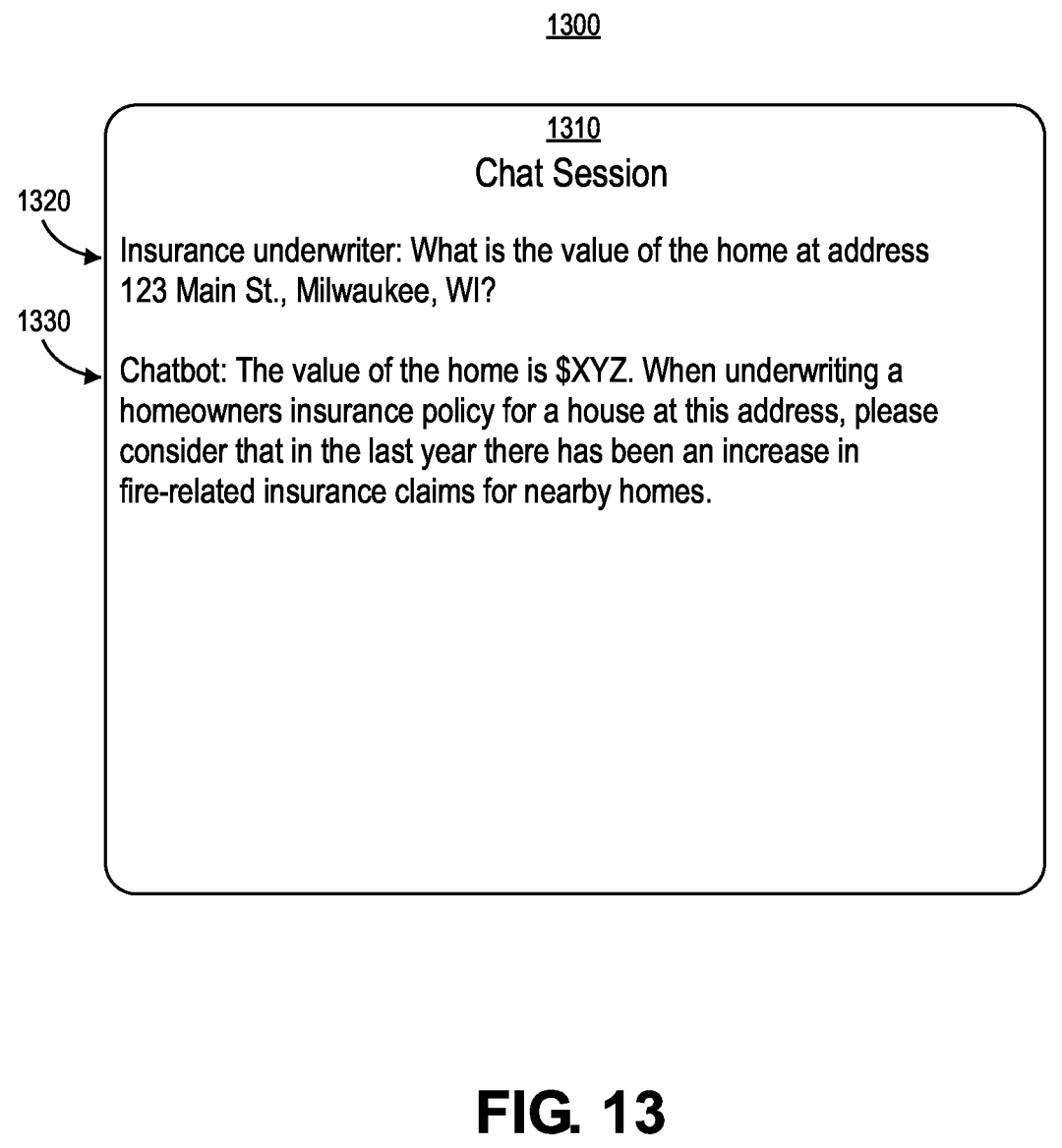

1300

1310

Chat Session

1320

Insurance underwriter: What is the value of the home at address 123 Main St., Milwaukee, WI?

1330

Chatbot: The value of the home is $XYZ. When underwriting a homeowners insurance policy for a house at this address, please consider that in the last year there has been an increase in fire-related insurance claims for nearby homes.

RECEIVE INPUT STATEMENT — 1505

DETERMINE TYPE OF INSURANCE POLICY — 1510

DETERMINE QUESTION — 1515

ANSWER RELATED TO ESTIMATION? — 1520

YES → ACCESS ESTIMATION AI ALGORITHM — 1525

NO

DETERMINE ANSWER TO QUESTION — 1530

DETERMINE INSURANCE-RELATED SUGGESTION — 1535

PRESENT ANSWER AND/OR INSURANCE-RELATED SUGGESTION — 1540

1700

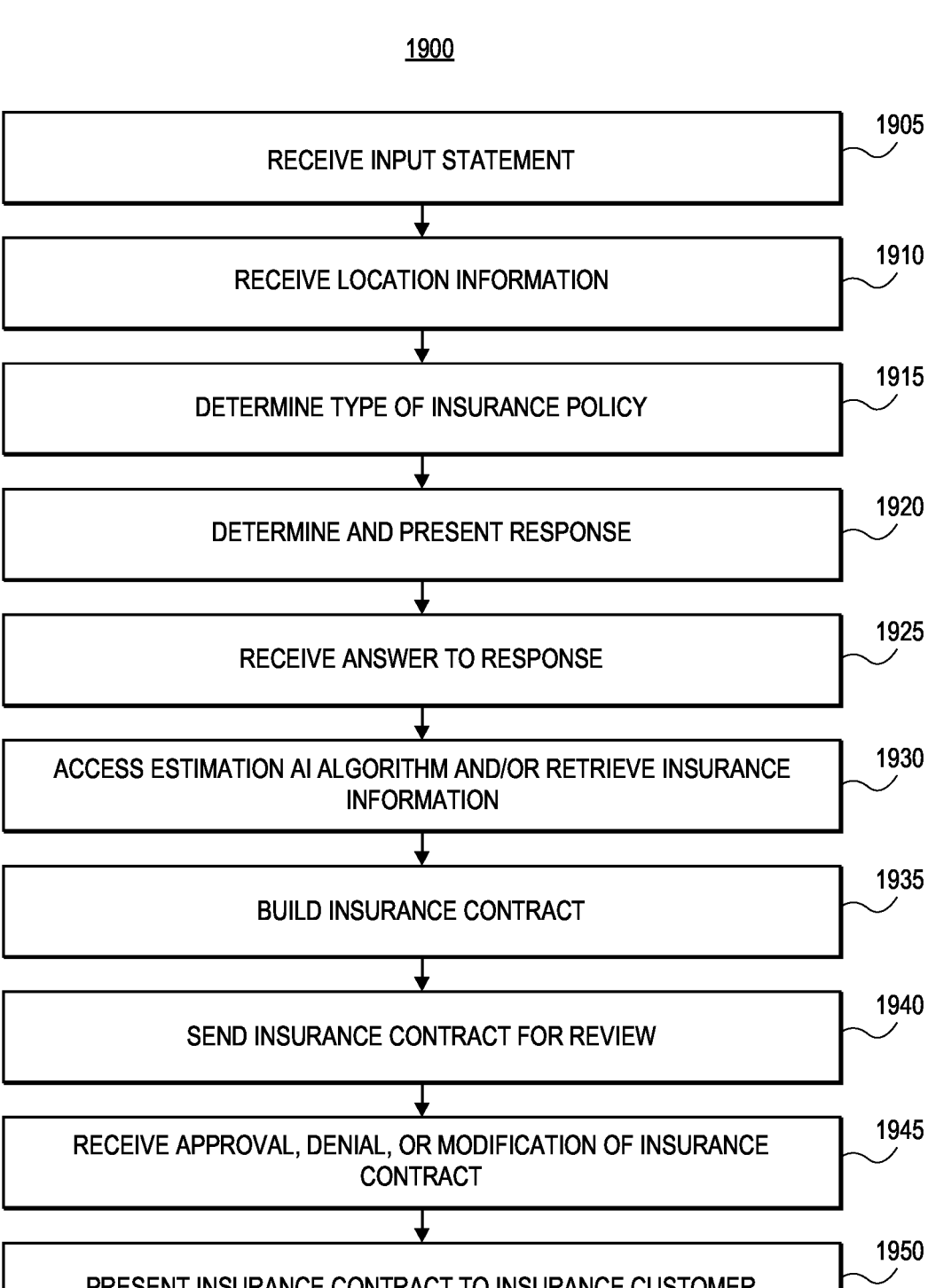

1900

RECEIVE INPUT STATEMENT — 1905

RECEIVE LOCATION INFORMATION — 1910

DETERMINE TYPE OF INSURANCE POLICY — 1915

DETERMINE AND PRESENT RESPONSE — 1920

RECEIVE ANSWER TO RESPONSE — 1925

ACCESS ESTIMATION AI ALGORITHM AND/OR RETRIEVE INSURANCE INFORMATION — 1930

BUILD INSURANCE CONTRACT — 1935

SEND INSURANCE CONTRACT FOR REVIEW — 1940

RECEIVE APPROVAL, DENIAL, OR MODIFICATION OF INSURANCE CONTRACT — 1945

PRESENT INSURANCE CONTRACT TO INSURANCE CUSTOMER — 1950

FIG. 19

GROUND TRUTH INSURANCE DATABASE

CROSS REFERENCE TO RELATED APPLICATIONS

This application claims the benefit of U.S. Provisional Application No. 63/455,154, entitled "Artificial Intelligence (AI) Writing An Insurance Policy" filed (Mar. 28, 2023); U.S. Provisional Application No. 63/453,285, entitled "Artificial Intelligence (AI) To Aid Underwriting And Insurance Agents" filed (Mar. 20, 2023); U.S. Provisional Application No. 63/452,035, entitled "Ground Truth Insurance Database" filed (Mar. 14, 2023); U.S. Provisional Application No. 63/450,837, entitled "AI To Recommend Change In Insurance Coverage" (filed Mar. 8, 2023); U.S. Provisional Application No. 63/447,757, entitled "Artificial Intelligence (AI) Writing An Insurance Policy" (filed Feb. 23, 2023); U.S. Provisional Application No. 63/447,745, entitled "Artificial Intelligence (AI) To Aid Underwriting And Insurance Agents" (filed Feb. 23, 2023); U.S. Provisional Application No. 63/447,391, entitled "Artificial Intelligence (AI) To Aid Underwriting And Insurance Agents" (filed Feb. 22, 2023); U.S. Provisional Application No. 63/446,952, entitled "Ground Truth Insurance Database" (filed Feb. 20, 2023); and U.S. Provisional Application No. 63/446,941, entitled "AI To Recommend Change In Insurance Coverage" (filed Feb. 20, 2023), the entirety of each of which is incorporated by reference herein.

FIELD

The present disclosure generally relates to, inter alia (i) using artificial intelligence (AI) and/or machine learning (ML) to recommend a change in insurance coverage, (ii) building a ground truth insurance database, (iii) using AI and/or ML to aid underwriting and insurance agents, and/or (iv) using AI and/or ML to build and/or present an insurance contract.

BACKGROUND

Current systems for recommending changes to insurance policies may be cumbersome and inefficient. For example, to determine if a change in an insurance policy is warranted, an insurance customer may have to, of her own volition, contact her insurance agent, explain her situation, and ask for recommendations for updating her insurance policies.

In addition, current electronic systems for holding electronic insurance data may have drawbacks. For example, current systems may aggregate insurance data from different sources; but when conflicts occur between different sources, there may be no way to determine which source is correct. For instance, in an accident corresponding to an auto insurance claim, a first source may indicate that a first driver is ninety percent at fault and a second driver is ten percent at fault, whereas a second source may indicate that the drivers are each fifty percent at fault; but the electronic system has no way of resolving this conflict.

In addition, current electronic systems for assisting insurance agents and/or insurance underwriters have drawbacks. For example, current systems may not use the most up to date data to provide recommendations. In another example, current systems may not provide recommendations in a natural language form to the insurance agent and/or insurance underwriter.

In addition, current systems for writing insurance contracts may be cumbersome and inefficient. For example, current systems may sometimes be difficult for insurance agents to use.

The systems and methods disclosed herein provide solutions to these problems and may provide solutions to the ineffectiveness, insecurities, difficulties, inefficiencies, encumbrances, and/or other drawbacks of conventional techniques.

SUMMARY

The present embodiments relate to, inter alia, using artificial intelligence (AI) and/or machine learning (ML) to recommend a change in insurance coverage. For example, AI (and/or ML techniques) may recommend a change in insurance coverage based upon a change in a customer's profile (e.g., a profile on an insurance app, a profile with an insurance company, etc.), information gathered from scraping and/or analyzing emails, etc. For instance, the AI or ML may recommend an increase in life insurance coverage when the AI or ML learns that a customer has had an additional child. Recommendations may be sent to a customer via email, an insurance app, etc. A customer may opt into or out of recommendations program, and/or customize when and how to receive the recommendations.

In one aspect, a computer-implemented method for recommending a change in insurance coverage may be provided. The method may be implemented via one or more local or remote processors, sensors, transceivers, servers, memory units, mobile devices, augmented reality glasses or headsets, extended or virtual reality headsets, smart glasses or watches, smart contacts, voice bots, chatbots, ChatGPT bots, wearables, and/or other electronic or electrical components. In one aspect, the method may comprise: (1) receiving, via one or more processors, customer information of an insurance customer; (2) determining, via the one or more processors, that an insurance change recommendation trigger has occurred by routing the customer information into an insurance recommendation machine learning algorithm; and/or (3) in response to determining the insurance change recommendation trigger, sending, via the one or more processors, a recommendation for an insurance policy change for the insurance customer. The method may include additional, fewer, or alternate actions, including those discussed elsewhere herein.

In another aspect, a computer system for recommending a change in insurance coverage may be provided. The computer system may include one or more local or remote processors, sensors, transceivers, servers, memory units, mobile devices, augmented reality glasses or headsets, extended or virtual reality headsets, smart glasses or watches, smart contacts, chatbots, voice bots, ChatGPT bots, wearables, and/or other electronic or electrical components. For instance, in one example, the computer system may include one or more processors configured to: (1) receive customer information of an insurance customer; (2) determine if an insurance change recommendation trigger has occurred by routing the customer information into an insurance recommendation machine learning algorithm; and/or (3) upon determination of the insurance change recommendation trigger, send a recommendation for an insurance policy change for the insurance customer. The computer system may include additional, less, or alternate functionality, including that discussed elsewhere herein.

In yet another aspect, a computer device for recommending a change in insurance coverage may be provided. The computer device may include one or more local or remote processors, sensors, transceivers, servers, memory units, mobile devices, augmented reality glasses or headsets, extended or virtual reality headsets, smart glasses or watches, wearables, and/or other electronic or electrical components. In one aspect, the computer device may include: one or more processors; and/or one or more memories coupled to the one or more processors. The one or more memories including computer executable instructions stored therein that, when executed by the one or more processors, may cause the computer device to: (1) receive customer information of an insurance customer; (2) determine if an insurance change recommendation trigger has occurred by routing the customer information into an insurance recommendation machine learning algorithm; and/or (3) upon determination of the insurance change recommendation trigger, send a recommendation for an insurance policy change for the insurance customer. The computer device may include additional, less, or alternate functionality, including that discussed elsewhere herein.

In yet another aspect, a computer-implemented method for recommending a change in insurance coverage may be provided. The method may be implemented via one or more local or remote processors, sensors, transceivers, servers, memory units, mobile devices, augmented reality glasses or headsets, extended or virtual reality headsets, smart glasses or watches, smart contacts, wearables, voice bots, chatbots, ChatGPT bots, and/or other electronic or electrical components. For instance, in one example, the method may include: (1) receiving, via one or more processors, customer information of an insurance customer; (2) determining, via the one or more processors, that an insurance change recommendation trigger has occurred by routing the customer information into an insurance recommendation machine learning and/or artificial intelligence algorithm; and/or (3) in response to determining the insurance change recommendation trigger, sending, via the one or more processors, a recommendation for an insurance policy change for the insurance customer. The method may include additional, fewer, or alternate actions, including those discussed elsewhere herein.

The present embodiments also relate to, inter alia, building a ground truth insurance database. For example, AI and/or ML techniques may create a ground truth database for an insurance company. Information may be pulled from any source, such as an insurance application (app), insurance claims, police reports, government records, pictures of the accident (e.g., including showing road conditions), etc. For conflict resolution, sources may be cited, and conflicts may be highlighted so that a human may determine which information is correct. Summaries of incidents may be provided. An AI chatbot or voice bot may be used to talk to other chatbot to get information from other databases. Blockchain sources may be pulled from as well.

In one aspect, a computer system for building a ground truth insurance database may be provided. The computer system may include one or more local or remote processors, sensors, transceivers, servers, memory units, mobile devices, augmented reality glasses or headsets, extended or virtual reality headsets, smart glasses or watches, wearables, smart contact lenses, voice bots, chatbots, ChatGPT bots, and/or other electronic or electrical components. For example, in one instance, the computer system may include one or more processors configured to: (1) receive potential insurance database information, wherein the potential insurance database information comprises: (i) insurance company application (app) information, (ii) anonymized insurance claim information, (iii) police report information, and/or (iv) auxiliary information; (2) retrieve, from an insurance ground truth insurance database, existing ground truth insurance information by querying the ground truth database based upon the potential insurance database information; (3) determine if the potential insurance database information should be added to the insurance ground truth database by comparing the potential insurance database information to the existing ground truth insurance information; and/or (4) if the potential insurance database information should be added to the insurance ground truth database, add the potential insurance database information to the insurance ground truth database. The computer system may include additional, less, or alternate functionality, including that discussed elsewhere herein.

In yet another aspect, a computer-implemented method for building a ground truth insurance database may be provided. The method may be implemented via one or more local or remote processors, sensors, transceivers, servers, memory units, mobile devices, augmented reality glasses or headsets, extended or virtual reality headsets, smart glasses or watches, smart contacts, wearables, chatbots, voice bots, ChatGPT-based bots, and/or other electronic or electrical components. For example, in one instance, the method may include: (1) receiving, via one or more processors, potential insurance database information, wherein the potential insurance database information comprises: (i) insurance company application (app) information, (ii) anonymized insurance claim information, (iii) police report information, and/or (iv) auxiliary information; (2) retrieving, via the one or more processors, from an insurance ground truth insurance database, existing ground truth insurance information by querying the ground truth database based upon the potential insurance database information; (3) determining, via the one or more processors, that the potential insurance database information should be added to the insurance ground truth database by comparing the potential insurance database information to the existing ground truth insurance information; and/or (4) in response to the determination that the potential insurance database information should be added to the insurance ground truth database, adding, via the one or more processors, the potential insurance database information to the insurance ground truth database. The method may include additional, fewer, or alternate actions, including those discussed elsewhere herein.

In yet another aspect, a computer device for building a ground truth insurance database may be provided. The computer device may include one or more local or remote processors, sensors, transceivers, servers, memory units, mobile devices, augmented reality glasses or headsets, extended or virtual reality headsets, smart glasses or watches, smart contacts, wearables, voice bots, chatbots, ChatGPT-based bots, and/or other electronic or electrical components. For example, in one instance, the computer device may include: one or more processors; and/or one or more memories coupled to the one or more processors. The one or more memories including computer executable instructions stored therein that, when executed by the one or more processors, may cause the computer device to: (1) receive potential insurance database information, wherein the potential insurance database information comprises: (i) insurance company application (app) information, (ii) anonymized insurance claim information, (iii) police report information, and/or (iv) auxiliary information; (2) retrieve, from an insurance ground truth insurance database, existing ground truth insurance information by querying the ground truth database based upon the potential insurance database information; (3) determine if the potential insurance database information should be added to the insurance ground truth database by comparing the potential insurance database information to the existing ground truth insurance information; and/or (4) if the potential insurance database information should be added to the insurance ground truth database, add the potential insurance database information to the insurance ground truth database. The computer device may include additional, less, or alternate functionality, including that discussed elsewhere herein.

The present embodiments also relate to, inter alia, using AI and/or ML to aid underwriting and insurance agents. For example, AI and/or ML techniques may provide recommendations to underwriters or insurance agents. For instance, an AI and/or ML chatbot or voicebot may pinpoint what the underwriter or insurance agent should be looking at (e.g., neighboring houses having sewage backups, etc.). Underwriters and/or insurance agents may also ask questions to the chatbot or voicebot (e.g., "what items of concern should I look at for this auto body shop in Bloomington?").

In one aspect, a computer-implemented method for improved artificial intelligence (AI) insurance analysis may be provided. The method may be implemented via one or more local or remote processors, sensors, transceivers, servers, memory units, mobile devices, augmented reality glasses or headsets, extended or virtual reality headsets, smart glasses or watches, smart contacts, voice bots, chatbots, ChatGPT bots, wearables, and/or other electronic or electrical components. In one aspect, the method may comprise: (1) receiving, with an AI chatbot (or voice bot) of the one or more processors, an input statement; (2) determining, with the AI chatbot, from the received input statement, a type of insurance policy, wherein the type of insurance policy comprises a homeowners insurance policy, a renters insurance policy, an auto insurance policy, a life insurance policy, a disability insurance policy, and/or an umbrella insurance policy; (3) determining, with the AI chatbot, from the input statement, a question corresponding to the type of insurance policy; (4) determining, with the AI chatbot, an answer to the question by retrieving insurance information based upon (i) the type of insurance policy, and (ii) the question; and/or (5) presenting, via the AI chatbot, the answer to the question. The method may include additional, fewer, or alternate actions, including those discussed elsewhere herein.

In another aspect, a computer system for improved artificial intelligence (AI) insurance analysis may be provided. The computer system may include one or more local or remote processors, sensors, transceivers, servers, memory units, mobile devices, augmented reality glasses or headsets, extended or virtual reality headsets, smart glasses or watches, smart contacts, chatbots, voice bots, ChatGPT bots, wearables, and/or other electronic or electrical components. For instance, in one example, the computer system may include one or more processors configured to: (1) receive, with an AI chatbot of the one or more processors, an input statement; (2) determine, with the AI chatbot, from the received input statement, a type of insurance policy, wherein the type of insurance policy comprises a homeowners insurance policy, a renters insurance policy, an auto insurance policy, a life insurance policy, a disability insurance policy, and/or an umbrella insurance policy; (3) determine, with the AI chatbot, from the input statement, a question corresponding to the type of insurance policy; (4) determine, with the AI chatbot, an answer to the question by retrieving insurance information based upon (i) the type of insurance policy, and (ii) the question; and/or (5) present, via the AI chatbot, the answer to the question. The computer system may include additional, less, or alternate functionality, including that discussed elsewhere herein.

In yet another aspect, a computer device for improved artificial intelligence (AI) insurance analysis may be provided. The computer device may include one or more local or remote processors, sensors, transceivers, servers, memory units, mobile devices, augmented reality glasses or headsets, extended or virtual reality headsets, smart glasses or watches, smart contacts, chatbots, voice bots, ChatGPT bots, wearables, and/or other electronic or electrical components. In one example, the computer device may include: one or more processors; and/or one or more memories. The one or more memories having stored thereon computer-executable instructions that, when executed by the one or more processors, may cause the computer device to: (1) receive, with an AI chatbot of the one or more processors, an input statement; (2) determine, with the AI chatbot, from the received input statement, a type of insurance policy, wherein the type of insurance policy comprises a homeowners insurance policy, a renters insurance policy, an auto insurance policy, a life insurance policy, a disability insurance policy, and/or an umbrella insurance policy; (3) determine, with the AI chatbot, from the input statement, a question corresponding to the type of insurance policy; (4) determine, with the AI chatbot, an answer to the question by retrieving insurance information based upon (i) the type of insurance policy, and (ii) the question; and/or (5) present, via the AI chatbot, the answer to the question. The computer device may include additional, less, or alternate functionality, including that discussed elsewhere herein.

In yet another aspect, a computer-implemented method for improved artificial intelligence (AI) or machine learning (ML) insurance analysis may be provided. The method may be implemented via one or more local or remote processors, sensors, transceivers, servers, memory units, mobile devices, augmented reality glasses or headsets, extended or virtual reality headsets, smart glasses or watches, smart contacts, voice bots, chatbots, ChatGPT bots, wearables, and/or other electronic or electrical components. In one aspect, the method may comprise: (1) receiving, with an AI or ML chatbot of the one or more processors, an input statement; (2) determining, with the AI or ML chatbot, from the received input statement, a type of insurance policy, wherein the type of insurance policy comprises a homeowners insurance policy, a renters insurance policy, an auto insurance policy, a life insurance policy, a disability insurance policy, and/or an umbrella insurance policy; (3) determining, with the AI or ML chatbot, from the input statement, a question corresponding to the type of insurance policy; (4) determining, with the AI or ML chatbot, an answer to the question by retrieving insurance information based upon (i) the type of insurance policy, and (ii) the question; and/or (5) presenting, via the AI or ML chatbot, the answer to the question. The method may include additional, fewer, or alternate actions, including those discussed elsewhere herein.

The present embodiments may relate to, inter alia, using AI and/or ML to write an insurance contract (e.g., including an insurance policy). For example, an AI and/or ML chatbot (or voice bot) may receive an input statement from an insurance customer and/or insurance agent, and write an insurance contract to be signed by customer. Potential insurance customers may also tell the AI and/or ML chatbot the insurance terms that they want. A human insurance agent may review contract before it is sent to insurance customer.

In one aspect, a computer-implemented method for presenting an insurance contract created by an artificial intelligence (AI) chatbot to a potential insurance customer may be provided. The method may be implemented via one or more local or remote processors, sensors, transceivers, servers, memory units, mobile devices, augmented reality glasses or headsets, extended or virtual reality headsets, smart glasses or watches, smart contacts, voice bots, chatbots, ChatGPT bots, wearables, and/or other electronic or electrical components. In one example, the method may include, via one or more processors: (1) receiving, with an AI chatbot of the one or more processors, an input statement; (2) determining, with the AI chatbot, from the received input statement, a type of insurance policy, wherein the type of insurance policy comprises a homeowners insurance policy, a renters insurance policy, an auto insurance policy, a life insurance policy, a disability insurance policy, and/or an umbrella insurance policy; (3) building, with the AI chatbot, an insurance contract based upon the type of insurance policy; and/or (4) presenting, via the AI chatbot, the insurance contract to the potential insurance customer. The method may include additional, fewer, or alternate actions, including those discussed elsewhere herein.

In another aspect, a computer system for presenting an insurance contract created by an artificial intelligence (AI) chatbot to a potential insurance customer may be provided. The computer system may include one or more local or remote processors, sensors, transceivers, servers, memory units, mobile devices, augmented reality glasses or headsets, extended or virtual reality headsets, smart glasses or watches, smart contacts, chatbots, voice bots, ChatGPT bots, wearables, and/or other electronic or electrical components. In one example, the computer system may include one or more processors configured to: (1) receive, with an AI chatbot of the one or more processors, an input statement; (2) determine, with the AI chatbot, from the received input statement, a type of insurance policy, wherein the type of insurance policy comprises a homeowners insurance policy, a renters insurance policy, an auto insurance policy, a life insurance policy, a disability insurance policy, and/or an umbrella insurance policy; (3) build, with the AI chatbot, an insurance contract based upon the type of insurance policy; and/or present, via the AI chatbot, the insurance contract to the potential insurance customer. The computer system may include additional, less, or alternate functionality, including that discussed elsewhere herein.

In yet another aspect, a computer device for presenting an insurance contract created by an artificial intelligence (AI) chatbot to a potential insurance customer may be provided. The computer device may include one or more local or remote processors, sensors, transceivers, servers, memory units, mobile devices, augmented reality glasses or headsets, extended or virtual reality headsets, smart glasses or watches, wearables, and/or other electronic or electrical components. In one example, the computer device may include: one or more processors; and/or one or more memories. The one or more memories having stored thereon computer-executable instructions that, when executed by the one or more processors, may cause the computer device to: (1) receive, with an AI chatbot of the one or more processors, an input statement; (2) determine, with the AI chatbot, from the received input statement, a type of insurance policy, wherein the type of insurance policy comprises a homeowners insurance policy, a renters insurance policy, an auto insurance policy, a life insurance policy, a disability insurance policy, and/or an umbrella insurance policy; (3) build, with the AI chatbot, an insurance contract based upon the type of insurance policy; and/or (4) present, via the AI chatbot, the insurance contract to the potential insurance customer. The computer device may include additional, less, or alternate functionality, including that discussed elsewhere herein.

In yet another aspect, a computer-implemented method for presenting an insurance contract created by an artificial intelligence (AI) or machine learning (ML) chatbot to a potential insurance customer may be provided. The method may be implemented via one or more local or remote processors, sensors, transceivers, servers, memory units, mobile devices, augmented reality glasses or headsets, extended or virtual reality headsets, smart glasses or watches, smart contacts, wearables, voice bots, chatbots, ChatGPT bots, and/or other electronic or electrical components. In one example, the method may include, via one or more processors: (1) receiving, with an AI or ML chatbot of the one or more processors, an input statement; (2) determining, with the AI or ML chatbot, from the received input statement, a type of insurance policy, wherein the type of insurance policy comprises a homeowners insurance policy, a renters insurance policy, an auto insurance policy, a life insurance policy, a disability insurance policy, and/or an umbrella insurance policy; (3) building, with the AI or ML chatbot, an insurance contract based upon the type of insurance policy; and/or (4) presenting, via the AI or ML chatbot, the insurance contract to the potential insurance customer (such as via voice or text-based interaction, or via a display screen). The method may include additional, fewer, or alternate actions, including those discussed elsewhere herein.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 5A illustrates another exemplary table of historical information that may be used to train an AI or ML algorithm.

FIG. 5B illustrates another exemplary table of historical information that may be used to train an AI or ML algorithm.

FIG. 13 illustrates an exemplary chat session, according to one embodiment.

FIG. 19 illustrates an exemplary computer-implemented method for using AI and/or ML to build and/or present an insurance contract.

DETAILED DESCRIPTION

Exemplary System—Recommending a Change in Insurance Coverage

The present embodiments relate to, inter alia, using artificial intelligence (AI) and/or machine learning (ML) to recommend a change in insurance coverage. For example, AI (and/or ML techniques) may recommend a change in insurance coverage based upon a change in a customer's profile (e.g., a profile on an insurance app, a profile with an insurance company, etc.), information gathered from scraping and/or analyzing emails, etc. For instance, the AI or ML may recommend an increase in life insurance coverage when the AI or ML learns that a customer has had an additional child. Recommendations may be sent to a customer via email, an insurance app, etc. A customer can opt into or out of recommendations program, and/or customize when and how to receive the recommendations.

Figure 1:
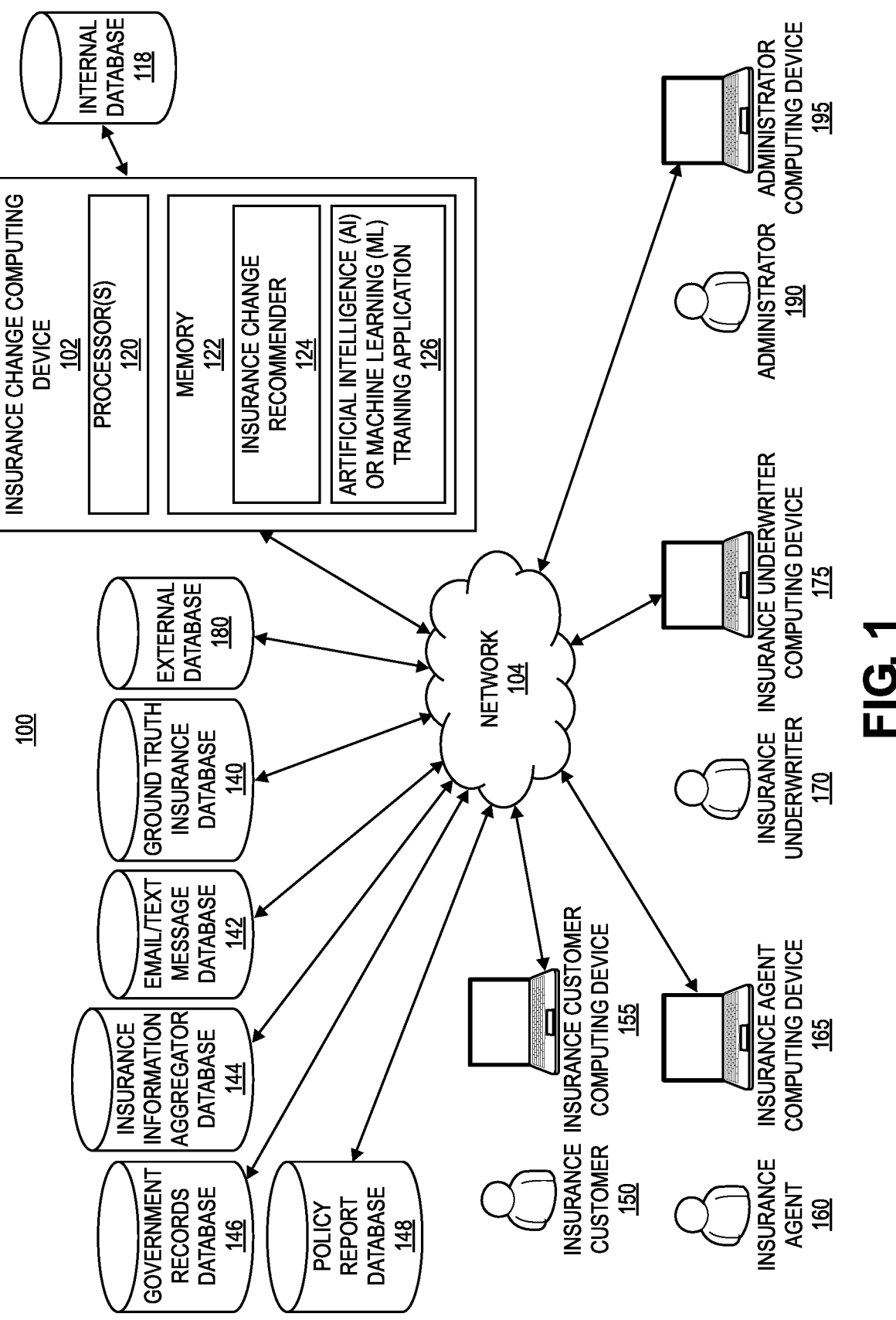
FIG. 1 illustrates an exemplary computer system for recommending a change in insurance coverage, according to one embodiment.

To this end, FIG. 1 illustrates an exemplary computer system 100 for recommending a change in insurance coverage in which the exemplary computer-implemented methods described herein may be implemented. The high-level architecture includes both hardware and software applications, as well as various data communications channels for communicating data between the various hardware and software components.

The insurance change computing device 102 may include one or more processors 120 such as one or more micropro- cessors, controllers, and/or any other suitable type of processor. The insurance change computing device 102 may further include a memory 122 (e.g., volatile memory, non-volatile memory) accessible by the one or more processors 120, (e.g., via a memory controller). The one or more processors 120 may interact with the memory 122 to obtain and execute, for example, computer-readable instructions stored in the memory 122. Additionally or alternatively, computer-readable instructions may be stored on one or more removable media (e.g., a compact disc, a digital versatile disc, removable flash memory, etc.) that may be coupled to the insurance server 102 to provide access to the computer-readable instructions stored thereon. In particular, the computer-readable instructions stored on the memory 122 may include instructions for executing various applications, such as insurance change recommender 124, and/or artificial intelligence (AI) or machine learning (ML) training application 126.

An insurance company that owns the insurance change computing device 102 may provide insurance to the insurance customer 150. For example, the insurance company may provide insurance to the insurance customer 150. For instance, the insurance company may also provide insurance policies, such as a life insurance policy, a homeowners insurance policy, a renters insurance policy, an auto insurance policy, an umbrella insurance policy, and/or a disability insurance policy, etc. As such, in some situations, it may be useful for the insurance company to provide recommendations to the insurance customer 150 for changing insurance policies (e.g., adding an insurance policy, canceling an insurance policy, modifying an insurance policy, etc.).

To this end, the insurance change recommender 124 may determine an insurance change recommendation. In some examples, the insurance change recommender 124 may determine to recommend a change in insurance coverage by determining that an insurance change recommendation trigger has occurred. For example, the insurance change recommender 124 may determine that an insurance change recommendation trigger has occurred because the insurance customer 150 has had a child. In this example, the insurance change recommender 124 may also recommend an increase in life insurance coverage due to this child change event.

The insurance change recommender 124 may determine that the insurance change recommendation trigger has occurred by any suitable technique. For example, as will be discussed elsewhere herein, the insurance change recommender 124 may route insurance information into trained insurance recommendation ML algorithm to determine that the insurance change recommendation trigger has occurred.

Additionally or alternatively to determining that an insurance change recommendation trigger has occurred, the insurance recommendation ML algorithm may determine the recommendation for the change in insurance coverage. For example, as will be discussed elsewhere herein, the insurance change recommender 124 may route information of an insurance customer into trained insurance recommendation ML algorithm to determine the recommendation for the change in insurance coverage.

In operation, the AI or ML training application 126 may train the insurance recommendation ML algorithm. For example, as will be described elsewhere herein, the AI or ML training application 126 may route historical data into the insurance recommendation ML algorithm to train the insurance recommendation ML algorithm.

The insurance information (e.g., that is used to determine the insurance change recommendation trigger and/or recommendation for the change in insurance coverage) may be received from any suitable source, such as ground truth insurance database 140, email/text message database 142, insurance information aggregator database 144, government records database 146, police reports database 148, external database 180, and/or internal database 118.

In some examples, the ground truth insurance database 140 may hold information pulled from other sources (e.g., insurance applications (apps), insurance claims, police reports, government records, etc.), and determined to be the most accurate available information. For example, if information from two different sources conflicts, the ground truth insurance database 140 may hold only the information determined to be the most accurate; or may indicate which information has been determined to be more accurate, etc. The ground truth insurance database 140 will be described in more detail elsewhere herein.

The email/text message database 142, may hold any information, such as emails, text messages, etc. In some examples, the email/text message database 142 is owned by a company that provides emails to companies, and/or provides text messaging services to companies.

The insurance information aggregator database 144 may hold any information, such as information aggregated from other sources, such as insurance companies. For example, insurance information aggregator database 144 may hold insurance claim information, etc. In some embodiments, conflicts between information held in the insurance information aggregator database 144 are not resolved (e.g., if information between two sources conflicts, both sets of information are simply stored in the insurance information aggregator database 144).

The government records database 146, may hold any suitable information, such as government records, weather information, birth information (e.g., birth certificates, etc.), death information (e.g., death certificates), marriage and divorce information (e.g., marital records or court records), real estate information (e.g., deed information, information of real estate purchases, etc.), etc.

The police reports database 148 may hold any suitable information, such as police reports, etc. The police reports may include any information, such as notes made by police officers, conclusions reached by police officers (e.g., a percentage of fault of drivers in an auto accident), imagery information (e.g., image or video information) (e.g., of an auto accident), etc.

The insurance customer 150 may view the insurance change recommendation on an insurance customer computing device 155, which may comprise any suitable computing device, such as a computer, a smartphone, a laptop, a phablet, etc. The insurance customer computing device 155 may include one or more processors, such as one or more microprocessors, controllers, and/or any other suitable type of processor. In addition, it should be appreciated that the insurance customer 150 may be a current insurance customer of an insurance company, or a potential insurance customer of the insurance company (e.g., a customer shopping for insurance).

Figure 2:
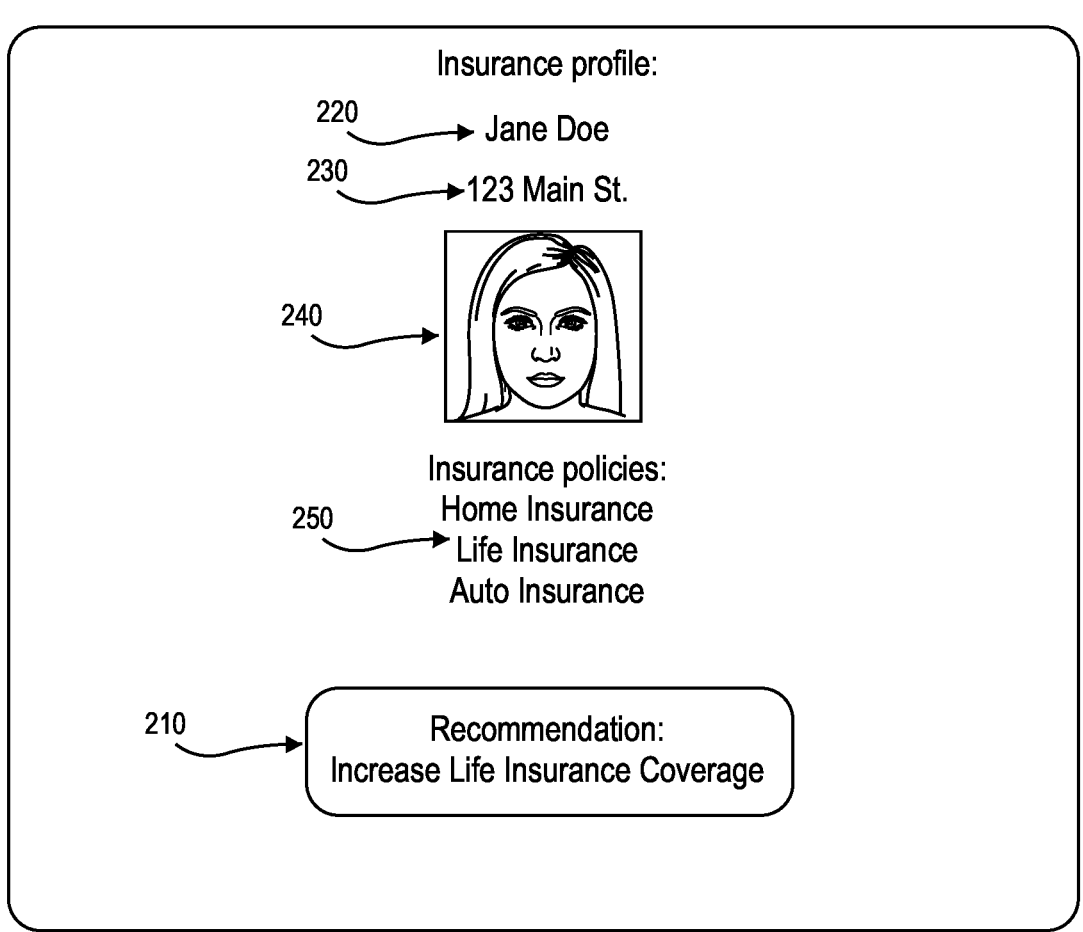
FIG. 2 illustrates an exemplary screen displaying an insurance change recommendation.

FIG. 2 illustrates an exemplary display screen 200 (e.g., displayed on the insurance customer computing device 155 via an insurance app) displaying an insurance change recommendation 210. The exemplary screen 200 may also include: a name of the insurance customer 220, an address of the insurance customer 230, a profile picture of the insurance customer 240, and a list of insurance policies of the insurance customer 250.

The exemplary system 100 may also include insurance agent computing device 165, which may comprise any suitable device, such as a computer, a smartphone, a laptop, a phablet, etc. The insurance agent computing device 165 may be operated by insurance agent 160. In some examples, the insurance agent 160 views, approves, and/or modifies the recommendation for an insurance change before it is sent to the insurance customer computing device 155.

The exemplary system 100 may also include insurance underwriter computing device 175, which may comprise any suitable device, such as a computer, a smartphone, a laptop, a phablet, etc. The insurance underwriter computing device 175 may be operated by insurance underwriter 170. In some examples, the insurance underwriter 170 views, approves, and/or modifies the recommendation for an insurance change before it is sent to the insurance customer computing device 155.

The exemplary system 100 may also include insurance administrator computing device 195, which may comprise any suitable device, such as a computer, a smartphone, a laptop, a phablet, etc. The administrator computing device 195 may be operated by administrator 190. In some examples, the insurance administrator 190 facilitates the training of ML learning algorithm(s), as will be described elsewhere herein.

In addition, further regarding the example system 100, the illustrated exemplary components may be configured to communicate, e.g., via a network 104 (which may be a wired or wireless network, such as the internet), with any other component. Furthermore, although the example system 100 illustrates only one of each of the components, any number of the example components are contemplated (e.g., any number of external databases, ground truth insurance databases, email/text message databases, insurance information aggregator databases, government records databases, police reports databases, court records, insurance customers, insurance customer computing devices, insurance agents, insurance agent computing devices, insurance underwriters, insurance underwriter computing devices, administrators, administrator computing devices, insurance computing devices, etc.).

Exemplary AI and/or ML Techniques

Broadly speaking, the AI or ML training application 126 may train an AI or ML algorithm to, for example, determine an insurance change recommendation trigger (e.g., determine that an insurance change recommendation trigger has occurred) and/or determine a recommendation for an insurance policy change. Although the following discussion refers to an ML algorithm, it should be appreciated that it applies equally to ML algorithms and/or AI algorithms.

Figures 3, 4:
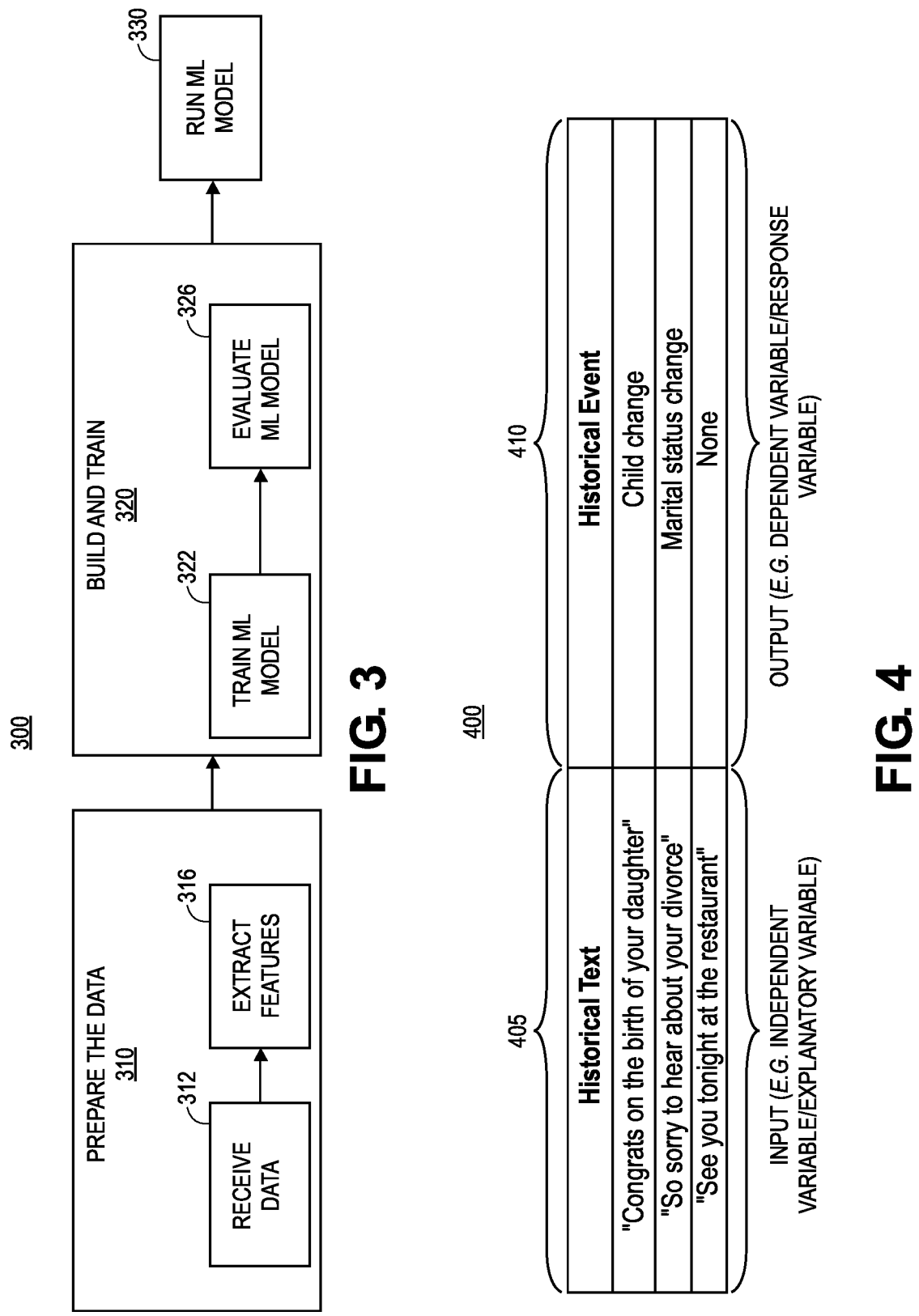
FIG. 3 illustrates a block diagram of an exemplary machine learning modeling method for training and evaluating a machine learning model.
FIG. 4 illustrates an exemplary table of historical information that may be used to train an AI or ML algorithm.

FIG. 3 is a block diagram of an exemplary machine learning modeling method 300 for training and evaluating a machine learning model (e.g., a machine learning algorithm), in accordance with various embodiments. In some embodiments, the model "learns" an algorithm capable of performing the desired function, such as determining that an insurance change recommendation trigger has occurred and/or determining a recommendation for an insurance policy change. It should be understood that the principles of FIG. 3 may apply to any machine learning algorithm discussed herein.

At a high level, the machine learning modeling method 300 includes a block 310 to prepare the data, a block 320 to build and train the model, and a block 330 to run the model.

Block 310 may include sub-blocks 312 and 316. At block 312, the AI or ML training application 126 may receive the historical information to train the machine learning algorithm. In some embodiments where the insurance recommendation ML algorithm determines an insurance change recommendation trigger, the insurance recommendation ML algorithm may determine the insurance change recommendation trigger based upon text (e.g., from an email, a text message, a phone conversation transcribed by a natural language processing (NLP) algorithm or human, a word document, a text conversation with a chatbot, etc.) input into the insurance recommendation ML algorithm. In some such examples, the historical information may include, for example: (i) historical text, and/or (ii) historical events.

In some embodiments, the insurance recommendation ML algorithm may be trained using the above (i) as an input to the machine learning model (e.g., also referred to as an independent variable, or explanatory variable), and the above (ii) is used as the output of the machine learning model (e.g., also referred to as a dependent variable, or response variable). Put another way, the above (i) (e.g., the historical text) may have an impact on (ii) (e.g., the historical events); and the insurance recommendation ML algorithm may be trained to find this impact.

In some embodiments, the historical information may be held in the form of a table, such as the exemplary table 400 illustrated in the example of FIG. 4. The illustrated exemplary table 400 includes historical text 405, and historical events 410. It should be appreciated that the data table 400 is one example data structure associated with the historical information. In other examples, the insurance change computing device 102 may implement one or more alternate data structures that represent the historical information.

However, the insurance recommendation ML algorithm may determine the insurance change recommendation trigger by techniques other than via inputted text. For example, the insurance recommendation ML algorithm may receive an input of insurance information comprising an insurance profile, and compare the received insurance profile to a previous insurance profile to determine the insurance change recommendation trigger. For instance, the comparison may show a change in income (e.g., a monetary income change event), an addition or removal of a spouse (e.g., a marital status change event), an addition or removal of a child (e.g., a child change event), an address change (e.g., a home location change event), a change to a list of possessions (e.g. a list of possessions for a homeowners insurance policy) (e.g., a possession change event), etc. In some such examples, the table 400 additionally or alternatively includes an input variable of historical information of an insurance customer (e.g., historical insurance profiles of historical insurance customers, historical updates to historical insurance profiles of historical insurance customers, etc.).

Further regarding (ii) above, it may be noted that examples of historical events include historical: child changes (e.g., birth or adoption of a child, death of a child, etc.); marital status changes; monetary income changes; possession changes; and/or home location changes.

In some embodiments where the insurance recommendation ML algorithm determines an insurance change recommendation, the insurance recommendation ML algorithm may determine the insurance change recommendation based upon insurance change events. In some examples, the insurance recommendation ML algorithm first determines that an insurance change recommendation trigger has occurred based upon the child change event; and then, in response to the determination of the insurance change recommendation trigger, determines the insurance change recommendation. However, in some embodiments, the ML algorithm simultaneously determines both the insurance change recommendation trigger, and the insurance change recommendation (e.g., based upon received insurance customer information, the ML algorithm determines a trigger to recommend adding, canceling, or changing a life insurance policy, etc.).

In some examples where the insurance recommendation ML algorithm determines an insurance change recommendation, the historical information may include, for example: (a) historical insurance customer information, (b) historical events, and/or (c) historical insurance changes.

In some embodiments, the insurance recommendation ML algorithm may be trained using the above (a)-(b) as inputs to the machine learning model (e.g., also referred to as independent variables, or explanatory variables), and the above (c) is used as the output of the machine learning model (e.g., also referred to as a dependent variable, or response variable). Put another way, the ML algorithm may be trained to find the impact of the independent variables on the dependent variable.

In some embodiments, the historical information may be held in the form of a table, such as the exemplary table 500 illustrated in the example of FIG. 5A. The illustrated exemplary table 500 includes historical insurance customer information 505, and historical events 510. It should be appreciated that the data table 500 is one exemplary data structure associated with the historical information. In other examples, the insurance change computing device 102 may implement one or more alternate data structures that represent the historical information.

The historical insurance customer information (e.g., (a) above) may include any information of historical insurance customers, such as historical insurance customer: insurance policy information, income information, family information (e.g., number of children, marital status, etc.), address information, age information, gender information, marital status information (e.g., married or unmarried), etc.

Further regarding (b) above, it may be noted that examples of historical events include historical: child changes (e.g., birth or adoption of a child, death of a child, etc.); marital status changes (e.g., a change to married, or a change to unmarried); monetary income changes; possession changes; and/or home location changes.

Further regarding (c) above, examples of the historical insurance change events 515 may include historical addition, removal and/or modification of insurance policies. Examples of the modification to the insurance policies include: increasing or decreasing a coverage amount; adding or removing an item to an inventory list (e.g. of a homeowners insurance policy); adding, removing, and/or changing a beneficiary on an insurance policy; etc.

Still further regarding (c) above, the historical change events 515 may include associated information. Examples of the associated information include: premium amounts, coverage amounts, beneficiary information, etc. For instance, if the historical change event is adding a life insurance policy, the historical change event may include associated information of the added life insurance policy (e.g., premium amounts of the life insurance, life insurance coverage amount, term of years of the life insurance policy, etc.). Thus, the insurance recommendation ML algorithm may be trained to determine and/or recommend premium amounts, coverage amounts, beneficiary information, etc.

Generally, the machine learning model is trained to identify how each of the input variables may influence the output variables. For example, the insurance recommendation ML algorithm may learn that following a child change event, it is common to add an additional life insurance policy, etc.

Additionally or alternatively, in some examples where the insurance recommendation ML algorithm determines an insurance change recommendation, the historical information may include, for example: (1) historical insurance customer profiles, (2) historical insurance claims payout data, and/or (3) historical insurance policies (e.g., of the historical insurance claim payout).

In some embodiments, the insurance recommendation ML algorithm may be trained using the above (1) as an input to the machine learning model (e.g., also referred to as an independent variable, or explanatory variable), and the above (2)-(3) as the output of the machine learning model (e.g., also referred to as a dependent variable, or response variable). Put another way, the ML algorithm may be trained to find the impact of the independent variable on the dependent variables.

In some embodiments, the historical information may be held in the form of a table, such as the exemplary table 550 illustrated in the example of FIG. 5B. The illustrated exemplary table 550 includes historical insurance profiles 555, historical insurance claims payout data 560, and historical insurance policies 565. It should be appreciated that the data table 550 is one exemplary data structure associated with the historical information. In other examples, the insurance change computing device 102 may implement one or more alternate data structures that represent the historical information.

The historical insurance customer profile (e.g., (1) above) may include any information, such as historical insurance customer: insurance policy information, income information, family information (e.g., number of children, marital status, etc.), address information, age information, gender information, marital status information (e.g., married or unmarried), etc. However, any of the information may be removed (or not included in the first place) to anatomize the data.

Generally, the machine learning model is trained to identify how each of the input variables may influence the output variables. For example, the insurance recommendation ML algorithm may learn that certain characteristics of the historical insurance profiles are correlated with large insurance claims payouts, and thus base the recommendations for changes in insurance policy changes on the correlation.

Moreover, the insurance recommendation ML algorithm may be trained on combinations of data from the tables 400, 500, 550 (e.g., the tables 400, 500, 550 are not mutually exclusive).

Any of the historical information discussed above (e.g., in any of the tables 400, 500, 550, etc.) may come from any suitable source. For example, the historical information may be received (e.g., by the one or more processors 120) from the ground truth insurance database 140, which will be described in further detail elsewhere herein. In other examples, the historical information may be received from the internal database 118, external database 180, email/text message database 142, insurance information aggregator database 144, government records database 146, and/or the police reports database 148.

In addition, it may be noted that the insurance recommendation ML algorithm may be any suitable ML algorithm, such as a deep learning algorithm, a neural network, a convolutional neural network, etc.

In some particular embodiments, the insurance recommendation ML algorithm determines an optimal insurance coverage level (e.g., an optimal death benefit level of a life insurance policy, an optimal coverage amount for an auto insurance policy, etc.) for an insurance customer, and compares the optimal coverage level to a current coverage level. In one working example of this, the insurance recommendation ML algorithm uses the text of an email to determine a child change event (e.g., the insurance customer has had a child); the insurance recommendation ML algorithm then compares an optimal amount of life insurance to a current coverage level, and then recommends adding an additional life insurance policy with a particular coverage amount based upon the comparison.

It should be appreciated that while the foregoing sets out some input factors to the machine learning model, in other embodiments, additional, alternate, or fewer factors are used. In some embodiments, an input to the machine learning model trained at block 320 may be the output of another machine learning model. For example, a first ML algorithm may be trained to determine that the insurance recommendation trigger has occurred, and a second ML algorithm may be trained to determine the recommendation for an insurance policy change. In this example, an output of the first ML model trained to determine that the insurance recommendation trigger has occurred may be an input to the second ML model trained at block 320 (e.g., the first ML model determines that the insurance customer has had a child, and the second ML model receives the determined child change event, and determines to recommend adding a life insurance policy).

At block 316 the AI or ML training application 126 may extract features from the received data, and put them into vector form. For example, the features may correspond to the values associated with the historical data used as input factors. Furthermore, at block 316, the received data may be assessed and cleaned, including handling missing data and handling outliers. For instance, missing records, zero values (e.g., values that were not recorded), incomplete data sets (e.g., for scenarios when data collection was not completed), outliers, and inconclusive data may be removed.

Block 320 may include sub-blocks 322 and 326. At block 322, the machine learning (ML) model is trained (e.g. based upon the data received from block 310). In some embodiments where associated information is included in the historical information (e.g., in (c) above), the ML model "learns" an algorithm capable of calculating or predicting the target feature values (e.g., determining premium amounts, coverage amounts, beneficiary information, etc.) given the predictor feature values.

At block 326, the AI or ML training application 126 may evaluate the machine learning model, and determine whether or not the machine learning model is ready for deployment.

Further regarding block 326, evaluating the model sometimes involves testing the model using testing data or validating the model using validation data. Testing/validation data typically includes both predictor feature values and target feature values (e.g., including known inputs and outputs), enabling comparison of target feature values predicted by the model to the actual target feature values, enabling one to evaluate the performance of the model. This testing/validation process is valuable because the model, when implemented, will generate target feature values for future input data that may not be easily checked or validated.

Thus, it is advantageous to check one or more accuracy metrics of the model on data for which the target answer is already known (e.g., testing data or validation data, such as data including historical information, such as the historical information discussed above), and use this assessment as a proxy for predictive accuracy on future data. Exemplary accuracy metrics include key performance indicators, comparisons between historical trends and predictions of results, cross-validation with subject matter experts, comparisons between predicted results and actual results, etc.

In one working example, the validation data comes only from the ground truth insurance database 140, whereas the training data comes from any source (e.g., the ground truth insurance database 140, email/text message database 142, insurance information aggregator database 144, government records database 146, police reports database 148, external database 180, and/or internal database 118). Advantageously, this improves accuracy because, as will be discussed elsewhere herein, the ground truth insurance database 140 may hold more accurate and/or reliable information than other components.

At block 330, the AI or ML training application 126 runs the ML model. For example, customer information may be routed to the trained machine learning algorithm to determine the insurance change recommendation trigger and/or the recommendation for an insurance policy change.

Figure 6:
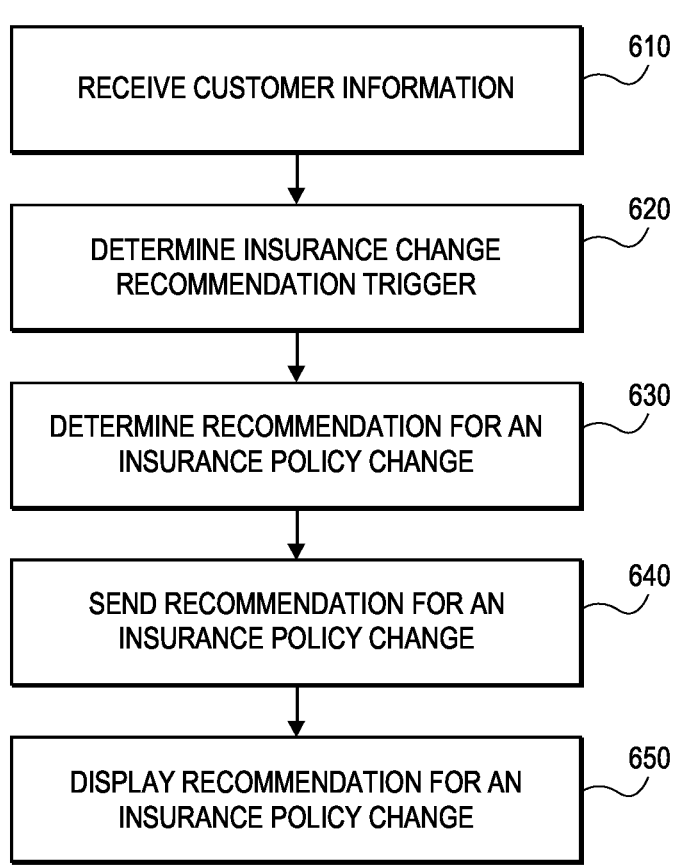
FIG. 6 illustrates an exemplary computer-implemented method or implementation of recommending a change in insurance coverage.

Exemplary Computer-Implemented Methods—Recommending a Change in Insurance Coverage FIG. 6 shows an exemplary computer-implemented method or implementation 600 of recommending a change in insurance coverage. Although the following discussion refers to the exemplary method or implementation 600 as being performed by the one or more processors 120, it should be understood that any or all of the blocks may be alternatively or additionally performed by any other suitable component as well (e.g., the insurance customer computing device 155, the insurance agent computing device 165, the insurance underwriter computing device 175, the administrator computing device 195, etc.).

The exemplary implementation 600 may begin at block 610 when the one or more processors 120 receive customer information (e.g., customer information of an insurance customer).

The customer information may comprise any suitable information. Examples of the customer information include: (i) emails, (ii) insurance profiles, (iii) updates to insurance profiles, (iv) interactions between the insurance customer and a chatbot, and/or (v) interactions between an insurance agent 160 and the insurance customer 150 (e.g., a recording of a telephone conversation, etc.).

At block 620, the one or more processors 120 determine that an insurance change recommendation trigger has occurred. For example, the one or more processors 120 may determine that they insurance change recommendation trigger has occurred by routing the customer information into an insurance recommendation machine learning algorithm (e.g., trained as described elsewhere herein).

Moreover, determining the trigger at this block provides advantages over prior systems. For example, in prior systems, the insurance customer 150 may have to call her insurance agent 160, and explain her situation (or change in situation) to the insurance agent 160. The insurance agent would then have to prepare a recommendation for her. This process is cumbersome and inefficient. Moreover, if the insurance customer 150 never thought to contact her insurance agent 160, the insurance customer 150 would never even receive a recommendation for a change in an insurance policy. In contrast, by automatically determining the insurance change recommendation trigger at block 620, the techniques described herein: (i) result in a more efficient process (e.g., the insurance change recommendation may be automatically determined [e.g., from emails, text messages, profile updates, etc.] without the need for the insurance customer 150 explaining her situation to the insurance agent 160); and (ii) reduce errors/missed points where insurance changes should be recommended (e.g., in prior systems, if the insurance customer 150 did not contact her insurance agent 160, she may never receive a recommendation for a change in insurance coverage).

As will be seen, the insurance recommendation trigger may be associated with any kind of insurance policy. For example, the insurance recommendation trigger may be associated with: a life insurance policy; a homeowners insurance policy; a renters insurance policy; an auto insurance policy; an umbrella insurance policy; and/or a disability insurance policy.

Furthermore, the one or more processors 120 may determine that the insurance change recommendation trigger has occurred by determining that an event of the insurance customer has occurred. Examples of the event include: a child change event; a marital status change event; a monetary income change event; a possession change event; and/or a home location change event. The one or more processors 120 may thus determine (e.g., via the insurance recommendation machine learning algorithm) a trigger and an associated event.

In some examples, the customer information comprises an email, and the one or more processors 120 analyze the email to determine the insurance recommendation trigger. For example, the one or more processors 120 may apply an NLP algorithm (e.g., an NLP algorithm that is part of the insurance recommendation machine learning algorithm, or separate from the insurance recommendation machine learning algorithm) to analyze the email. The NLP algorithm may determine words or phrases in the email that the insurance recommendation machine learning algorithm uses to determine the insurance recommendation trigger.

In one working example, the email includes the phrase "congrats on the birth of your son," which causes the insurance recommendation machine learning algorithm to determine an insurance recommendation trigger including a child change event (e.g., including as addition of a son). In another example, the email includes the phrase "please sign the attached divorce paperwork," which causes the insurance recommendation machine learning algorithm to determine an insurance recommendation trigger including a marital status change event.

Additionally or alternatively, the customer information may comprise an insurance customer profile (e.g., of an app of the insurance company) of the insurance customer; and the one or more processors 120 may use the insurance profile to determine the insurance change recommendation trigger. For example, the one or more processors 120 may route the insurance profile to the insurance recommendation machine learning algorithm to determine the insurance change recommendation trigger.

Additionally or alternatively, the one or more processors 120 may: first determine an optimal insurance policy for the insurance customer based upon the insurance profile of the insurance customer (e.g., by using a lookup table, a machine learning algorithm, such as the insurance recommendation machine learning algorithm, or by any other suitable technique, etc.); and, second compare the optimal insurance policy to a current insurance policy of the insurance customer indicated by the insurance profile of the insurance customer to thereby determine if an insurance change recommendation trigger has occurred. This may be done with or without use of the insurance recommendation machine learning algorithm.

The insurance customer profiles may include any information, such as insurance customer: insurance policy information, income information, family information (e.g., number of children, marital status, etc.), address information, age information, gender information, marital status information (e.g., married or unmarried), etc. However, any of the information may be removed (or not included in the first place) to anatomize the data when routing to the insurance recommendation ML algorithm.

Additionally or alternatively, the customer information may comprise an update to an insurance profile (e.g., of an app of the insurance company) of the insurance customer; and the one or more processors 120 may use the update to determine the insurance change recommendation trigger. For example, the one or more processors 120 may receive an update to an insurance profile adding a spouse, thereby causing the one or more processors 120 to determine a marital status change event. The one or more processors 120 may route the insurance profile update to the insurance recommendation machine learning algorithm to determine the insurance change recommendation trigger; alternatively, the one or more processors 120 may make the determination without the use of the insurance recommendation machine learning algorithm (e.g., the one or more processors 120 automatically determine that a child change event has occurred when a user adds a child to her profile).

Additionally or alternatively, the customer information may comprise audio data of a conversation between the insurance customer 150 and an insurance agent 160. For example, an NLP algorithm (e.g., part of or separate from the insurance recommendation machine learning algorithm) may convert the audio data to text so that it may be analyzed by the insurance recommendation machine learning algorithm.

Additionally or alternatively, the customer information may comprise an interaction between a chatbot and/or voice bot and the insurance customer 150 (e.g., via text or phone call). For example, the insurance customer 150 may ask the chatbot and/or voice bot, "I just got married. Should any of my insurance policies be updated?" In some examples, the chatbot and/or voice bot may also ask the insurance customer 150 questions. For example, the chatbot and/or voice bot may ask the insurance customer 150, "have you recently moved?" The insurance recommendation machine learning algorithm may determine the insurance change recommendation trigger based upon the interaction between the insurance customer 150 and the chatbot and/or voice bot.

The chatbot and/or voice bot may be any suitable chatbot and/or voice bot, such as a generative pre-trained transformer (GPT) chatbot. The chatbot and/or voice bot may be hosted by the insurance change computing device 102. The chatbot and/or voice bot may be programmed to simulate human conversation, interact with users, understand their needs, and recommend an appropriate line of action with minimal and/or no human intervention, among other things. This may include providing the best response of any query that it receives and/or asking follow-up questions.

In some embodiments, the voice bots or chatbots discussed herein may be configured to utilize AI and/or ML techniques. For instance, the voice bot or chatbot may be a ChatGPT chatbot. The voice bot or chatbot may employ supervised or unsupervised machine learning techniques, which may be followed or used in conjunction with reinforced or reinforcement learning techniques. The voice bot or chatbot may employ the techniques utilized for ChatGPT.

Noted above, in some embodiments, a chatbot or other computing device may be configured to implement ML, such that insurance change computing device 102 "learns" to analyze, organize, and/or process data without being explicitly programmed. ML may be implemented through ML methods and algorithms ("ML methods and algo-rithms"). In one exemplary embodiment, the one or more processors 120 may be configured to implement ML methods and algorithms.

For example, in one aspect, the insurance change computing device 102 may initiate a chat session over the network 104 with an insurance customer computing device 155, e.g., as part of a process for recommending a change in insurance coverage. The chatbot and/or voice bot may receive utterances from the insurance customer 150, e.g., the input from the user from which the chatbot and/or voice bot needs to derive intents from. The utterances may be processed using NLP techniques and/or ML techniques to recognize what the user says, understand the meaning, determine the appropriate action, and/or respond with language the user can understand.

At block 630, the one or more processors 120 determine the recommendation for the insurance policy change. For example, in response to the determination of the insurance recommendation trigger, the one or more processors 120 may determine the recommendation for the insurance policy change.

In some embodiments, blocks 620 and 630 may be performed simultaneously (e.g., the insurance change recommendation trigger comprises a trigger to add, remove, or modify an insurance policy). For example, the trigger may be a trigger to add an auto insurance policy (e.g., the event is a possession change event indicating that the insurance customer has acquired a new vehicle). However, blocks 620 and 630 may also be performed separately. For instance, the insurance change recommendation trigger may simply indicate that an event of the insurance customer has occurred (along possibly with the type of the event), and the recommendation for an insurance policy is determined separately at block 630.

In one working example, the one or more processors 120 determine that a monetary income change event has occurred (e.g., at block 620); and then, based upon the determination, determine the recommendation of the insurance policy change (e.g., at block 630) to be modifying a coverage level of an umbrella insurance policy.

In another working example, the one or more processors 120 determine that a possession change event comprising that the insurance customer has acquired a new automobile has occurred (e.g., at block 620); and then, based upon the determination, determine the recommendation of the insurance policy change (e.g., at block 630) to be adding a new auto insurance policy.

In yet another working example, the one or more processors 120 determine that a marital status change event has occurred (e.g., at block 620); and then, based upon the determination, determine the recommendation of the insurance policy change (e.g., at block 630) to be changing a beneficiary of a life insurance policy.

In yet another working example, the one or more processors 120 determine that a possession change event has occurred (e.g., at block 620); and then, based upon the determination, determine the recommendation of the insurance policy change (e.g., at block 630) to be including a possession of the possession change event in an inventory of a homeowners insurance policy.

At block 640, the one or more processors 120 send the recommendation for an insurance policy change. The recommendation may be sent to any suitable component, such as the insurance customer computing device 155, the insurance agent computing device 165, the insurance underwriter computing device 175, and/or the administrator computing device 195.

In some embodiments, the recommendation for an insurance policy change is first sent to insurance agent computing device 165 for approval, rejection, or modification before sending to the insurance customer computing device 155. In one working example, the recommendation for an insurance policy change comprises adding a life insurance policy, and is sent to the insurance agent computing device 165; the insurance agent 160 (via the insurance agent computing device 165) then adds a recommended amount of death benefit coverage (or modifies an amount of death benefit coverage indicated in the recommendation) to the recommendation for an insurance policy change; and the modified recommendation for an insurance policy change is then sent to the insurance customer computing device 155.

In some embodiments, the recommendation for the insurance policy change is sent as an email and/or a text message.

In some embodiments, the recommendation for an insurance policy change is sent as part of an insurance app (e.g., an app running on the insurance agent computing device 165 and/or the insurance customer computing device 155, etc.).

At block 650, the recommendation for an insurance policy change is displayed (e.g., on a display of any of the insurance customer computing device 155, the insurance agent computing device 165, the insurance underwriter computing device 175, and/or the administrator computing device 195). FIG. 2 illustrates one such example of the recommendation for an insurance policy change being displayed on the insurance customer computing device 155. The display may include any information of the recommendation for an insurance policy change, such as an insurance premium change for the recommendation, etc.

Furthermore, the insurance customer 150 may opt into or out of the program for the recommendations for an insurance policy changes, and may further customize how she participates in the program. For example, the insurance customer 150 may consent to having a large number of emails sent to the one or more processors 120 for analysis, and possible recommendation of insurance changes. In another example, the insurance customer 150 may consent to having a telephone conversation sent to the one or more processors 120 for analysis, and possible recommendation of insurance changes. In yet another example, the insurance customer 150 may consent to receiving recommendations for an insurance policy changes via email but not text message (or vice versa).

It should be understood that not all blocks and/or events of the exemplary signal diagram(s) and/or flowchart(s) are required to be performed. Moreover, the exemplary signal diagram(s) and/or flowchart(s) are not mutually exclusive (e.g., block(s)/events from each example signal diagram and/or flowchart may be performed in any other signal diagram and/or flowchart). The exemplary signal diagrams and/or flowcharts may include additional, less, or alternate functionality, including that discussed elsewhere herein.

Additional Exemplary Embodiments—Recommending a Change in Insurance Coverage

In one aspect, a computer-implemented method for recommending a change in insurance coverage may be provided. The method may comprise: (1) receiving, via one or more processors, customer information of an insurance customer; (2) determining, via the one or more processors, that an insurance change recommendation trigger has occurred by routing the customer information into an insurance recommendation machine learning algorithm; and/or (3) in response to determining the insurance change recommendation trigger, sending, via the one or more processors, a recommendation for an insurance policy change for the insurance customer. The method may include additional, fewer, or alternate actions, including those discussed elsewhere herein.

In some embodiments, the customer information may include: (i) an email generated by a computing device of the insurance customer, (ii) an insurance profile of the insurance customer, (iii) an update to the insurance profile of the insurance customer, (iv) an interaction between the insurance customer and a chatbot, and/or (v) an interaction between an insurance agent and the insurance customer.

In some embodiments: the customer information may include an email generated by a computing device of the insurance customer; upon receipt of the customer information, the insurance recommendation machine learning algorithm may analyze the email to generate analyzed email information; and/or the insurance recommendation machine learning algorithm may determine that the insurance change recommendation trigger has occurred based upon the analyzed email information.

In some embodiments: the insurance recommendation machine learning algorithm includes a natural language processing (NLP) machine learning algorithm; the insurance recommendation machine learning algorithm may analyze the email to generate the analyzed email information by applying the NLP machine learning algorithm to the email to generate a word or phrase; and/or the analyzed email information may include the word or phrase.

In some embodiments, the customer information may include an insurance profile of the insurance customer, and/or wherein the insurance recommendation machine learning algorithm determines that the insurance change recommendation trigger has occurred by: determining an optimal insurance policy for the insurance customer based upon the insurance profile of the insurance customer; and/or comparing the optimal insurance policy to a current insurance policy of the insurance customer indicated by the insurance profile of the insurance customer.

In some embodiments, the customer information may include an update to an insurance profile of the insurance customer, and wherein the method may further include: receiving, via the one or more processors, and from an insurance company application (app), the update to the insurance customer profile of the insurance customer.

In some embodiments, the method may further include: receiving, via the one or more processors, from a computing device of the insurance customer, a request for communication; and/or in response to receiving the request for communication, initiating, via the one or more processors, an interaction between a chatbot and the insurance customer; and/or wherein the interaction between the chatbot and the insurance customer comprises: (i) at least one question and/or answer sent from the chatbot to an insurance customer computing device, and (ii) at least one question and/or answer sent from the insurance customer computing device to the chatbot; and/or wherein information of the insurance customer comprises the interaction between the chatbot and the insurance customer.

In some embodiments, the method may further include receiving, via the one or more processors, audio data of a conversation between the insurance customer and an insurance agent, wherein the conversation corresponds to an interaction between the insurance customer and the insurance agent, and wherein the information of the insurance customer comprises the interaction between the insurance customer and the insurance agent.

In some embodiments, the insurance change trigger recommendation may include a trigger to recommending changing: a life insurance policy; a homeowners insurance policy; a renters insurance policy; an auto insurance policy; an umbrella insurance policy; and/or a disability insurance policy.

In some embodiments, the insurance change trigger recommendation may include a trigger to recommend adding a new insurance policy, and/or canceling an insurance policy.

In some embodiments, the insurance recommendation machine learning algorithm determines that the insurance change recommendation trigger has occurred by determining that an event of the insurance customer has occurred, and wherein the event comprises: a child change event; a marital status change event; a monetary income change event; a possession change event; and/or a home location change event.

In some embodiments: the insurance recommendation machine learning algorithm determines that the insurance change recommendation trigger has occurred by determining that an event of the insurance customer has occurred; the event comprises a child change event comprising that the insurance customer has had a child; and/or the insurance change recommendation trigger comprises a trigger to recommend increasing life insurance coverage.

In some embodiments: the insurance recommendation machine learning algorithm determines that the insurance change recommendation trigger has occurred by determining that an event of the insurance customer has occurred; the event comprises a monetary income change event; and/or the insurance change recommendation trigger comprises a trigger to recommend modifying coverage of an umbrella insurance policy.

In some embodiments: the recommendation for the insurance policy change is based upon the determined insurance change recommendation trigger; the insurance recommendation machine learning algorithm determines that the insurance change recommendation trigger has occurred by determining that an event of the insurance customer has occurred; and/or one of: the event comprises a possession change event comprising that the insurance customer has acquired a new automobile, and the recommendation for an insurance policy change comprises a recommendation to add a new automobile insurance policy; the event comprises a marital status change event, and the recommendation for an insurance policy change comprises a recommendation to change a beneficiary of a life insurance policy; and/or the event comprises a possession change event, and the recommendation for an insurance policy change comprises a recommendation to include a possession of the possession change event in an inventory of a homeowners insurance policy.

In some embodiments, the sending the recommendation for an insurance policy change causes a display device to display: a name of the insurance customer; an address of the insurance customer; a list of insurance policies of the insurance customer; a recommended insurance policy to add, remove or modify according to the recommendation for an insurance policy change; and/or an insurance premium change of the recommendation for an insurance policy change.

In some embodiments, the method may further include: training, via the one or more processors, the insurance recommendation machine learning algorithm by inputting historical data into the insurance recommendation machine learning algorithm; and/or wherein the historical data comprises anonymized insurance policy claims data, and/or data from a ground truth insurance database; and/or wherein the historical data comprising anonymized insurance policy claims data, and/or data from a ground truth insurance database comprises: (i) independent variables comprising historical events, and/or (ii) dependent variables comprising additions of new insurance policies, removals of insurance policies, and/or modifications to insurance policies.

In some embodiments, the historical events comprise historical: child changes; marital status changes; monetary income changes; possession changes; and/or home location changes.

In some embodiments, the method may further include receiving, via the one or more processors, an indication from a computing device of the insurance customer that the insurance customer has opted into an insurance change recommendation program.

In another aspect, a computer system for recommending a change in insurance coverage may be provided. The computer system may include one or more local or remote processors, sensors, transceivers, servers, memory units, mobile devices, augmented reality glasses or headsets, extended or virtual reality headsets, smart glasses or watches, wearables, smart contacts, voice bots, chatbots, ChatGPT bots, and/or other electronic or electrical components. In one aspect, the computer system may include one or more processors configured to: (1) receive customer information of an insurance customer; (2) determine if an insurance change recommendation trigger has occurred by routing the customer information into an insurance recommendation machine learning algorithm; and/or (3) upon determination of the insurance change recommendation trigger, send a recommendation for an insurance policy change for the insurance customer. The computer system may include additional, less, or alternate functionality, including that discussed elsewhere herein.

In some embodiments, the one or more processors are further configured to send the recommendation for the insurance policy change as an email and/or a text message.

In some embodiments, the insurance recommendation machine learning algorithm may include a neural network, and the one or more processors are further configured to: train the neural network by inputting historical data into the neural network; and/or wherein the historical data comprises anonymized insurance policy claims data, and/or data from a ground truth insurance database; and/or wherein the historical data comprising anonymized insurance policy claims data, and/or data from a ground truth insurance database comprises: (i) independent variables comprising historical events, and/or (ii) dependent variables comprising additions of new insurance policies, removals of insurance policies, and/or modifications to insurance policies.

In yet another aspect, a computer device for recommending a change in insurance coverage may be provided. The computer device may include one or more local or remote processors, sensors, transceivers, servers, memory units, mobile devices, augmented reality glasses or headsets, extended or virtual reality headsets, smart glasses or watches, wearables, smart contacts, voice bots, chatbots, ChatGPT bots, and/or other electronic or electrical components. In one aspect, the computer device may include: one or more processors; and/or one or more memories coupled to the one or more processors. The one or more memories including computer executable instructions stored therein that, when executed by the one or more processors, may cause the computer device to: (1) receive customer information of an insurance customer; (2) determine if an insurance change recommendation trigger has occurred by routing the customer information into an insurance recommendation machine learning algorithm; and/or (3) upon determination of the insurance change recommendation trigger, send a recommendation for an insurance policy change for the insurance customer. The computer device may include additional, less, or alternate functionality, including that discussed elsewhere herein.

In some embodiments, the one or more memories having stored thereon computer executable instructions that, when executed by the one or more processors, further cause the computer device to: determine the recommendation for the insurance policy change by: determining an optimal death benefit level of an optimal life insurance policy of the insurance customer; and/or comparing the optimal death benefit level to a current death benefit level of a current life insurance policy of the insurance customer.

In some embodiments: the insurance recommendation machine learning algorithm is configured to determine the a recommendation for an insurance policy change based upon an insurance customer profile of the insurance customer; and/or the insurance recommendation machine learning algorithm is trained based upon historical data comprising: (i) independent variables comprising historical insurance profiles of historical insurance customers, and/or (ii) dependent variables comprising (a) historical insurance claims payout data, and/or (b) insurance policies of the historical insurance profiles.

In yet another aspect, a computer-implemented method for recommending a change in insurance coverage may be provided. The method may be implemented via one or more local or remote processors, sensors, transceivers, servers, memory units, mobile devices, augmented reality glasses or headsets, extended or virtual reality headsets, smart contacts, smart glasses or watches, wearables, voice bots, chatbots, ChatGPT bots, and/or other electronic or electrical components. In one aspect, the method may include: (1) receiving, via one or more processors, customer information of an insurance customer; (2) determining, via the one or more processors, that an insurance change recommendation trigger has occurred by routing the customer information into an insurance recommendation machine learning and/or artificial intelligence algorithm; and/or (3) in response to determining the insurance change recommendation trigger, sending, via the one or more processors, a recommendation for an insurance policy change for the insurance customer. The method may include additional, fewer, or alternate actions, including those discussed elsewhere herein.

Exemplary System—Building a Ground Truth Insurance Database

The present embodiments relate to, inter alia, building a ground truth insurance database. For example, AI and/or ML techniques may create a ground truth database for an insurance company. Information may be pulled from any source, such as an insurance application (app), insurance claims, police reports, government records, pictures of the accident (e.g., including showing road conditions), etc. For conflict resolution, sources may be cited, and conflicts may be highlighted so that a human may determine which information is correct. Summaries of incidents may be provided.

The following relates generally to using artificial intelligence (AI) and/or machine learning (ML) to recommend a change in insurance coverage. In some embodiments, one or more processors: receive customer information of an insurance customer; determine that an insurance change recommendation trigger has occurred by routing the customer information into an insurance recommendation machine learning and/or artificial intelligence algorithm; and in response to determining the insurance change recommendation trigger, send a recommendation for an insurance policy change for the insurance customer. An AI chatbot or voice bot may be used to talk to other chatbots to get information from other databases. Blockchain sources may be pulled from as well.

Figure 7:
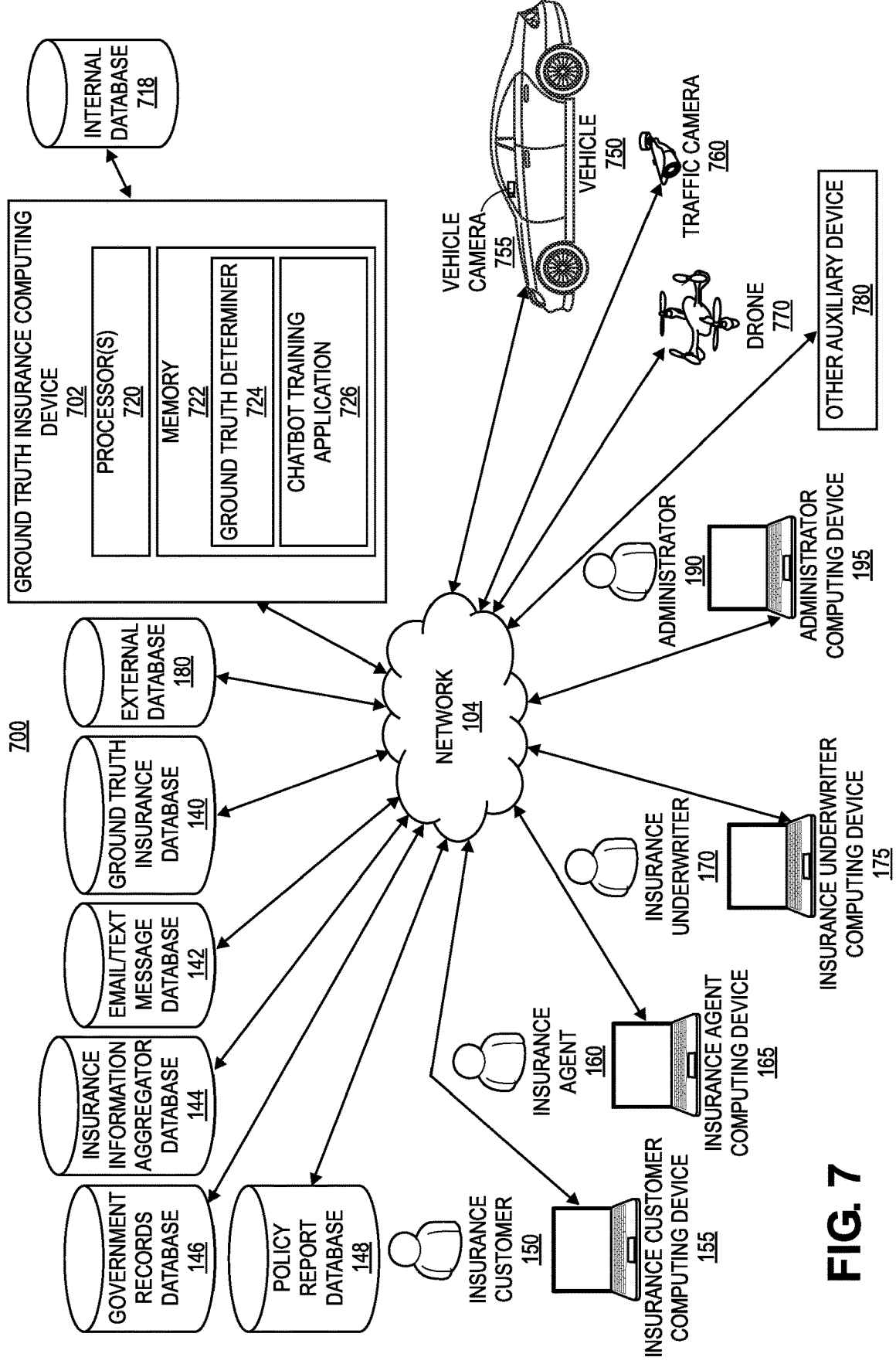
FIG. 7 illustrates an exemplary computer system for building a ground truth insurance database, according to one embodiment.

To this end, FIG. 7 illustrates an exemplary computer system 700 for building a ground truth insurance database in which the exemplary computer-implemented methods described herein may be implemented. The high-level architecture includes both hardware and software applications, as well as various data communications channels for communicating data between the various hardware and software components.

The ground truth insurance computing device 702 may include one or more processors 720 such as one or more microprocessors, controllers, and/or any other suitable type of processor. The insurance change computing device 702 may further include a memory 722 (e.g., volatile memory, non-volatile memory) accessible by the one or more processors 720, (e.g., via a memory controller). The one or more processors 720 may interact with the memory 722 to obtain and execute, for example, computer-readable instructions stored in the memory 722. Additionally or alternatively, computer-readable instructions may be stored on one or more removable media (e.g., a compact disc, a digital versatile disc, removable flash memory, etc.) that may be coupled to the ground truth insurance computing device 702 to provide access to the computer-readable instructions stored thereon. In particular, the computer-readable instructions stored on the memory 722 may include instructions for executing various applications, such as ground truth determiner 724, and/or chatbot training application 726.

An insurance company that owns the ground truth insurance computing device 702 may provide insurance to insurance customers, such as the insurance customer 150. For example, the insurance company may also provide insurance policies, such as a life insurance policy, a homeowners insurance policy, a renters insurance policy, an auto insurance policy, an umbrella insurance policy, and/or a disability insurance policy, etc. As such, in some situations, it may be useful for the insurance company to hold or have access to highly reliable insurance database information. The insurance company may use the insurance database information in any suitable way, such as recommending changes in insurance coverage, aiding underwriting, aiding insurance agents, writing insurance policies, calculating insurance premiums, determining insurance payout amounts, etc.

To this end, the ground truth determiner 724 may, inter alia, build a ground truth insurance database 140 (e.g., by determining what information to add to or include in the ground truth insurance database 140, etc.). In some examples, the ground truth determiner 724 may receive information that could potentially be added to the insurance ground truth insurance database 140 (e.g., potential insurance database information); the ground truth determiner 724 may then compare the potential insurance database information to information already in the ground truth insurance database 140 to determine if the potential insurance database information should be added to the ground truth insurance database 140. In some such examples, the ground truth determiner 724 may use an AI or ML chatbot to generate a comparison document indicating at least one difference between the potential insurance database information and the existing ground truth insurance information. For example, the comparison document may indicate that the potential insurance database information specifies that a weather condition during an auto accident was good, but the existing ground truth insurance information specifies that it was raining during the auto accident. The comparison document may then be sent for review (e.g., to the insurance agent 160, the insurance underwriter 170, the administrator 190, etc.), and/or determination of if to replace the existing ground truth insurance information with the potential insurance database information.

Figure 8:
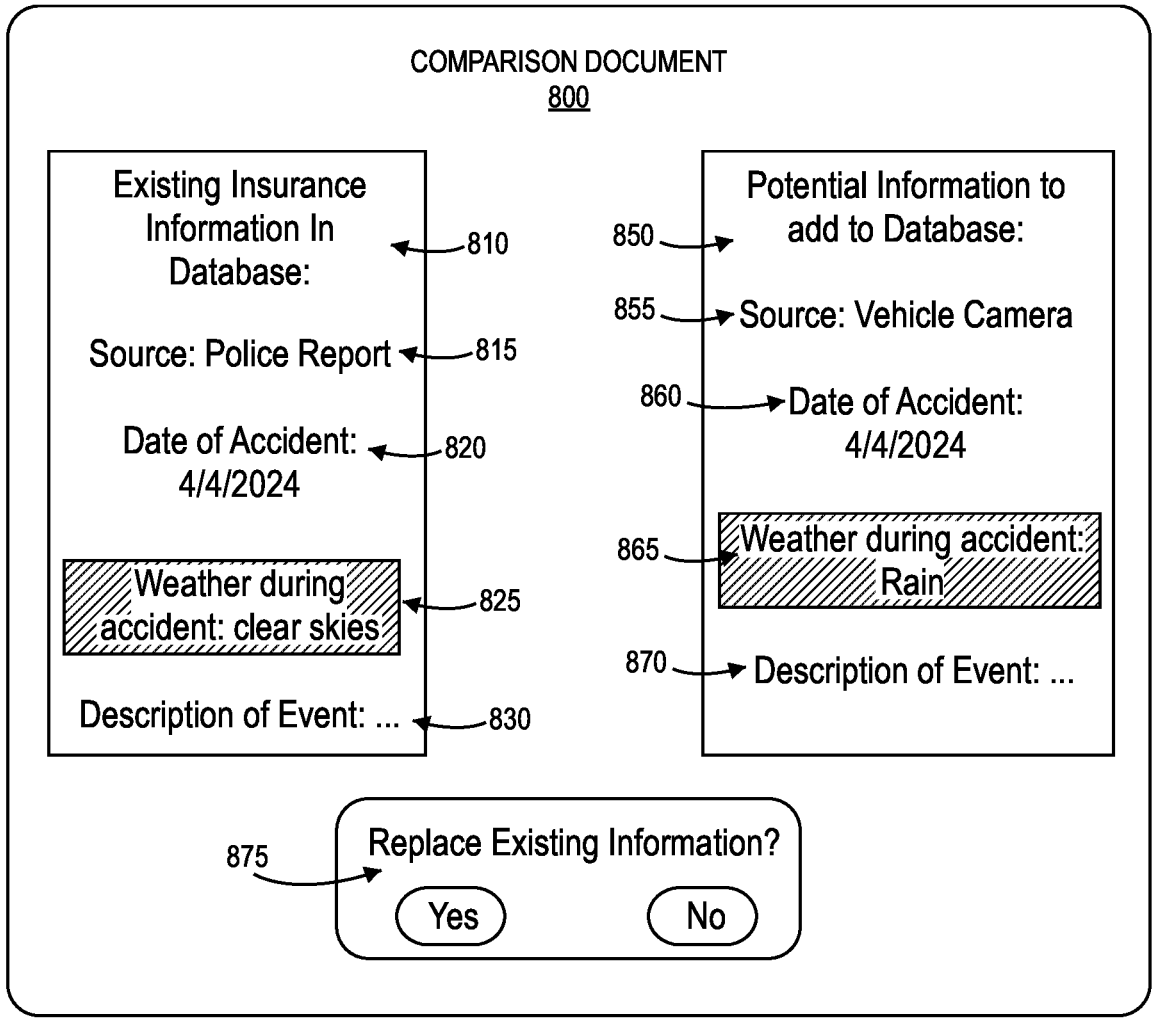
FIG. 8 illustrates an exemplary comparison document.

Exemplary comparison document 800 is shown in FIG. 8. In particular, the exemplary comparison document 800 compares information relating to an auto accident, and includes existing ground truth insurance information 810, which indicates a source of the existing insurance information 815, a date of the auto accident 820, weather condition during the accident 825, and description of event 830. The exemplary comparison document 800 further includes potential insurance database information 850, which includes source of the potential insurance database information 855, date of the auto accident 860, weather condition during the auto accident 865, and description of event 870. Moreover, in the illustrated example, there is no discrepancy between the dates of the accident 820, 860; however, there is a discrepancy between the indicated weather conditions 825, 865. As such, the weather conditions 825, 865 are highlighted, but the dates of the accident 820, 860 are not, thus facilitating review (e.g., by the insurance agent 160, the insurance underwriter 170, the administrator 190, etc.). Furthermore, the exemplary comparison document 800 includes question and selection buttons 875 to allow the reviewer to select between the potential insurance database information and the existing ground truth insurance information.

A chatbot (or voice bot) may be trained to generate such a comparison document by the chatbot training application 726. It should be appreciated that the techniques discussed herein with respect to training a chatbot via the chatbot training application 726 apply equally as well to training a voice bot. Additionally or alternatively to being trained to generate a comparison document, the chatbot or voice bot may be trained to generate a summary document (e.g., of the potential insurance database information and/or the existing ground truth insurance information, etc.). For instance, in the example of FIG. 8, the summary document for the existing ground truth insurance information 810 may be summary document 810, and the potential insurance database information 850 may be summary document 850. However, it should be appreciated that this is only an example, and the summary documents may be displayed in any suitable fashion (e.g., on separate screens, with or without highlighting, etc.).

Additionally or alternatively, the chatbot or voice bot may be trained to request or facilitate requesting information for potential entry to the ground truth insurance database 140 (e.g., chatbot generates an email that the administrator 190 may send to the police reports database 148 (or an administrator of the police reports database 148) requesting a police report). The techniques that the chatbot training application 726 uses to train the chatbot or voice bot will be discussed elsewhere herein.

The ground truth insurance database 140, in some embodiments, is owned by the insurance company that owns the ground truth insurance computing device 702. Therefore, in some such embodiments, rather than being connected to the network 104 generally, the ground truth insurance database 140 is connected to the network 104 though the ground truth insurance computing device 702 (e.g., similarly as the internal database 718).

Furthermore, the ground truth insurance database 140 may hold any suitable information. Examples of the information held by the ground truth insurance database 140 include (i) insurance company application (app) information, (ii) anonymized insurance claim information. (iii) police report information, and/or (iv) auxiliary information. The information held by the ground truth database 140 may include information of any type, such as text information, imagery information (e.g., images, video, etc.), audio information, etc.

The insurance app information may be received from any suitable source, such as the insurance customer computing device 155, the vehicle 750, the internal database 718, the insurance information aggregator database 144, etc. The insurance app information may be sent in real time directly from an insurance app running on a device (e.g., the insurance customer computing device 155, etc.). Additionally or alternatively, the insurance app information may be stored in a database (e.g., the internal database 718, the insurance information aggregator database 144, etc.) before being sent to the ground truth insurance computing device 702.

The insurance app information may include any suitable information, such as a profile of an insurance customer 150, an update to the profile of an insurance customer 150, driving information (e.g., if the app is associated with an auto insurance policy, etc.—examples of the driving information may include routes traversed, speed information, etc.), etc. It should be appreciated that the insurance customer computing device 155 (which, for example, may run the app) may include one or more processors, such as one or more microprocessors, controllers, and/or any other suitable type of processor. In addition, it should be appreciated that the insurance customer 150 may be a current insurance customer of an insurance company, or a potential insurance customer of the insurance company (e.g., a customer shopping for insurance).

The insurance profile information may include any suitable information, such as a name of the insurance customer 150, address of the customer 150, insurance policies held by the customer 150, information of the insurance policies held by the insurance customer 150 (e.g., beneficiaries listed on a life insurance policy, an inventory list for a homeowners insurance policy, etc.), etc. Any of the information may be anonymized or redacted when sending. The update to the profile information may include an update to any of the insurance profile information.

The anonymized insurance claim information may be received from any suitable source, such as from the internal database 718, the insurance information aggregator database 144, etc. The anonymized insurance claim information may correspond to any type of insurance policies (e.g., homeowners insurance policies, auto insurance policies, life insurance policies, umbrella insurance policies, etc.). The anonymized insurance claim information may include any information, such as claims payout information (e.g., an amount, and to who, etc.), premium information, cause of damage information (e.g., fire results in homeowners insurance claim, etc.), a date of a first notice of loss, other information (e.g., weather or road conditions during an auto accident, percentages of fault of drivers in an auto accident, etc.) etc.

The police report information may be received from any suitable source, such as from police reports database 148, etc. The police report information may include any suitable information. For example, the police report may include general information, such as a name of a police department of the police report, a name of a police officer of the police report, identity of a person filing a police report, an identity of a deceased person, etc. In some examples, the police report information includes information corresponding to an event (e.g., an auto accident, a house fire, etc.), and/or particular type of insurance claim. For instance, if the police report corresponds to an auto accident, the police report information may include, identification of the parties involved in the accident, percentage of fault information (e.g., a percentage of fault of the accident of first and second drivers involved in the accident, etc.), a type of vehicle involved in an accident, imagery information of the accident, road condition information, weather condition information, etc.

In another example, if the police report corresponds to a death (e.g., that may be part of a life insurance claim, etc.), the police report may include information of a cause of death, information of a scene of an accident or crime, etc. In yet another example, if the police report corresponds to an event corresponding to a homeowners insurance claim, the police report information may include information of a fire (e.g., cause of a fire, parts of a home damaged due to the fire, etc.), information of a crime (e.g., possessions stolen during a robbery crime, possessions damaged during a vandalism crime, etc.), imagery information of a home, etc.

The auxiliary information may be received from any suitable source. Examples of the sources that the auxiliary information may be received from include: a vehicle camera 755 (e.g. a camera mounted to the vehicle 750, etc.); a traffic camera 760 (e.g. a camera in a fixed position, and viewing a road); a camera attached to a building; an infrastructure device; a vehicle-to-infrastructure (V2I) device; a vehicle-to-network (V2N) device; a vehicle-to-vehicle (V2V) device; a vehicle-to-pedestrian (V2P) device; a vehicle-to-device (V2D) device; a smartwatch; a smartphone; a smart home device (e.g., a smart home hub, a smart smoke alarm, a smart refrigerator or other kitchen appliance, a smart light, a smart thermostat, a smart TV, etc.); a smart home camera; an email server; a weather device; a government database; a drone 770 (e.g., from a camera of the drone 770, etc.); and/or a newscast database. It should be appreciated that, in the exemplary system 700, other auxiliary 780 device may include, among others, any of the examples listed in this paragraph but not specifically illustrated in the exemplary system 700.

Examples of the auxiliary information include imagery information (e.g., of an auto accident, of a house fire, of hail damage to a roof, etc.), statements (e.g., statements from witnesses of an accident, etc.), insurance policy information (e.g., from the insurance aggregator database 144, the internal database 718, etc.), emails and/or text messages (e.g., from the email/text message database 142, etc.), etc.

The email/text message database 142, may hold any information, such as emails, text messages, etc. In some examples, the email/text message database 142 is owned by a company that provides emails to companies, and/or provides text messaging services to companies.

The insurance information aggregator database 144 may hold any information, such as information aggregated from other sources, such as insurance companies. For example, insurance information aggregator database 144 may hold insurance claim information, etc. In some embodiments, conflicts between information held in the insurance information aggregator database 144 are not resolved (e.g., if information between two sources conflicts, both sets of information are simply stored in the insurance information aggregator database 144).

The government records database 146, may hold any suitable information, such as government records, weather information, birth information (e.g., birth certificates, etc.), death information (e.g., death certificates), marriage and divorce information (e.g., marital records or court records), real estate information (e.g., deed information, information of real estate purchases, etc.), etc.

The police reports database 148 may hold any suitable information, such as police reports, etc. The police reports may include any information, such as notes made by police officers, conclusions reached by police officers (e.g., a percentage of fault of drivers in an auto accident), imagery information (e.g., image or video information) (e.g., of an auto accident), etc.

In addition, a comparison document, such as the exemplary comparison document 800 may be reviewed by any of the insurance agent 160, the insurance underwriter 170 and/or the administrator 190 on their respective devices. The insurance agent computing device 165, the insurance underwriter computing device 175, and/or the administrator computing device 195 may be any suitable device, such as a computer, a mobile device, a smartphone, a laptop, a phablet, a chatbot or voice bot, etc.

In addition, further regarding the example system 700, the illustrated exemplary components may be configured to communicate, e.g., via the network 104 (which may be a wired or wireless network, such as the internet), with any other component. Furthermore, although the example system 700 illustrates only one of each of the components, any number of the example components are contemplated (e.g., any number of external databases, ground truth insurance databases, email/text message databases, insurance information aggregator databases, government records databases, police reports databases, insurance customers, insurance customer computing devices, insurance agents, insurance agent computing devices, insurance underwriters, insurance underwriter computing devices, administrators, administrator computing devices, ground truth insurance computing devices, vehicles, traffic cameras, drones, auxiliary devices, etc.).

Exemplary AI or ML Chatbot or Voice Bot

Broadly speaking, the chatbot training application 726 may train any AI or ML chatbot or voice bot to perform any function (e.g., via the ground truth determiner 724 employing the AI or ML chatbot). Particular exemplary functions that the AI or ML chatbot or voice bot may be trained to perform include generating: (i) a summary document (e.g., summary documents 810, 850 of FIG. 8), (ii) a comparison document (e.g., comparison document 800 of FIG. 8), and/or (iii) a request for information (e.g., a request for a police report from an administrator of the police reports database 148, etc.). Although the following discussion may refer to an ML chatbot, it should be appreciated that the following discussion applies equally to any AI or ML chatbot or voice bot.

Generally, the chatbot and/or voice bot may be any suitable chatbot and/or voice bot, such as a generative pre-trained transformer (GPT) chatbot. The chatbot and/or voice bot may be hosted by the ground truth insurance computing device 702. The chatbot and/or voice bot may be programmed to produce documents, simulate human conversation, interact with users, understand their needs, and recommend an appropriate line of action with minimal and/or no human intervention, among other things. This may include providing the best response of any query that it receives and/or asking follow-up questions.

In some embodiments, the voice bots or chatbots discussed herein may be configured to utilize AI and/or ML techniques. For instance, the voice bot or chatbot may be a ChatGPT chatbot. The voice bot or chatbot may employ supervised or unsupervised machine learning techniques, which may be followed or used in conjunction with reinforced or reinforcement learning techniques. The voice bot or chatbot may employ the techniques utilized for ChatGPT.

Noted above, in some embodiments, a chatbot or other computing device may be configured to implement ML, such that the ground truth insurance computing device 702 "learns" to analyze, organize, and/or process data without being explicitly programmed. ML may be implemented through ML methods and algorithms ("ML methods and algorithms"). In one exemplary embodiment, the one or more processors 720 may be configured to implement ML methods and algorithms.

In some embodiments, the ML chatbot may be based upon a large language model (LLM). Such an LLM may be trained to predict a word in a sequence of words. For example, the LLM may be trained to predict a next word following a given sequence of words (e.g., "next-token-prediction"), and/or trained to predict a "masked" (e.g., hidden) word within a sequence of given sequence of words (e.g., "masked-language-modeling"). For instance, in an example of next-token-prediction, the ML chatbot may be given the sequence "Jane is a"—and the ML chatbot may predict a next word, such as "dentist," "teacher," "mother," etc. In an example of masked-language-modeling, the ML chatbot may receive the given the sequence "Jane XYZ skiing"—and the ML chatbot may fill in XYZ with "loves." "fears," "enjoys," etc.

In some embodiments, this prediction technique is accomplished through a long-short-term-memory (LSTM) model, which may fill in the blank with the most statistically probable word based upon surrounding context. However, the LSTM model has the following two drawbacks. First, the LSTM model does not rate/value individual surrounding words more than others. For instance, in the masked-language-modeling example of the preceding paragraph, skiing may most often be associated with "enjoys;" however Jane in particular may fear skiing but the LSTM model is not able to correctly determine this. Second, instead of being processed as a whole, the words of the input sequence are processed individually and sequentially, thus restricting the complexity of the relationships that may be inferred between words and their meanings.

Advantageously, some embodiments overcome these drawbacks of the LSTM model by using transformers (e.g., by using a generative pre-trained transformer (GPT) model). More specifically, some embodiments use a GPT model that includes (i) an encoder that processes the input sequence, and (ii) a decoder that generates the output sequence. The encoder and decoder may both include a multi-head self-attention mechanism that allows the GPT model to differentially weight parts of the input sequence to infer meaning and context. In addition, the encoder may leverage masked-language-modeling to understand relationships between words and produce improved responses.

Such multi-head self-attention mechanism may convert tokens (e.g., strings of text, such as a word, sentence, grouping of text, etc.) into vectors representing the importance of the token in the input sequence. In some embodiments, to accomplish this, the GPT model (e.g., employed by the ground truth determiner 724) performs the following steps. First, query, key, and value vectors are created for each token in the input sequence. Second, a similarity between the query vector for the token and the key vector of every other token is calculated by taking the dot product of the two vectors. Third, normalized weights may then be generated by feeding the output of the previous step into a softmax function. Fourth, a final vector may be generated;

the final vector may represent the importance of the token within the input sequence by multiplying the weights generated in the previous step by the value vectors of each token.

Furthermore, in some embodiments, rather than performing the previous four steps only once, the GPT model iterates the steps and performs them in parallel; at each iteration, new linear projection of the query, key, and value vectors are generated. Such iterative, parallel embodiments advantageously improve grasping of sub-meanings and more complex relationships within the input sequence data.

Further advantageously, some embodiments first train a basic model (e.g., a basic GPT model, etc.), and subsequently perform any of the following three steps on the basic model: supervised fine tuning (SFT); reward modeling; and/or reinforcement learning.

In the SFT step, a supervised training dataset is created. The supervised training dataset has known outputs for each input so that the model can learn from the correspondences between input and outputs. For example, to train the model to generate summary documents, the supervised training dataset may have: (a) inputs of (i) insurance company application (app) information, (ii) anonymized insurance claim information, (iii) police report information, and/or (iv) auxiliary information; and (b) outputs of summary documents.

In another example, to train the model to generate comparison documents, the supervised training dataset may have: (a) inputs of (i) summary documents, (ii) insurance company application (app) information, (iii) anonymized insurance claim information, (iv) police report information, and/or (v) auxiliary information; and (b) outputs of comparison documents.

In yet another example, to train the model to generate requests for information, the supervised training dataset may have: (a) inputs of indications of missing information (e.g., administrator 190 contacts the chatbot with the question "please draft an email requesting a police report corresponding to insurance claim XYZ"), and (b) outputs of requests for information (e.g., in the form of a draft email or other message for the administered 190 to send to an administrator of the police reports database 148, or an email or other message that the chatbot sends directly to the administrator of the police reports database 148, etc.).

The supervised training dataset may be received (e.g., by the one or more processors 702) from any source (or combination of sources). For example, the supervised training dataset may be received from any combination of the: ground truth insurance database 140, email/text message database 142, insurance information aggregator database 144, government records database 146, police reports database 148, external database 180, internal database 718, insurance customer computing device 155, insurance agent computing device 165, insurance underwriter computing device 175, and/or administrator computing device 195.

In some examples where the model generates summary documents, the inputs of the supervised training dataset are received from the ground truth insurance database 140, email/text message database 142, insurance information aggregator database 144, government records database 146, police reports database 148, external database 180, and/or internal database 718; whereas, the outputs of the supervised training dataset are received from the insurance customer computing device 155, insurance agent computing device 165, insurance underwriter computing device 175, and/or administrator computing device 195. For instance, an input of insurance claim information of an insurance claim may be received from the insurance information aggregator database 144; and an insurance agent 165 or administrator 190 may write a summary document corresponding to the insurance claim to thereby create the corresponding output for the supervised training dataset.

Training the basic model on the supervised training dataset may create the SFT model; and subsequent to creating the SFT model, the chatbot training application 726 may perform reward modeling. In reward modeling, the SFT may be fed input prompts, and may output multiple outputs (e.g., 2-10 outputs, etc.) for each input. The multiple outputs for each input may be achieved by, for example, randomness, or by controlling a predictability setting. A user (e.g., the administrator 190, etc.) may then rank the multiple outputs for each input, thus allowing the model to associate each output with a reward (e.g., a scalar value). And the ranked outputs may then be used to further train the SFT model. For instance, the SFT model may receive an input of insurance claim information of an insurance claim, and create seven output summary documents; the administrator 190 may then rank the seven output summary documents; and the rankings may then be fed back into the model to further train the model. Via this reward modeling step, the chatbot training application 726 may create a policy that the model learns. The policy may comprise a strategy for the model to maximize its reward.

Subsequently, the chatbot training application 726 may further train the model via reinforcement learning. Here, further inputs are fed into the model, and the model then generates, based upon the policy learned during reward modeling, (i) outputs corresponding to the inputs, and (ii) rewards values (e.g., scalar values) corresponding to the input/output pairs. The rewards values may then be fed back into the model to further evolve the policy.

In some embodiments, the reward modeling and reinforcement learning steps may be iterated through any number of times.

Figure 9:
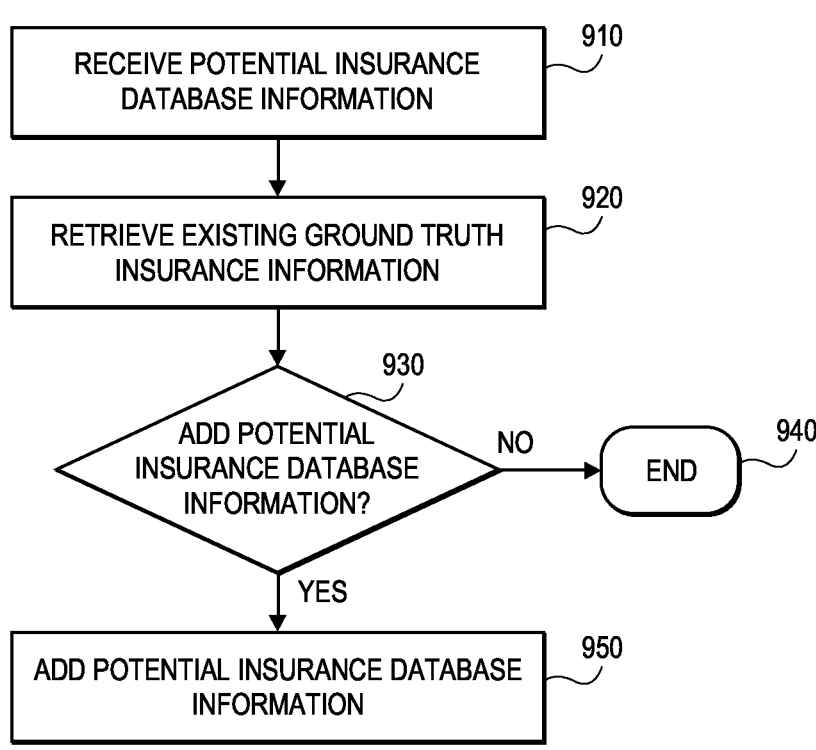
FIG. 9 illustrates an exemplary computer-implemented method of building a ground truth insurance database.

Exemplary Computer-Implemented Methods—Building a Ground Truth Insurance Database FIG. 9 shows an exemplary computer-implemented method or implementation 900 of building a ground truth insurance database.

The exemplary implementation 900 may begin at block 910 when the one or more processors 720 receive potential insurance database information. Examples of the potential insurance database information include insurance company application (app) information, anonymized insurance claim information, police report information, auxiliary information, etc.

The one or more processors 720 may receive the potential insurance database information from any suitable source (or combination of sources), such as email/text message database 142, insurance information aggregator database 144, government records database 146, police reports database 148, external database 180, internal database 718, insurance customer computing device 155, insurance agent computing device 165, insurance underwriter computing device 175, and/or administrator computing device 195, vehicle 750, vehicle camera 755, traffic camera 760, drone 770, other auxiliary device 780, etc.

In some embodiments, an AI and/or ML chatbot and/or voice bot may be leveraged to obtain the potential insurance database information. Although the following discussion may refer to a chatbot, it should be appreciated that the following discussion applies equally to any AI or ML chatbot or voice bot.

In some examples, the chatbot may directly request the potential insurance database information. For example, the chatbot may determine that a police report corresponding to an insurance claim is missing. For instance, the chatbot may determine that the police report is missing by receiving an input (e.g., from the insurance agent 165, the insurance underwriter 170, the administrator 190, etc.) indicating that there is missing information. For example, the input may directly indicate that information is missing.

Figure 10:
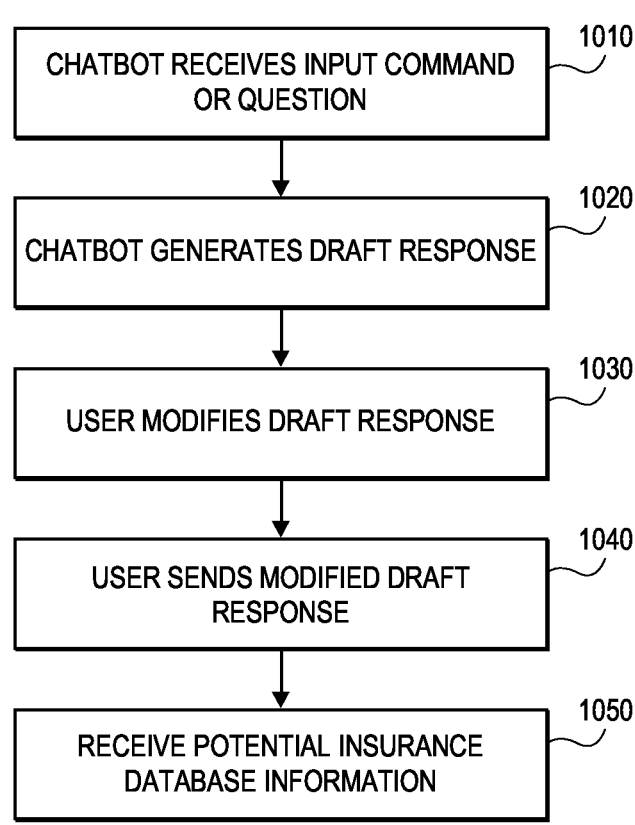
FIG. 10 illustrates an exemplary computer-implemented method of leveraging a chatbot to request potential insurance database information.

In other examples, the input may be in the form of a command or question to the chatbot such that the chatbot facilitates obtaining the potential insurance database information. FIG. 10 shows such an exemplary computer-implemented method 1000 of leveraging a chatbot to request potential insurance database information. In this regard, it should be understood that the example computer-implemented method 1000 may be performed as part of block 910.

Examples of the input command or question (e.g., received at block 1010 by the chatbot of the one or more processors 720 from the insurance agent 165, the insurance underwriter 170, the administrator 190, etc.) include, "does the ground truth database have the police report information for insurance claim XYZ," "please draft an email requesting a police report corresponding to insurance claim XYZ," etc.

The chatbot may then respond appropriately. For example, in response to a command "please request a police report for the traffic accident corresponding to insurance claim XYZ," the chatbot may generate and send an email to an administrator of the police records database 148. Additionally or alternatively, the chatbot may initiate communication with another chatbot (e.g., a chatbot of the police reports database 148, etc.) to request and/or obtain information.

In another example, in response to a question "does the ground truth database have the police report information for insurance claim XYZ," the chatbot may simply answer yes or no. Additionally or alternatively, the chatbot may generate and send an email (e.g., a request for information) to an administrator of the police records database 148. Additionally or alternatively, the chatbot may generate a draft response (e.g., a request for information) (e.g., at block 1020), which the user (e.g., the insurance agent 165, the insurance underwriter 170, the administrator 190, etc.) may modify at block 1030 and/or send at block 1040. In one working example, the chatbot drafts an email asking for a police report corresponding to an auto accident, and the user then modifies and sends the email to an administrator of the police records database 148. In another working example, the chatbot drafts an email asking for a death certificate corresponding to a life insurance claim, and the user then modifies and sends the email to an administrator of the government records database 146.

At block 1050, the one or more processors 720 then receive the potential insurance database information. For example, the one or more processors 720 may receive the potential insurance database information directly from the source that the information was requested from. Additionally or alternatively, the source may send the potential insurance database information to the user, who then sends the potential insurance database information to the one or more processors 720.

Returning to FIG. 9, at block 920, the one or more processors 720 may retrieve existing ground truth insurance information from the ground truth insurance database 140. For example, the one or more processors 720 may query the ground truth insurance database 140 based upon the potential insurance database information to find potentially matching information. In some examples, the one or more processors 720 query the ground truth insurance database 140 with keywords from the potential insurance database information. In some such examples, an NLP algorithm may determine a word or phrase from the potential insurance information, and the querying is performed based upon the determined word or phrase. In some examples, the querying is performed using an insurance claim identifier (e.g., an insurance claim identifier comprising an insurance claim number).

At block 930, the one or more processors 720 determine if the potential insurance database information should be added to the ground truth insurance database 140. The determination may be made in any suitable way. For instance, the determination may be made by comparing the potential insurance database information to the existing ground truth insurance information.

Figure 11:
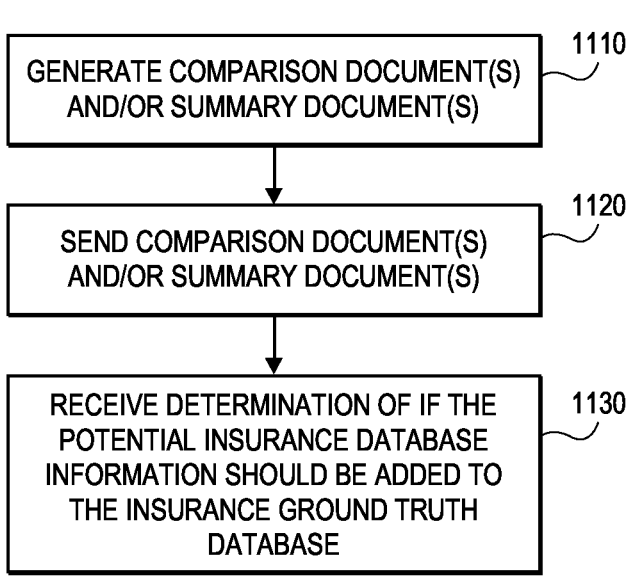
FIG. 11 illustrates an exemplary computer-implemented method of leveraging a comparison document to determine if potential insurance database information should be added to the ground truth insurance database.

In some such examples, the comparison is made via a comparison document (such as comparison document 800) generated by the chatbot. In this regard, FIG. 11 illustrates an exemplary computer-implemented method 1100 of leveraging a comparison document to determine if potential insurance database information should be added to the ground truth insurance database 140.

At block 1110, the one or more processors 720 generate the comparison document and/or summary documents. The comparison document may be generated by any suitable technique. For example, the comparison document and/or summary documents may be generated by the chatbot (e.g., trained to generate such documents as described elsewhere herein). In some such examples, the chatbot first generates a summary document (e.g., summary document 810) of the existing ground truth insurance information and a summary (e.g., summary document 820) of the potential insurance database information; and second compares the two summary documents to generate the comparison document (e.g., comparison document 800). In other examples, no summary documents are generated, and the potential insurance database information is directly compared to the existing ground truth insurance information to generate the comparison document.

In some examples, the comparison document includes highlighting to show differences between the potential insurance database information and the existing ground truth insurance information. Example differences may include a date that an auto accident occurred; a date that property damage occurred; a date of a house fire; vehicle information including vehicle: year, make, model, color, trim level, mileage, and/or safety feature information; an amount paid for an insurance claim; an amount of a subrogation demand; a name of a person; a name of a police officer; a weather condition on a date of an event of an insurance claim; if an insurance customer has additional insurance; insurance policy information of the insurance customer; a beneficiary of an insurance policy; a determination of fault in an auto accident; a record of criminal liability; items in a home on a date of damage to the home; and/or personal injury information.

In some embodiments, the one or more processors 720 (with or without the AI or ML chatbot) generate a template including the existing ground truth insurance information (e.g., a summary document of the existing ground truth insurance information, etc.), and then highlight at least a portion of the template to indicate the difference(s) between the potential insurance database information and the existing ground truth insurance information.

At block 1120, the one or more processors 720 send the comparison document and/or summary documents (e.g., to the insurance agent computing device 165, the insurance underwriter computing device 175, the administrator computing device 195, etc.).

At block 1130, the one or more processors 720 receive a determination (e.g., from the insurance agent computing device 165, the insurance underwriter computing device 175, the administrator computing device 195, etc.) of if the potential insurance database information should be added to the insurance ground truth database 140. For instance, a user may use the buttons 875 to make a selection, which is sent to the one or more processors 720.

The determination received at block 1130 may then be used at block 930. However, it should be appreciated that comparison documents and/or summary documents do not have to be used to make the determination at block 930. For example, the one or more processors 720 may automatically make the determination without a chatbot and/or with little or no human interaction. For instance, each source of the potential insurance database information (e.g., the email/text message database 142, insurance information aggregator database 144, government records database 146, police reports database 148, external database 180, and/or internal database 718) may have an associated reliability rating and/or ranking associated with it that is used to make the determination. For example, it may be that a government records database 146 has a higher reliability rating and/or ranking than an insurance information aggregator database 144; in this example, if the potential insurance database information came from the government records database 146 and the existing ground truth insurance information came from the information aggregator database 144 and there was a discrepancy between the existing ground truth insurance information and the potential insurance database information, the one or more processors 720 would determine to add the potential insurance database information to the ground truth insurance database 140.

In some embodiments, if there is no information in the ground truth insurance database 140 corresponding to the potential insurance database information, the determination may be to add the potential insurance database information to the ground truth insurance database 140. For instance, it may be that no information in the ground truth insurance database 140 includes weather conditions of a particular auto accident; and thus, if the potential insurance database information includes weather conditions of the auto accident, the weather conditions are automatically added to the ground truth insurance database 140.

In some examples, a reliability rating may correspond to a type of information. For instance, a person may write her birthday in an email (e.g., that the one or more processors 720 receive from the email/text message database 142), but a birth certificate (e.g., that the one or more processors 720 receive from the government records database 146) indicates a different birthdate. In this example, if the birth certificate has a higher reliability rating than an email, the one or more processors 720 may determine to use the birthday from the birth certificate rather than the email. In another example, a death certificate may have a higher reliability rating than a witness statement. Examples of the types of information (e.g., the types of potential insurance database information and/or existing ground truth insurance information) include: birth certificate information, death certificate information, email information, text message information, witness statement information, imagery information, audio information, etc.

In some embodiments, if the type of information of the potential insurance database information and the type of the existing ground truth insurance information are both imagery information, the one or more processors 720 determine a higher reliability rating for a police report source than for an auxiliary source. This provides protection against, for example, a user doctoring a photograph.

If the determination at block 930 is no, the exemplary method 900 ends at block 940.

If the determination at block 930 is yes, the one or more processors 720 add the potential insurance database information to the insurance ground truth database 140. In some embodiments, the one or more processors 720, also remove the existing ground truth insurance information from the insurance ground truth database 140 at block 930. However, in some embodiments, the existing ground truth insurance information is not removed, and rather the potential insurance database information is, for example, appended to the existing ground truth insurance information; some such embodiments have the technical advantage that a user is able to see additional information from different sources even if there is a discrepancy between sources.

Moreover, although the preceding discussion refers to block of the exemplary methods or implementations 900, 1000, 1100 as being performed by the one or more processors 720, it should be understood that any or all of the blocks may be alternatively or additionally performed by any other suitable component as well (e.g., the insurance customer computing device 155, the insurance agent computing device 165, the insurance underwriter computing device 175, the administrator computing device 195, etc.).

Additional Exemplary Embodiments—Building a Ground Truth Insurance Database

In one aspect, a computer system for building a ground truth insurance database may be provided. The computer system may include one or more local or remote processors, sensors, transceivers, servers, memory units, mobile devices, augmented reality glasses or headsets, extended or virtual reality headsets, smart glasses or watches, wearables, smart contacts, chat bots, voice bots, ChatGPT bots, and/or other electronic or electrical components. For example, in one instance, the computer system may include one or more processors configured to: (1) receive potential insurance database information, wherein the potential insurance database information comprises: (i) insurance company application (app) information, (ii) anonymized insurance claim information, (iii) police report information, and/or (iv) auxiliary information; (2) retrieve, from an insurance ground truth insurance database, existing ground truth insurance information by querying the ground truth database based upon the potential insurance database information; (3) determine if the potential insurance database information should be added to the insurance ground truth database by comparing the potential insurance database information to the existing ground truth insurance information; and/or (4) if the potential insurance database information should be added to the insurance ground truth database, add the potential insurance database information to the insurance ground truth database. The computer system may include additional, less, or alternate functionality, including that discussed elsewhere herein.

In some embodiments, the one or more processors are further configured to perform the comparing of the potential insurance database information to the existing ground truth insurance information further by: generating, via an artificial intelligence (AI) and/or machine learning (ML) chatbot, a comparison document indicating at least one difference between the potential insurance database information and the existing ground truth insurance information; sending the comparison document to an administrator computing device; receiving, from the administrator computing device, a selection of the potential insurance database information or the existing ground truth insurance information; and/or determining to add the potential insurance database information to the insurance ground truth database if the selection indicates the potential insurance database information.

In some embodiments, the one or more processors are further configured to perform the generating the comparison document by, via the AI or ML chatbot: generating a template including the existing ground truth insurance information; and/or highlighting at least a portion of the template to indicate the at least one difference between the potential insurance database information and the existing ground truth insurance information.

In some embodiments, the generated comparison may further include: (i) an indication of a source of the potential insurance database information, and/or (ii) an indication of a source of the existing ground truth insurance information; and/or the method further may include displaying, on a display of the administrator computing device, the generated comparison document including (i) the indication of the source of the potential insurance database information, and/or (ii) the indication of the source of the existing ground truth insurance information.

In some embodiments, the at least one difference comprises a difference in: a date that an auto accident occurred; a date that property damage occurred; a date of a house fire; vehicle information including vehicle: year, make, model, color, trim level, mileage, and/or safety feature information; an amount paid for an insurance claim; an amount of a subrogation demand; a name of a person; a name of a police officer; a weather condition on a date of an event of an insurance claim; if an insurance customer has additional insurance; insurance policy information of the insurance customer; a beneficiary of an insurance policy; a determination of fault in an auto accident; a record of criminal liability; items in a home on a date of damage to the home; and/or personal injury information.

In some embodiments, the one or more processors are further configured to perform the comparing of the potential insurance database information to the existing ground truth insurance information further by: generating, via an artificial intelligence (AI) or machine learning (ML) chatbot: (i) a first summary document summarizing the potential insurance database information, and (ii) a second summary document summarizing the existing ground truth insurance information; sending the first and second summary documents to an administrator computing device; receiving, from the administrator computing device, a selection of the potential insurance database information or the existing ground truth insurance information; and/or determining to add the potential insurance database information to the insurance ground truth database if the selection indicates the potential insurance database information.

In some embodiments, the one or more processors are further configured to perform the comparing of the potential insurance database information to the existing ground truth insurance information further by: comparing a reliability rating of a source of the potential insurance database information to a reliability rating of a source of the existing ground truth insurance information; and/or comparing (i) a rank of the source of the potential insurance database information from a list of ranked sources to (ii) a rank of a source of the existing ground truth insurance information from the list of ranked sources.

In some embodiments, the one or more processors are further configured to perform the comparing of the potential insurance database information to the existing ground truth insurance information further by: determining a type of information of the potential insurance database information; determining a type of the existing ground truth insurance information; determining a first reliability rating corresponding to the type of information of the potential database information and a source of the potential insurance database information; determining a second reliability rating corresponding to the type of information of the existing ground truth insurance information and a source of the existing ground truth insurance information; and/or comparing the first reliability rating to the second reliability rating.

In some embodiments, the one or more processors are further configured to, if the type of information of the potential insurance database information and the type of the existing ground truth insurance information are both imagery information: determine a higher reliability rating for a police report source than for an auxiliary source.

In some embodiments, the one or more processors are further configured to: if the potential insurance database information should be added to the insurance ground truth database, further remove the existing ground truth insurance information from the insurance ground truth database.

In some embodiments, the potential insurance database information comprises the insurance company app information, and the insurance company app information comprises a profile of an insurance customer; and/or the one or more processors are further configured to receive the insurance company app information from an insurance company app.

In some embodiments, the potential insurance database information comprises the anonymized insurance claim information, and the anonymized insurance claim information includes: a date of a first notice of loss, an amount of an insurance payout, and/or a type of insurance claim.

In some embodiments, the potential insurance database information comprises police report information; and/or the police report information includes a name of a police department of the police report, a name of a police officer of the police report, a type of vehicle involved in an accident, imagery information of the accident, a percentage of fault of the accident, imagery information of a home, an identity of a deceased person, and/or an identity of a person filing a police report.

In some embodiments, the potential insurance database information comprises the auxiliary information, and the auxiliary information comprises information from: a vehicle camera; a traffic camera; a camera attached to a building; an infrastructure device; a vehicle-to-infrastructure (V2I) device; a vehicle-to-network (V2N) device; a vehicle-to-vehicle (V2V) device; a vehicle-to-pedestrian (V2P) device; a vehicle-to-device (V2D) device; a smartwatch; a smartphone; a smart home device; a smart home camera; an email server; a weather device; a government database; a drone; and/or a newscast database.

In yet another aspect, a computer-implemented method for building a ground truth insurance database may be provided. The method may be implemented via one or more local or remote processors, sensors, transceivers, servers, memory units, mobile devices, augmented reality glasses or headsets, extended or virtual reality headsets, smart glasses or watches, wearables, smart contacts, voice bots, chatbots, ChatGPT bots, and/or other electronic or electrical components. For instance, in one example, the method may include: (1) receiving, via one or more processors, potential insurance database information, wherein the potential insurance database information comprises: (i) insurance company application (app) information, (ii) anonymized insurance claim information, (iii) police report information, and/or (iv) auxiliary information; (2) retrieving, via the one or more processors, from an insurance ground truth insurance database, existing ground truth insurance information by querying the ground truth database based upon the potential insurance database information; (3) determining, via the one or more processors, that the potential insurance database information should be added to the insurance ground truth database by comparing the potential insurance database information to the existing ground truth insurance information; and/or (4) in response to the determination that the potential insurance database information should be added to the insurance ground truth database, adding, via the one or more processors, the potential insurance database information to the insurance ground truth database. The method may include additional, fewer, or alternate actions, including those discussed elsewhere herein.

In some embodiments, the potential insurance database information comprises the police report information, and the method further comprises, via the one or more processors: with an artificial intelligence (AI) or machine learning (ML) chatbot, requesting the police report information from a police station.

In some embodiments, the potential insurance database information comprises the auxiliary information, and the method further comprises, via the one or more processors: with an artificial intelligence (AI) or machine learning (ML) chatbot, requesting the auxiliary information from an auxiliary information source; and/or wherein the auxiliary information source comprises (i) a government entity storing death records and/or vehicle registration records, (ii) an entity storing data from a vehicle-to-infrastructure (V2I) device, a vehicle-to-network (V2N) device, a vehicle-to-vehicle (V2V) device, a vehicle-to-pedestrian (V2P) device, and/or a vehicle-to-device (V2D) device, and/or (iii) a news source.

In yet another aspect, a computer device for building a ground truth insurance database may be provided. The computer device may include one or more local or remote processors, sensors, transceivers, servers, memory units, mobile devices, augmented reality glasses or headsets, extended or virtual reality headsets, smart glasses or watches, wearables, smart contacts, chat bots, voice bots, ChatGPT bots, and/or other electronic or electrical components. For instance, in one example, the computer device may include: one or more processors; and/or one or more memories coupled to the one or more processors. The one or more memories including computer executable instructions stored therein that, when executed by the one or more processors, may cause the computer device to: (1) receive potential insurance database information, wherein the potential insurance database information comprises: (i) insurance company application (app) information, (ii) anonymized insurance claim information, (iii) police report information, and/or (iv) auxiliary information; (2) retrieve, from an insurance ground truth insurance database, existing ground truth insurance information by querying the ground truth database based upon the potential insurance database information; (3) determine if the potential insurance database information should be added to the insurance ground truth database by comparing the potential insurance database information to the existing ground truth insurance information; and/or (4) if the potential insurance database information should be added to the insurance ground truth database, add the potential insurance database information to the insurance ground truth database. The computer device may include additional, less, or alternate functionality, including that discussed elsewhere herein.

In some embodiments, the potential insurance database information comprises the police report information, and wherein the one or more memories having stored thereon computer executable instructions that, when executed by the one or more processors, further cause the computer device to: with an artificial intelligence (AI) chatbot, prepare a draft communication to request the police report information from a police department; present the draft communication to an administrator on an administrator computing device; receive, from the administrator computing device, a final communication, wherein the final communication comprises an edited version of the draft communication edited by the administrator; and/or send the final communication to the police department.

In some embodiments, the draft communication and final communication each comprise an email and/or text message.

In some embodiments, the one or more memories having stored thereon computer executable instructions that, when executed by the one or more processors, further cause the computer device to perform the querying of the ground truth database based upon an insurance claim identifier, wherein the insurance claim identifier comprises an insurance claim number.

In some embodiments, the one or more memories having stored thereon computer executable instructions that, when executed by the one or more processors, further cause the computer device to: use a natural language processing algorithm (NLP) to determine a word or phrase from the potential insurance information; and/or perform the querying of the ground truth database by querying the ground truth database based upon the word or phrase.

In some embodiments, the AI chatbot comprises: a generative AI chatbot, and/or a deep learning algorithm.

Exemplary System—Aiding Underwriters and/or Insurance Agents

The present embodiments relate to, inter alia, using AI and/or ML to aid underwriting and insurance agents. For example, AI and/or ML techniques may provide recommendations to underwriters or insurance agents. For instance, an AI and/or ML chatbot or voicebot may pinpoint what the underwriter or insurance agent should be looking at (e.g., neighboring houses having sewage backups, etc.). Underwriters and/or insurance agents may also ask questions to the chatbot or voicebot.

Figure 12:
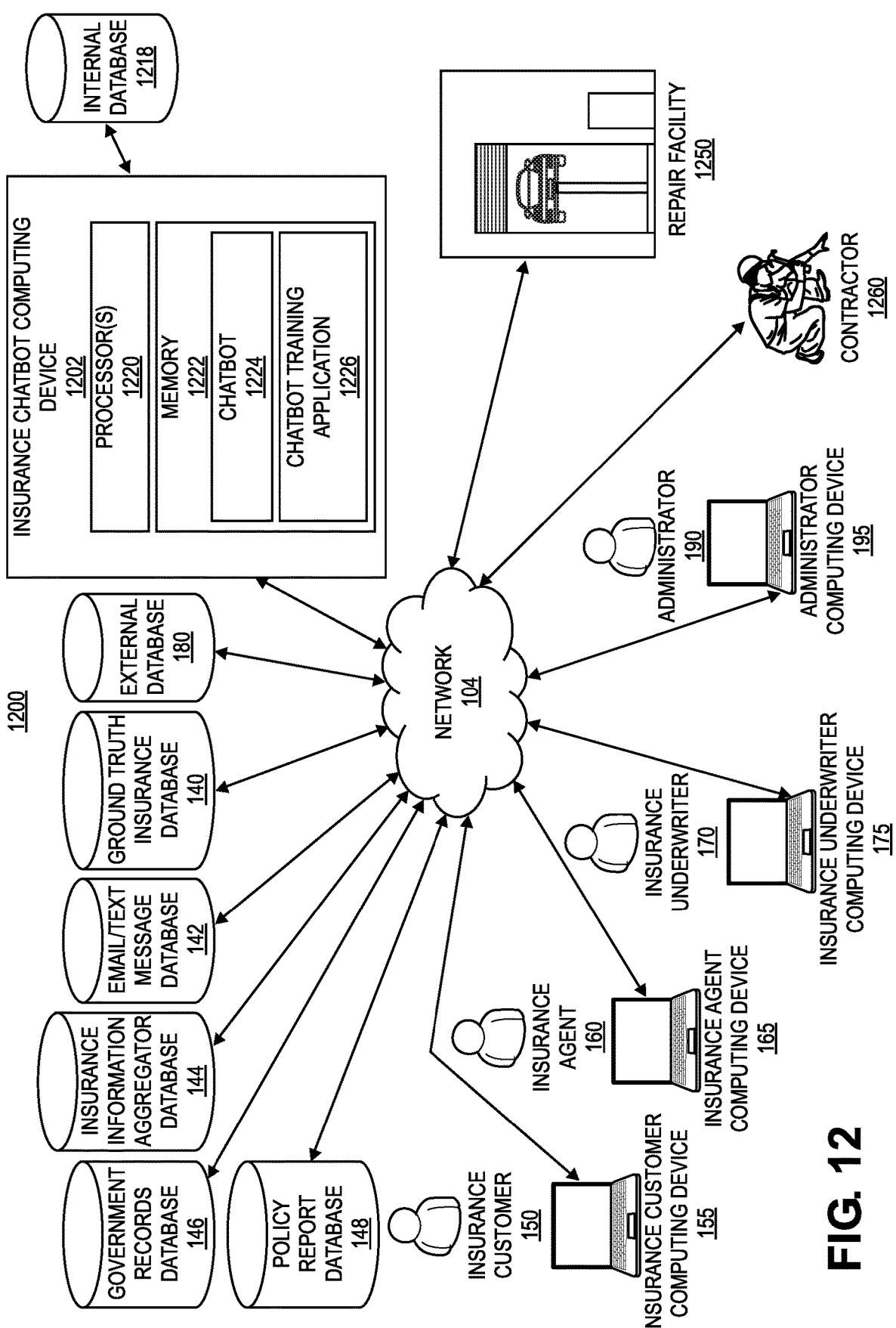
FIG. 12 illustrates an exemplary computer system for aiding underwriting and/or insurance agents, according to one embodiment.

To this end, FIG. 12 illustrates an exemplary computer system 1200 for aiding underwriting and insurance agents in which the exemplary computer-implemented methods described herein may be implemented. The high-level architecture includes both hardware and software applications, as well as various data communications channels for communicating data between the various hardware and software components.

The insurance chatbot computing device 1202 may include one or more processors 1220 such as one or more microprocessors, controllers, and/or any other suitable type of processor. The insurance chatbot computing device 1202 may further include a memory 1222 (e.g., volatile memory, non-volatile memory) accessible by the one or more processors 1220, (e.g., via a memory controller). The one or more processors 1220 may interact with the memory 1222 to obtain and execute, for example, computer-readable instructions stored in the memory 1222. Additionally or alternatively, computer-readable instructions may be stored on one or more removable media (e.g., a compact disc, a digital versatile disc, removable flash memory, etc.) that may be coupled to the insurance chatbot computing device 1202 to provide access to the computer-readable instructions stored thereon. In particular, the computer-readable instructions stored on the memory 1222 may include instructions for executing various applications, such as chatbot 1224 (which may additionally or alternatively be voicebot 1224), and/or chatbot training application 1226.

An insurance company that owns the insurance chatbot computing device 1202 may provide insurance to insurance customers, such as the insurance customer 150. For example, the insurance company may also provide insurance policies, such as a life insurance policy, a homeowners insurance policy, a renters insurance policy, an auto insurance policy, an umbrella insurance policy, and/or a disability insurance policy, etc. As such, in some situations, it may be useful for the insurance company to aid the insurance agent 160 and/or the insurance underwriter 170 (e.g., by answering questions from the insurance agent 160 and/or the insurance underwriter 170). In some aspects, the insurance chatbot computing device 1202 is able to provide highly reliable information or answers to the insurance agent 160 and/or the insurance underwriter 170 by drawing on information from the ground truth insurance database 140.

To this end, the chatbot 1224 may, inter alia, have a conversation with and/or answer questions from the insurance agent 160 and/or the insurance underwriter 170. Furthermore, it should be understood that although 1224 is labeled as chatbot, 1224 may additionally or alternatively be a voicebot. It should further be understood that chatbot/voicebot 1224 may be an AI and/or ML chatbot/voicebot.

In some examples, the chatbot 1224 receives an input statement from the insurance agent 160 and/or the insurance underwriter 170 including a question. Examples of questions include "what are the best roofing contractors to use in zip code XYZ," and "what is the flood risk in zip code XYZ?" However, the input statement does not necessarily need to include a question; and, in some embodiments, if the input statement does not include a question, the chatbot answers a default question that corresponds to a type of insurance policy indicated by the input statement.

In addition, the chatbot 1224 may access an estimation AI algorithm. For example, in responding to homeowners insurance questions, the chatbot 1224 may access an estimation AI algorithm to estimate a home value. FIG. 13 shows one such example. More specifically, FIG. 13 shows an exemplary screen 1300 of an exemplary chat session 1310 between the chatbot 1224 and the insurance underwriter 170, which may be displayed on the insurance underwriter computing device 175. The input statement 1320 asks for a value of a home, and the chatbot 1224 accesses an estimation AI algorithm to provide an estimation as part of answer 1330.

In addition, the chatbot may make insurance-related suggestions based upon the input statement and/or a type of insurance policy determined from the input statement. For instance, from the input statement 1320, the chatbot 1224 may determine that the type of insurance policy is a homeowners insurance policy. And, based upon this determination and other information (e.g., the zip code from the input statement 1320), the chatbot 1224 makes the insurance-related suggestion that the underwriter consider that in the last year there has been an increase in fire-related insurance claims and/or sewage-backup-related insurance claims for nearby homes.

The chatbot 1224 may be trained by the chatbot training application 1226. It should be appreciated that the techniques discussed herein with respect to training a chatbot via the chatbot training application 1226 apply equally as well to training a voice bot. Broadly speaking, the chatbot training application 1226 may train the chatbot 1224 to assist the insurance agent 160 and/or the insurance underwriter 170. For example, the chatbot 1224 may be trained to: (i) answer questions from the insurance agent 160 and/or the insurance underwriter 170, and/or (ii) provide insurance-related suggestions to the insurance agent 160 and/or the insurance underwriter 170. The training of the chatbot 1224 is described in more detail elsewhere herein.

Advantageously, to answer the questions and/or provide insurance-related suggestions, the chatbot 1224 may use information from the ground truth database 140. Further advantageously, the chatbot 1224 may be trained using information from the ground truth insurance database 140. In particular, this is advantageous because the ground truth insurance database 140 holds information that is more reliable than other sources; and, more specifically, holds information that is more reliable and particularly useful for insurance purposes. The ground truth insurance database 140 is described in more detail elsewhere herein.

As described elsewhere herein, the ground truth insurance database 140 may hold any suitable information. Examples of the information held by the ground truth insurance database 140 include (i) insurance company application (app) information, (ii) anonymized insurance claim information. (iii) police report information, and/or (iv) auxiliary information. The information held by the ground truth database 140 may include information of any type, such as text information, imagery information (e.g., images, video, etc.), audio information, etc.

The email/text message database 142, the insurance information aggregator database 144 the government records database 146, the police reports database 148 and the external database 180 are also described in more detail elsewhere herein.

The chatbot 1224 may also use information from the repair facility 1250. For example, following an auto insurance claim, an insurance agent 160 (e.g., via the insurance agent computing device 165) may ask the chatbot 1224 for a recommendation for a repair facility. The chatbot 1224 may then use information from the repair facility 1250 to answer the question. For instance, the chatbot may receive an estimated wait time for the repair facility 1250 to perform the work, and use this as part of making a recommendation to the insurance agent 160. The repair facility 1250 may be any kind of repair facility (e.g., auto repair facility, boat repair facility, drone repair facility, etc.).

The chatbot 1224 may also use information from the contractor 1260. For example, following a homeowners insurance claim relating to roof damage from hail, the insurance agent (e.g., via insurance agent computing device 165) 160 may ask the chatbot 1224 for a recommendation for a roofing contractor. The chatbot 1224 may then use information from the contractor 1260 to answer the question. For instance, the chatbot may receive an estimated wait time for the contractor 1260 to perform the work, and use this as part of making a recommendation to the insurance agent 160. The contractor 1260 may be any kind of contractor (e.g., construction contractor, roofing contractor, plumber, electrician, etc.).

In addition, further regarding the example system 1200, the illustrated exemplary components may be configured to communicate, e.g., via the network 104 (which may be a wired or wireless network, such as the internet), with any other component. Furthermore, although the example system 1200 illustrates only one of each of the components, any number of the example components are contemplated (e.g., any number of external databases, ground truth insurance databases, email/text message databases, insurance information aggregator databases, government records databases, police reports databases, insurance customers, insurance customer computing devices, insurance agents, insurance agent computing devices, insurance underwriters, insurance underwriter computing devices, administrators, administrator computing devices, insurance chatbot computing devices, repair facilities, contractors, etc.).

Exemplary Training of an Exemplary Chatbot

An insurance company may use chatbot 1224 to, inter alia, provide tailored, conversational-like services (e.g., answering questions, and/or providing insurance-related suggestions). The chatbot 1224 may be capable of understanding requests, providing relevant information, escalating issues. Additionally, the chatbot 1224 may generate data from interactions which the enterprise may use to personalize future support and/or improve the chatbot's functionality, e.g., when retraining and/or fine-tuning the chatbot. Moreover, although the following discussion may refer to an ML chatbot or an ML model, it should be understood that it applies equally to an AI chatbot or an AI model.

The chatbot 1224 may be trained by chatbot training application 1226 using large training datasets of text which may provide sophisticated capability for natural-language tasks, such as answering questions and/or holding conversations. The chatbot 1224 may include a general-purpose pretrained LLM which, when provided with a starting set of words (prompt) as an input, may attempt to provide an output (response) of the most likely set of words that follow from the input. In one aspect, the prompt may be provided to, and/or the response received from, the chatbot 1224 and/or any other ML model, via a user interface of the insurance chatbot computing device 1202. This may include a user interface device operably connected to the server via an I/O module. Exemplary user interface devices may include a touchscreen, a keyboard, a mouse, a microphone, a speaker, a display, and/or any other suitable user interface devices.

Multi-turn (i.e., back-and-forth) conversations may require LLMs to maintain context and coherence across multiple user utterances, which may require the chatbot 1224 to keep track of an entire conversation history as well as the current state of the conversation. The chatbot 1224 may rely on various techniques to engage in conversations with users, which may include the use of short-term and long-term memory. Short-term memory may temporarily store information (e.g., in the memory 1202 of the insurance chatbot computing device 1202) that may be required for immediate use and may keep track of the current state of the conversation and/or to understand the user's latest input in order to generate an appropriate response. Long-term memory may include persistent storage of information (e.g., the internal database 1218 of the insurance chatbot computing device 1202) which may be accessed over an extended period of time. The long-term memory may be used by the chatbot 1224 to store information about the user (e.g., preferences, chat history, etc.) and may be useful for improving an overall user experience by enabling the chatbot 1224 to personalize and/or provide more informed responses.

In some embodiments, the system and methods to generate and/or train an ML chatbot model (e.g., via the chatbot training application 1226) which may be used in the chatbot 1224, may include three steps: (1) a supervised fine-tuning (SFT) step where a pretrained language model (e.g., an LLM) may be fine-tuned on a relatively small amount of demonstration data curated by human labelers to learn a supervised policy (SFT ML model) which may generate responses/outputs from a selected list of prompts/inputs. The SFT ML model may represent a cursory model for what may be later developed and/or configured as the ML chatbot model; (2) a reward model step where human labelers may rank numerous SFT ML model responses to evaluate the responses which best mimic preferred human responses, thereby generating comparison data. The reward model may be trained on the comparison data; and/or (3) a policy optimization step in which the reward model may further fine-tune and improve the SFT ML model. The outcome of this step may be the ML chatbot model using an optimized policy. In one aspect, step one may take place only once, while steps two and three may be iterated continuously, e.g., more comparison data is collected on the current ML chatbot model, which may be used to optimize/update the reward model and/or further optimize/update the policy.

Supervised Fine-Tuning ML Model

Figure 14:
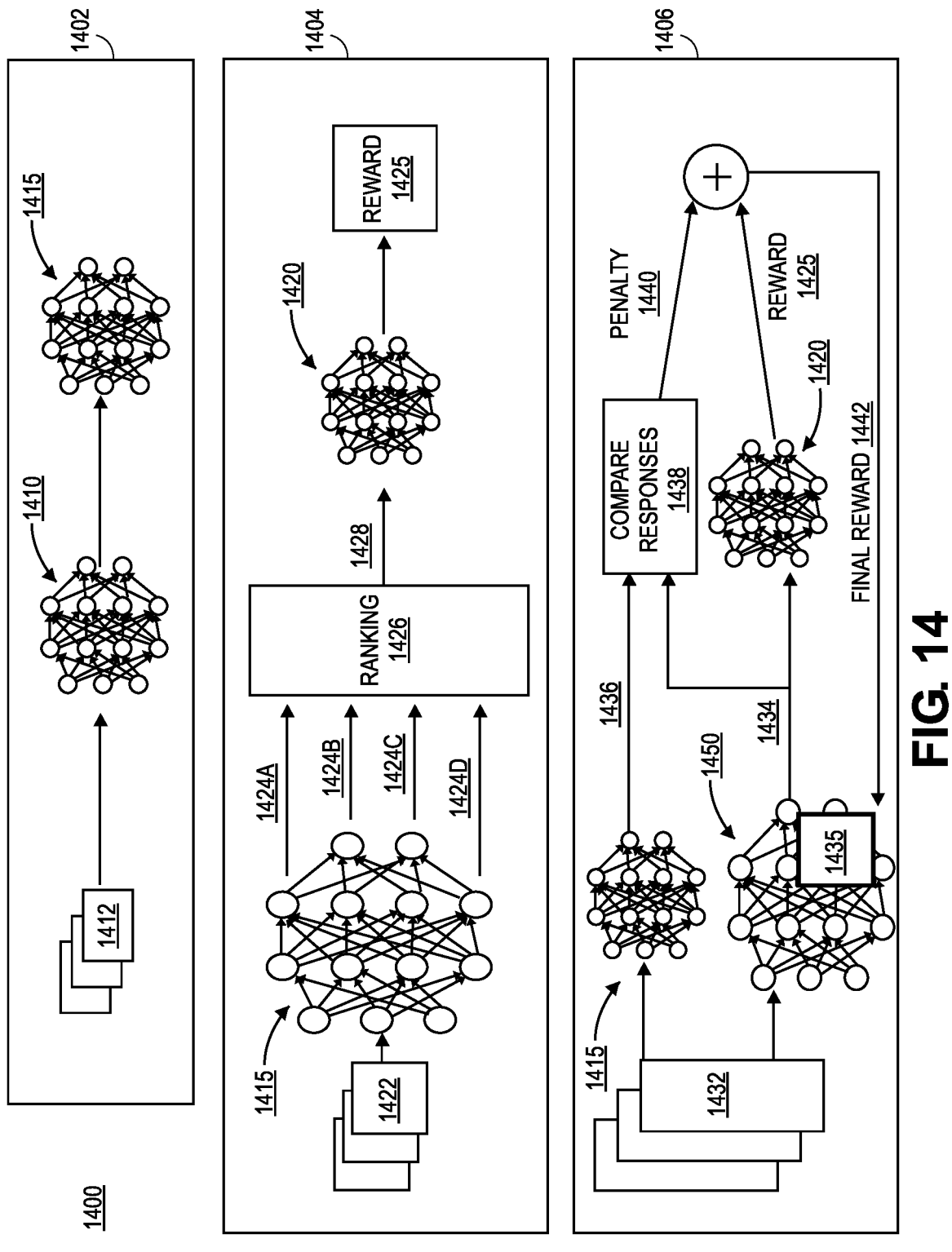
FIG. 14 depicts an exemplary combined block and logic diagram for exemplary training of an exemplary chatbot.

FIG. 14 depicts a combined block and logic diagram 1400 for training an ML chatbot model, in which the techniques described herein may be implemented, according to some embodiments. It should be understood that FIG. 14 may apply to training any chatbot described herein, and FIG. 14 should not be considered to be restricted to the chatbot 1224. In addition, the chatbot 1224 may be trained in accordance with any of the other techniques described herein; and the training of chatbot 1224 should not be considered restricted to the teachings of FIG. 14.

Some of the blocks in FIG. 14 may represent hardware and/or software components, other blocks may represent data structures or memory storing these data structures, registers, or state variables (e.g., 1412), and other blocks may represent output data (e.g., 1425). Input and/or output signals may be represented by arrows labeled with corresponding signal names and/or other identifiers. The methods and systems may include one or more blocks 1402, 1404, 1406, which will be described in further detail below.

In one aspect, at block 1402, a pretrained language model 1410 may be fine-tuned. The pretrained language model 1410 may be obtained at block 1402 and be stored in a memory, such as memory 1222 and/or internal database 1218. The pretrained language model 1410 may be loaded into an ML training module at block 1402 for retraining/fine-tuning. A supervised training dataset 1412 may be used to fine-tune the pretrained language model 1410 wherein each data input prompt to the pretrained language model 1410 may have a known output response for the pretrained language model 1410 to learn from. The supervised training dataset 1412 may be stored in a memory at block 1402, e.g., the memory 1222 or the internal database 1218. In one aspect, the data labelers may create the supervised training dataset 1412 prompts and appropriate responses. The pretrained language model 1410 may be fine-tuned using the supervised training dataset 1412 resulting in the SFT ML model 1415 which may provide appropriate responses to user prompts once trained. The trained SFT ML model 1415 may be stored in a memory, such as the memory 1222 or the internal database 1218.

In one aspect, the supervised training dataset 1412 may include prompts and responses which may be relevant to insurance agent 165 and/or insurance underwriter 170. Examples of prompts and responses include: (i) insurance agent questions, and corresponding insurance agent answers; (ii) insurance underwriter questions, and corresponding insurance underwriter answers; and/or (iii) insurance customer questions, and corresponding insurance customer answers. For instance, an insurance underwriter 170 may ask (e.g., create an input prompt asking) "what issues are relevant to a homeowners insurance policy in zip code 12345?" Example responses from the trained SFT ML model 1415 may include "homes in that area are at an increased risk of flood damage during heavy rain," or "in the last month, there has been an increase in vandalisms in that area." The responses may include one or both of an answer to the question and/or an insurance-related suggestion. In some embodiments, the supervised training dataset 1412 may include historical data from or be based upon historical data from the ground truth insurance database 140.

In some embodiments, the input statements of the training dataset 1412 include tags indicating types of insurance policies that the input statements correspond to. For example, an input statement of "what issues should I check for when writing a homeowners insurance policy for a house in zip code 12345?" may include a tag of a homeowners insurance policy. In this way, the chatbot 1224 may be trained to determine types of insurance policies corresponding to input statements. For example, the input statement may include "what issues should I check for when writing an auto insurance policy for a customer living in zip code 12345?" and the tag may indicate that the corresponding type of insurance policy is an auto insurance policy. In some embodiments, the corresponding type of insurance policy is determined by first determining a word or phrase from the input statement, and second determining the type of insurance policy from the word or phrase.

In some embodiments, the prompts and/or responses may include a trigger to retrieve insurance information (e.g., from the ground truth insurance database 140, insurance information aggregator database 144, an insurance claims database [e.g., the internal database 1218 and/or the external database 180], government records database 146, a police reports database 148, a blockchain, repair facility 1250, and/or contractor 1260). For example, the prompt (e.g., from insurance agent 160 in a request to recommend a contractor following an insurance claim) may be "recommend a roofing contractor;" and the response may be "roofing contractor XYZ is recommended due to current availability." In this example, the trigger may cause the one or more processors 1220 to retrieve insurance information from the contractors 1260 to determine availability information (e.g., a first contractor is available immediately, but another contractor will not be available for two weeks). Further in this example, it should be appreciated that the availability of a contractor qualifies as insurance information (e.g., insurance-related information) because it is being used to respond to a request for a contractor to repair damage associated with an insurance claim. In another example, the prompt (e.g., from insurance underwriter 170) may be "what is the value of a home at 123 Main St.;" and the response may be "the value of the home is estimated to be $300,000." In this example, the trigger may cause the one or more processors 1220 to retrieve the insurance information by accessing an estimation AI algorithm that estimates home values.

In yet another example, the trigger may cause the one or more processors 1220 to access insurance claims information (e.g., from the internal database 1218, the external database 180, the ground truth insurance database 140, and/or the insurance information aggregator database 144, etc.). In one such example, the prompt (e.g., from insurance underwriter 170) may be "what issues should I consider in writing a homeowners insurance policy for a home at address 123 Main St.;" and the response may be "there has been an increase in fire-related homeowners insurance claims in nearby homes in the last year." In some such examples, the one or more processors 1220 access the insurance information to make the determination (e.g., that there has been an increase in fire-related homeowners insurance claims in nearby homes in the last year).

Training the Reward Model

In one aspect, training the ML chatbot model 1450 may include, at block 1404, training a reward model 1420 to provide as an output a scaler value/reward 1425. The reward model 1420 may be required to leverage reinforcement learning with human feedback (RLHF) in which a model (e.g., ML chatbot model 1450) learns to produce outputs which maximize its reward 1425, and in doing so may provide responses which are better aligned to user prompts.

Training the reward model 1420 may include, at block 1404, providing a single prompt 1422 to the SFT ML model 1415 as an input. The input prompt 1422 may be provided via an input device (e.g., a keyboard) of the insurance chatbot computing device 1202. The prompt 1422 may be previously unknown to the SFT ML model 1415, e.g., the labelers may generate new prompt data, the prompt 1422 may include testing data stored on internal database 1218, and/or any other suitable prompt data. The SFT ML model 1415 may generate multiple, different output responses 1424A, 1424B, 1424C, 1424D to the single prompt 1422. At block 1404, the insurance chatbot computing device 1202 (and/or the insurance customer computing device 155, insurance agent computing device 165, insurance underwriter computing device 175, administrator computing device 195, etc.) may output the responses 1424A, 1424B, 1424C, 1424D via any suitable technique, such as outputting via a display (e.g., as text responses), a speaker (e.g., as audio/ voice responses), etc., for review by the data labelers.

In some embodiments, the different output responses 1424A, 1424B, 1424C, 1424D are determined by determining a question and corresponding type of insurance policy from the input 1422 (e.g., input statement). In some such embodiments, the different output responses 1424A, 1424B, 1424C, 1424D are determined by retrieving (e.g., from the ground truth insurance database 140, the insurance information aggregator database 144, the internal database 1218, etc.) insurance information based upon (i) the type of insurance policy, and (ii) the question. In some embodiments, the different output responses 1424A, 1424B, 1424C, 1424D are further determined by using an estimation AI algorithm (e.g., an AI algorithm that estimates a value of a home, etc.).

The data labelers may provide feedback (e.g., via the insurance chatbot computing device 1202, the administrator computing device 195, the insurance underwriting computing device 175, the insurance agent computing device 165, etc.) on the responses 1424A, 1424B, 1424C, 1424D when ranking 1426 them from best to worst based upon the prompt-response pairs. The data labelers may rank 1426 the responses 1424A, 1424B, 1424C, 1424D by labeling the associated data. The ranked prompt-response pairs 1428 may be used to train the reward model 1420. In one aspect, the insurance chatbot computing device 1202 may load the reward model 1420 via the chatbot training application 1226 and train the reward model 1420 using the ranked response pairs 1428 as input. The reward model 1420 may provide as an output the scalar reward 1425.

In one aspect, the scalar reward 1425 may include a value numerically representing a human preference for the best and/or most expected response to a prompt, i.e., a higher scaler reward value may indicate the user is more likely to prefer that response, and a lower scalar reward may indicate that the user is less likely to prefer that response. For example, inputting the "winning" prompt-response (i.e., input-output) pair data to the reward model 1420 may generate a winning reward. Inputting a "losing" prompt-response pair data to the same reward model 1420 may generate a losing reward. The reward model 1420 and/or scalar reward 1436 may be updated based upon labelers ranking 1426 additional prompt-response pairs generated in response to additional prompts 1422.

In one example, a data labeler may provide to the SFT ML model 1415 as an input prompt 1422, "Describe the sky." The input may be provided by the labeler (e.g., via the administrator computing device 195, the insurance underwriting computing device 175, etc.) to the insurance chatbot computing device 1202 running chatbot 1224 utilizing the SFT ML model 1415. The SFT ML model 1415 may provide as output responses to the labeler (e.g., via their respective devices): (i) "the sky is above" 1424A; (ii) "the sky includes the atmosphere and may be considered a place between the ground and outer space" 1424B; and (iii) "the sky is heavenly" 1424C. The data labeler may rank 1426, via labeling the prompt-response pairs, prompt-response pair 1422/ 1424B as the most preferred answer; prompt-response pair 1422/1424A as a less preferred answer; and prompt-response 1422/1424C as the least preferred answer. The labeler may rank 1426 the prompt-response pair data in any suitable manner. The ranked prompt-response pairs 1428 may be provided to the reward model 1420 to generate the scalar reward 1425. It should be appreciated that this facilitates training the chatbot 1224 to determine questions corresponding various types of insurance policies, and answers corresponding to the types of insurance policies.

While the reward model 1420 may provide the scalar reward 1425 as an output, the reward model 1420 may not generate a response (e.g., text). Rather, the scalar reward 1425 may be used by a version of the SFT ML model 1415 to generate more accurate responses to prompts, i.e., the SFT model 1415 may generate the response such as text to the prompt, and the reward model 1420 may receive the response to generate a scalar reward 1425 of how well humans perceive it. Reinforcement learning may optimize the SFT model 1415 with respect to the reward model 1420 which may realize the configured ML chatbot model 1450.

RLHF to Train the ML Chatbot Model

In one aspect, the insurance chatbot computing device 1202 may train the ML chatbot model 1450 (e.g., via the chatbot training application 1226) to generate a response 1434 to a random, new and/or previously unknown user prompt 1432. To generate the response 1434, the ML chatbot model 1450 may use a policy 1435 (e.g., algorithm) which it learns during training of the reward model 1420, and in doing so may advance from the SFT model 1415 to the ML chatbot model 1450. The policy 1435 may represent a strategy that the ML chatbot model 1450 learns to maximize its reward 1425. As discussed herein, based upon prompt-response pairs, a human labeler may continuously provide feedback to assist in determining how well the ML chatbot's 1450 responses match expected responses to determine rewards 1425. The rewards 1425 may feed back into the ML chatbot model 1450 to evolve the policy 1435. Thus, the policy 1435 may adjust the parameters of the ML chatbot model 1450 based upon the rewards 1425 it receives for generating good responses. The policy 1435 may update as the ML chatbot model 1450 provides responses 1434 to additional prompts 1432.

In one aspect, the response 1434 of the ML chatbot model 1450 using the policy 1435 based upon the reward 1425 may be compared 1438 to the SFT ML model 1415 (which may not use a policy) response 1436 of the same prompt 1432. The insurance chatbot computing device 1202 may compute a penalty 1440 based upon the comparison 1438 of the responses 1434, 1436. The penalty 1440 may reduce the distance between the responses 1434, 1436, i.e., a statistical distance measuring how one probability distribution is different from a second, in one aspect the response 1434 of the ML chatbot model 1450 versus the response 1436 of the SFT model 1415. Using the penalty 1440 to reduce the distance between the responses 1434, 1436 may avoid a server over-optimizing the reward model 1420 and deviating too drastically from the human-intended/preferred response. Without the penalty 1440, the ML chatbot model 1450 optimizations may result in generating responses 1434 which are unreasonable but may still result in the reward model 1420 outputting a high reward 1425.

In one aspect, the responses 1434 of the ML chatbot model 1450 using the current policy 1435 may be passed, at block 1406, to the rewards model 1420, which may return the scalar reward 1425. The ML chatbot model 1450 response 1434 may be compared 1438 to the SFT ML model 1415 response 1436 to compute the penalty 1440. A final reward 1442 may be generated which may include the scalar reward 1425 offset and/or restricted by the penalty 1440. The final reward 1442 may be provided to the ML chatbot model 1450 and may update the policy 1435, which in turn may improve the functionality of the ML chatbot model 1450.

To optimize the ML chatbot 1450 over time, RLHF via the human labeler feedback may continue ranking 1426 responses of the ML chatbot model 1450 versus outputs of earlier/other versions of the SFT ML model 1415, i.e., providing positive or negative rewards 1425. The RLHF may allow the chatbot training application 1226 to continue iteratively updating the reward model 1420 and/or the policy 1435. As a result, the ML chatbot model 1450 may be retrained and/or fine-tuned based upon the human feedback via the RLHF process, and throughout continuing conversations may become increasingly efficient.

Although multiple blocks 1402, 1404, 1406 are depicted in the exemplary block and logic diagram 1400, each providing one of the three steps of the overall ML chatbot model 1450 training, fewer and/or additional servers may be utilized and/or may provide the one or more steps of the chatbot 1224 training. In one aspect, one server may provide the entire ML chatbot model 1450 training.

Figure 15:
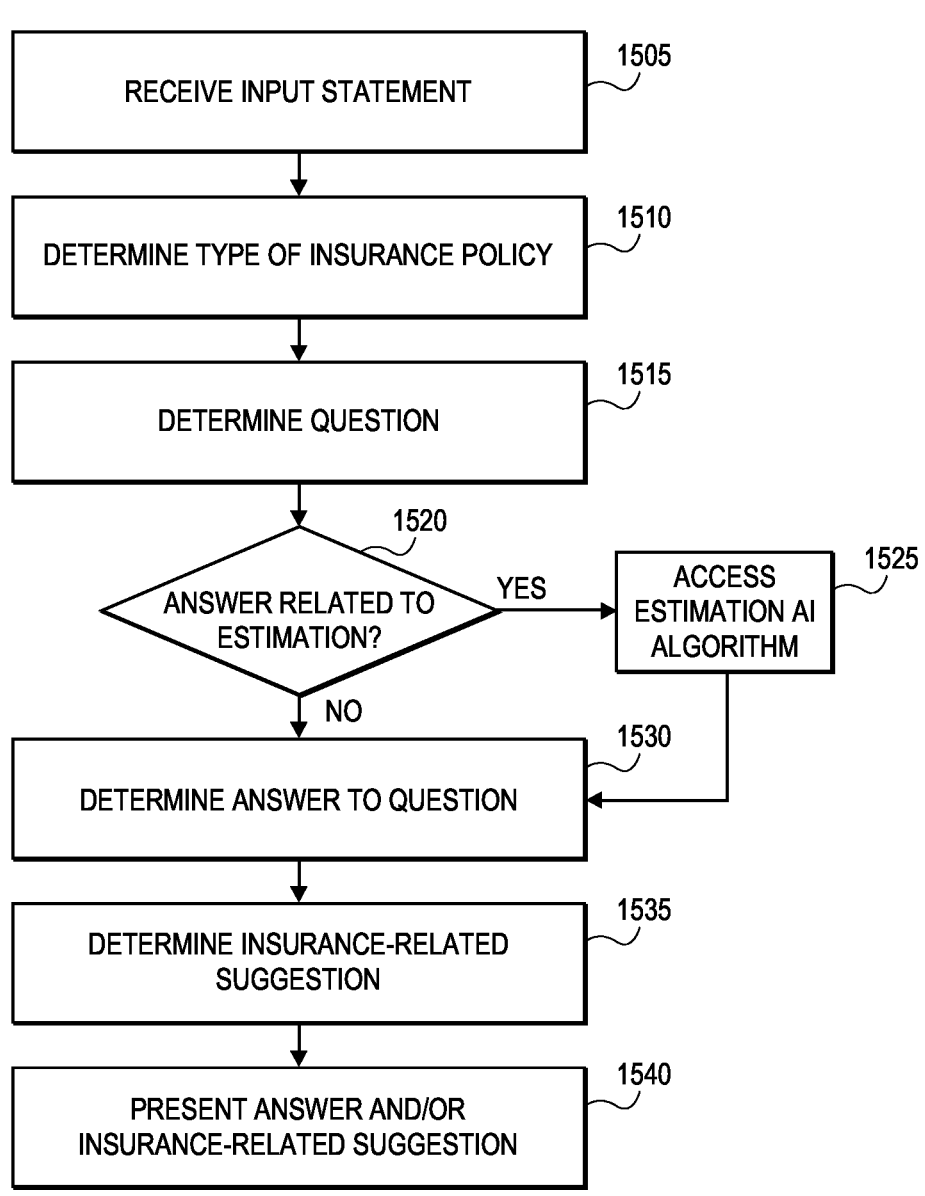
FIG. 15 illustrates an exemplary computer-implemented method of using AI and/or ML to aid underwriting and/or insurance agents.

Exemplary Computer-Implemented Methods—Aiding Underwriters and/or Insurance Agents FIG. 15 shows an exemplary computer-implemented method or implementation 1500 of using AI and/or ML to aid underwriters and/or insurance agents.

The exemplary implementation 1500 may begin at block 1505 when the one or more processors 1220 (e.g., via the chatbot 1224) receive an input statement. The input statement may be received from any suitable source, such as the insurance customer computing device 155, the insurance agent computing device 165, the insurance underwriter computing device 175, and/or the administrator computing device 195. The input statement may include any type of data, such as text data, audio data, etc.

At block 1510, the one or more processors 1220 may determine (e.g., via the chatbot 1224), from the received input statement, a type of insurance policy. Examples of the type of insurance policy include a homeowners insurance policy, a renters insurance policy, an auto insurance policy, a life insurance policy, a disability insurance policy, and/or an umbrella insurance policy.

At block 1515, the one or more processors 1220 may determine (e.g., via the chatbot 1224), from the input statement, a question corresponding to the type of insurance policy.

In some embodiments, the input statement comprises text, and the one or more processors 1220 (e.g., via the chatbot 1224) may apply a natural language processing (NLP) algorithm to the text to generate a word or phrase. In some such embodiments, the determining the type of insurance policy may then include determining the type of insurance policy based upon the word or phrase. Additionally or alternatively, the determining of the question may include determining the question based upon the word or phrase.

In some embodiments, the input statement comprises audio data, and the one or more processors 1220 (e.g., via the chatbot 1224) may apply an audio recognition program to the audio data to generate text. In some such embodiments, the one or more processors 1220 (e.g., via the chatbot 1224) may apply an NLP algorithm to the text to generate a word or phrase. In some such embodiments, the determining the type of insurance policy may then include determining the type of insurance policy based upon the word or phrase. Additionally or alternatively, the determining of the question may include determining the question based upon the word or phrase.

In some examples, the question may be determined directly form the input statement (e.g., directly from the word or phrase). For instance, the input statement may include the phrase "what issues should I check for when writing a homeowners insurance policy in zip code XYZ." In this example, the chatbot 1224 may be able to determine the question directly from the input statement. However, it may be that the input statement does not include a question. For example, the input statement may simply be "I am writing an umbrella insurance policy." In some such examples (e.g., where the chatbot 1224 determines a type of insurance policy, but not a question), the chatbot 1224 may use a default question corresponding to the determined type of insurance policy and/or other factors.

In one such example, the type of insurance policy is a homeowners insurance policy, and the default question corresponding to the type of insurance policy relates to what a most common type of damage to a home is in a particular geographic area. In another such example, the type of insurance policy is a renters insurance policy, and the default question corresponding to the type of insurance policy relates to what a most common type of possession of a renter is in the particular geographic area. In yet another such example, the type of insurance policy is an auto insurance policy, and the default question corresponding to the type of insurance policy relates to what a car theft rate is in the particular geographic area. In yet another such example, the type of insurance policy is an auto insurance policy, and the default question corresponding to the type of insurance policy relates to: services provided by an autobody shop, and/or reviews of the autobody shop.

In yet another such example, the type of insurance policy is a life insurance policy, and the default question corresponding to the type of insurance policy relates to what leading causes of death are in the particular geographic area.

In yet another such example, the type of insurance policy is a disability insurance policy, and the default question corresponding to the type of insurance policy relates to what leading causes of disability are in the particular geographic area. In yet another such example, the type of insurance policy is an umbrella insurance policy, and the default question corresponding to the type of insurance policy relates to an average amount of civil claims against umbrella insurance policy holders in a particular geographic area.

In some examples, the one or more processors 1220 (e.g., via the chatbot 1224) may determine the answer to the question by retrieving insurance information (e.g., insurance-related information) based upon (i) the type of insurance policy, and/or (ii) the question. For example, in some embodiments, the question includes a trigger to retrieve insurance information (e.g., from the ground truth insurance database 140, insurance information aggregator database 144, an insurance claims database [e.g., the internal database 1218 and/or the external database 180], government records database 146, a police reports database 148, a blockchain, repair facility 1250, and/or contractor 1260). For example, the question (e.g., from insurance agent 160) may regard what roofing contractor to recommend following damage to a roof associated with a homeowners insurance claim. In this example, the trigger may cause the one or more processors 1220 to retrieve insurance information from the contractors 1260 to determine availability information (e.g., a first contractor is available immediately, but another contractor will not be available for two weeks). Further in this example, it should be appreciated that the availability of a contractor qualifies as insurance information (e.g., insurance-related information) because it is being used to respond to a request for a contractor to repair damage associated with an insurance claim. In another example, the trigger may cause the one or more processors 1220 to access insurance claims information (e.g., from the internal database 1218, the external database 180, the ground truth insurance database 140, and/or the insurance information aggregator database 144, etc.). In one such example, the question (e.g., from insurance underwriter 170) may relate to what issues to consider in writing a homeowners insurance policy for a particular home, and the one or more processors 1220 access the insurance information to make a determination for the answer (e.g., a determination that there has been an increase in fire-related homeowners insurance claims in nearby homes in the last year, etc.).

In some examples, the trigger comprises a trigger to access an estimation AI algorithm. For example, the question (e.g., from insurance underwriter 170) may relate to the value of a particular home. In this example, the trigger may cause the one or more processors 1220 to retrieve the insurance information by accessing an estimation AI algorithm that estimates home values. Examples of estimation AI algorithms include AI algorithms that estimate: insurance premiums (e.g., of any type of insurance policy), likelihood of an insurance customer filing an insurance claim (e.g., on any type of insurance policy), likelihood that a customer will have additional liability following a complete insurance claim payout (e.g., insurance customer has additional liability for an auto accident following a complete payout of the customer's auto insurance policy), etc.

If it is determined at block 1520 that the answer (e.g., to the question of block 1515) is related to an estimation, the one or more processors 1220 (e.g., via the chatbot 1224) may access the AI estimation algorithm at block 1525 to make the estimation.

At block 1530, the one or more processors 1220 (e.g., via the chatbot 1224) may determine an answer to the question. As should be appreciated, the one or more processors 1220 (e.g., via the chatbot 1224) may make the determination because it has been trained, for example, by any of the techniques discussed herein. As described in more detail elsewhere herein, the determining the answer to the question may include retrieving insurance information based upon the determined type of insurance policy and/or the question. The insurance information may be retrieved from any suitable source (e.g., from the ground truth insurance database 140, insurance information aggregator database 144, an insurance claims database [e.g., the internal database 1218 and/or the external database 180], government records database 146, a police reports database 148, a blockchain, repair facility 1250, and/or contractor 1260). In some examples, where a source being retrieved from is a database, the one or more processors 1220 query the database based upon the type of insurance policy and/or the question.

For example, the question (e.g., from an insurance agent 165) may relate to asking for a range of life insurance policies to offer to a customer 150 based upon her information (e.g., age, health conditions, etc.). As part of determining the answer, the one or more processors 1220 (e.g., via the chatbot 1224) may query (e.g., based upon the type of insurance policy, the question, and/or any other information, such as the customer's 150 age, health conditions, etc.) a database (e.g., the internal database 1218) to retrieve insurance policy information to include in the answer.

In another example of retrieving insurance information, following an auto insurance claim, the insurance agent 160 may ask the chatbot 1224 for a recommendation for a repair facility 1250 (e.g., a repair facility that is an auto body shop). The one or more processors 1220 (e.g., via the chatbot 1224) may then retrieve insurance information from the repair facility 1250, such as information indicating if the repair facility performs the specific type of work needed (e.g., has the capability to work on the particular type of vehicle needing repair), wait times to perform the work, etc. These examples of information retrieved (e.g., capability to work on a vehicle, wait times, etc.) qualify as insurance information because they are associated with the auto insurance claim.

In this regard, it should further be appreciated that answer may include (or be based upon) the estimation made at block 1525 (e.g., retrieving of the insurance information includes using the estimation AI algorithm at least in part to determine the answer). For example, if the question relates to the value of a home, the chatbot 1224 may access the estimation AI algorithm to estimate the value of the home. In another example, if the question relates to writing an umbrella insurance policy, the estimation AI algorithm may first estimate a recommended amount of umbrella insurance policy coverage (e.g., from amounts of insurance claims payouts, etc.), and then base the answer to the question upon the estimation (e.g., the answer to the question is "based upon a recommended level of coverage, the annual premium would be $XYZ").

At block 1530, the chatbot 1224 may determine an insurance-related suggestion. For example, if the question relates to determining a premium for a homeowners insurance policy, the insurance-related suggestion may be to bundle the homeowners insurance policy with an auto insurance policy to obtain a multiline discount. In another example, if the question relates to an auto insurance policy, the insurance-related suggestion may be to also obtain an umbrella insurance policy (e.g., based upon other details of the insurance customer 150 under consideration).

In yet another example, the insurance-related suggestion may be a recommendation for an insurance policy change for the insurance customer 150 (e.g., as determined as discussed elsewhere herein, such as by the insurance change computing device 102, the insurance change recommender 124, the insurance recommendation machine learning algorithm, etc.). In this regard, it should be appreciated that, in some embodiments, the estimation AI algorithm comprises the insurance recommendation machine learning algorithm.

In addition, as described above, some embodiments use query vectors, key vectors, and/or value vectors. For example, the one or more processors 1220 (e.g., via the chatbot 1224) may generate tokens (e.g., by applying an NLP algorithm to text of the input statement; or by first applying an audio recognition program to the input statement, and then applying the NLP algorithm) from the input statement, with each token comprising a word or phrase. The one or more processors 1220 (e.g., via the chatbot 1224) may then build a query vector, a key vector, and/or a value vector for each token. The one or more processors 1220 (e.g., via the chatbot 1224) may then determine a similarity metric between a particular query vector and each key vector by taking respective dot products of the particular query vector and each key vector. The one or more processors 1220 (e.g., via the chatbot 1224) may then generate normalized weights by routing the respective dot products into a softmax function; and may then generate a final vector by multiplying the normalized weights by the value vector of the token, with the final vector representing an importance of the token. The one or more processors 1220 (e.g., via the chatbot 1224) may then base the determination(s) of any of: the type of insurance policy (e.g., block 1510), the question (e.g., 1515), the answer to the question (e.g., 1530), and/or the insurance-related suggestion (e.g., block 1535) upon the final vector.

At block 1540, the answer to the question and/or insurance-related suggestion are presented. For example, the one or more processors 1220 (e.g., via the chatbot 1224) may cause the answer and/or insurance-related suggestion to be presented on a display, such as a display device of the insurance customer computing device 155, the insurance agent computing device 165, the insurance underwriter computing device 175, and/or the administrator computing device 195.

Moreover, although the preceding discussion refers to block of the exemplary method or implementation 1500 as being performed by the chatbot 1224 and/or the one or more processors 1220, it should be understood that any or all of the blocks may be alternatively or additionally performed by any other suitable component as well (e.g., the insurance customer computing device 155, the insurance agent computing device 165, the insurance underwriter computing device 175, the administrator computing device 195, etc.). Additional Exemplary Embodiments—Aiding Underwriters and/or Insurance Agents In one aspect, a computer-implemented method for improved artificial intelligence (AI) insurance analysis may be provided. The method may be implemented via one or more local or remote processors, sensors, transceivers, servers, memory units, mobile devices, augmented reality glasses or headsets, extended or virtual reality headsets, smart glasses or watches, smart contacts, voice bots, chatbots, ChatGPT bots, wearables, and/or other electronic or electrical components. For instance, in one example, the method may comprise: (1) receiving, with an AI chatbot (or voice bot) of the one or more processors, an input statement; (2) determining, with the AI chatbot, from the received input statement, a type of insurance policy, wherein the type of insurance policy comprises a homeowners insurance policy, a renters insurance policy, an auto insurance policy, a life insurance policy, a disability insurance policy, and/or an umbrella insurance policy; (3) determining, with the AI chatbot, from the input statement, a question corresponding to the type of insurance policy; (4) determining, with the AI chatbot, an answer to the question by retrieving insurance information based upon (i) the type of insurance policy, and (ii) the question; and/or (5) presenting, via the AI chatbot, the answer to the question. The method may include additional, fewer, or alternate actions, including those discussed elsewhere herein.

In some embodiments, the input statement comprises text; the method further comprises, with the AI chatbot, applying a natural language processing (NLP) algorithm to the text to generate a word or phrase; and/or (i) the determining the type of insurance policy comprises determining the type of insurance policy based upon the word or phrase; and/or (ii) the determining the question comprises determining the question based upon the word or phrase.

In some embodiments, the input statement comprises audio data; the method further comprises, with the AI chatbot, (i) applying an audio recognition program to the audio data to generate text, and (ii) applying a natural language processing (NLP) algorithm to the text to generate a word or phrase; and/or (i) the determining the type of insurance policy comprises determining the type of insurance policy based upon the word or phrase; and/or (ii) the determining the question comprises determining the question based upon the word or phrase.

In some embodiments, the retrieving the insurance information comprises retrieving the insurance information from: (i) a ground truth insurance database, (ii) an insurance information aggregator database, (iii) an insurance claims database, (iv) a government records database, (v) a police reports database, and/or (vi) a blockchain.

In some embodiments, the determining the question corresponding to the type of insurance policy comprises: determining, with the AI chatbot, that no question exists in the input statement; and/or in response to determining that no question exists in the input statement, setting, with the AI chatbot, the determined question to be a default question corresponding to the type of insurance policy.

In some embodiments, one of: the type of insurance policy is a homeowners insurance policy, and the default question corresponding to the type of insurance policy relates to what a most common type of damage to a home is in a particular geographic area; the type of insurance policy is a renters insurance policy, and the default question corresponding to the type of insurance policy relates to what a most common type of possession of a renter is in the particular geographic area; the type of insurance policy is an auto insurance policy, and the default question corresponding to the type of insurance policy relates to what a car theft rate is in the particular geographic area; the type of insurance policy is an auto insurance policy, and the default question corresponding to the type of insurance policy relates to: services provided by an autobody shop, and/or reviews of the autobody shop; the type of insurance policy is a life insurance policy, and the default question corresponding to the type of insurance policy relates to what leading causes of death are in the particular geographic area; the type of insurance policy is a disability insurance policy, and the default question corresponding to the type of insurance policy relates to what leading causes of disability are in the particular geographic area; or the type of insurance policy is an umbrella insurance policy, and the default question corresponding to the type of insurance policy relates to an average amount of civil claims against umbrella insurance policy holders in a particular geographic area.

In some embodiments, the AI chatbot includes: a generative AI chatbot, a deep learning algorithm, a generative pre-trained transformer (GPT), and/or long-short-term-memory (LSTM).

In some embodiments, the method further includes, via the one or more processors: with the AI chatbot, applying a natural language processing (NLP) algorithm to the text to generate a plurality of tokens, each token comprising a word or phrase; building, with the AI chatbot, a query vector, a key vector, and/or a value vector for each token of the plurality of tokens; determining, with the AI chatbot, a similarity metric between a built query vector of a token of the plurality of tokens and each built key vector by taking respective dot products of the built query vector and each built key vector; generating, with the AI chatbot, normalized weights by routing the respective dot products into a soft-max function; and/or generating, with the AI chatbot, a final vector by multiplying the normalized weights by the value vector of the token of the plurality of token, wherein the final vector represents an importance of the token of the plurality of tokens.

In some embodiments, the determining the type of insurance policy comprises determining the type of insurance policy based upon the final vector; the determining the question corresponding to the type of insurance policy comprises determining the question corresponding to the type of insurance policy based upon the final vector; and/or the determining the answer comprises determining the answer based upon the final vector.

In some embodiments, the method further includes training the AI chatbot by inputting, via the one or more processors, into the AI chatbot, historical data from a ground truth insurance database.

In some embodiments, the method further includes training the AI chatbot through a supervised learning process by inputting, via the one or more processors, into the AI chatbot: insurance agent questions, and corresponding insurance agent answers; insurance underwriter questions, and corresponding insurance underwriter answers; and/or insurance customer questions, and corresponding insurance customer answers.

In some embodiments, the method further includes: determining, with the AI chatbot, that the answer to the question is related to an estimation; and/or wherein, in response to determining that the answer to the question is related to the estimation, determining the answer to the question further comprises the AI chatbot using an estimation AI algorithm to determine the answer to the question.

In some embodiments, the question is related to a value of a home, and the estimation is an estimation of a value of the home; and/or the estimation AI algorithm is trained to estimate home values.

In another aspect, a computer system for improved artificial intelligence (AI) insurance analysis may be provided. The computer system may include one or more local or remote processors, sensors, transceivers, servers, memory units, mobile devices, augmented reality glasses or headsets, extended or virtual reality headsets, smart glasses or watches, smart contacts, chatbots, voice bots, ChatGPT bots, wearables, and/or other electronic or electrical components. For instance, in one example, the computer system may include one or more processors configured to: (1) receive, with an AI chatbot of the one or more processors, an input statement; (2) determine, with the AI chatbot, from the received input statement, a type of insurance policy, wherein the type of insurance policy comprises a homeowners insurance policy, a renters insurance policy, an auto insurance policy, a life insurance policy, a disability insurance policy, and/or an umbrella insurance policy; (3) determine, with the AI chatbot, from the input statement, a question corresponding to the type of insurance policy; (4) determine, with the AI chatbot, an answer to the question by retrieving insurance information based upon (i) the type of insurance policy, and (ii) the question; and/or (5) present, via the AI chatbot, the answer to the question. The computer system may include additional, less, or alternate functionality, including that discussed elsewhere herein.

In some embodiments, the computer system further comprises a display device, and wherein the one or more processors are further configured to perform the present of the answer to the question by displaying, on the display device, the answer.

In some embodiments, the input statement comprises text; and the one or more processors are further configured to: with the AI chatbot, apply a natural language processing (NLP) algorithm to the text to generate a word or phrase; and/or determine the type of insurance policy by determining the type of insurance policy based upon the word or phrase.

In some embodiments, the one or more processors are configured to retrieve the insurance information from: (i) a ground truth insurance database, (ii) an insurance information aggregator database, (iii) an insurance claims database, (iv) a government records database, (v) a police reports database, and/or (vi) a blockchain.

In yet another aspect, a computer device for improved artificial intelligence (AI) insurance analysis may be provided. The computer device may include one or more local or remote processors, sensors, transceivers, servers, memory units, mobile devices, augmented reality glasses or headsets, extended or virtual reality headsets, smart glasses or watches, smart contacts, chatbots, voice bots, ChatGPT bots, wearables, and/or other electronic or electrical components. For instance, in one example, the computer device may include: one or more processors; and/or one or more memories. The one or more memories having stored thereon computer-executable instructions that, when executed by the one or more processors, may cause the computer device to: (1) receive, with an AI chatbot of the one or more processors, an input statement; (2) determine, with the AI chatbot, from the received input statement, a type of insurance policy, wherein the type of insurance policy comprises a homeowners insurance policy, a renters insurance policy, an auto insurance policy, a life insurance policy, a disability insurance policy, and/or an umbrella insurance policy; (3) determine, with the AI chatbot, from the input statement, a question corresponding to the type of insurance policy; (4) determine, with the AI chatbot, an answer to the question by retrieving insurance information based upon (i) the type of insurance policy, and (ii) the question; and/or (5) present, via the AI chatbot, the answer to the question. The computer device may include additional, less, or alternate functionality, including that discussed elsewhere herein.

In some embodiments, the computer device further comprises a display device, and wherein the one or more memories having stored thereon computer executable instructions that, when executed by the one or more processors, further cause the computer device to perform the present of the answer to the question by displaying, on the display device, the answer.

In some embodiments, the one or more memories having stored thereon computer executable instructions that, when executed by the one or more processors, further cause the computer device to perform the retrieve of the insurance information by retrieving the insurance information from: (i) a ground truth insurance database, (ii) an insurance information aggregator database, (iii) an insurance claims database, (iv) a government records database, (v) a police reports database, and/or (vi) a blockchain.

In yet another aspect, a computer-implemented method for improved artificial intelligence (AI) or machine learning (ML) insurance analysis may be provided. The method may be implemented via one or more local or remote processors, sensors, transceivers, servers, memory units, mobile devices, augmented reality glasses or headsets, extended or virtual reality headsets, smart glasses or watches, smart contacts, voice bots, chatbots, ChatGPT bots, wearables, and/or other electronic or electrical components. For instance, in one example, the method may comprise: (1) receiving, with an AI or ML chatbot of the one or more processors, an input statement; (2) determining, with the AI or ML chatbot, from the received input statement, a type of insurance policy, wherein the type of insurance policy comprises a homeowners insurance policy, a renters insurance policy, an auto insurance policy, a life insurance policy, a disability insurance policy, and/or an umbrella insurance policy; (3) determining, with the AI or ML chatbot, from the input statement, a question corresponding to the type of insurance policy; (4) determining, with the AI or ML chatbot, an answer to the question by retrieving insurance information based upon (i) the type of insurance policy, and (ii) the question; and/or (5) presenting, via the AI or ML chatbot, the answer to the question. The method may include additional, fewer, or alternate actions, including those discussed elsewhere herein.

Exemplary System—Using AI and/or ML to Build and/or Present an Insurance Contract The present embodiments relate to, inter alia, using AI and/or ML to write an insurance contract (e.g., including an insurance policy). For example, an AI and/or ML chatbot (or voice bot) may receive an input statement from an insurance customer and/or insurance agent, and write an insurance contract to be signed by customer. Potential insurance customers may also tell the AI and/or ML chatbot the insurance terms that they want. A human insurance agent may review contract before it is sent to insurance customer. It should be appreciated that the writing of an insurance contract may include the writing of an insurance policy because insurance contracts often create agreements to be bound by insurance policies.

Figure 16:
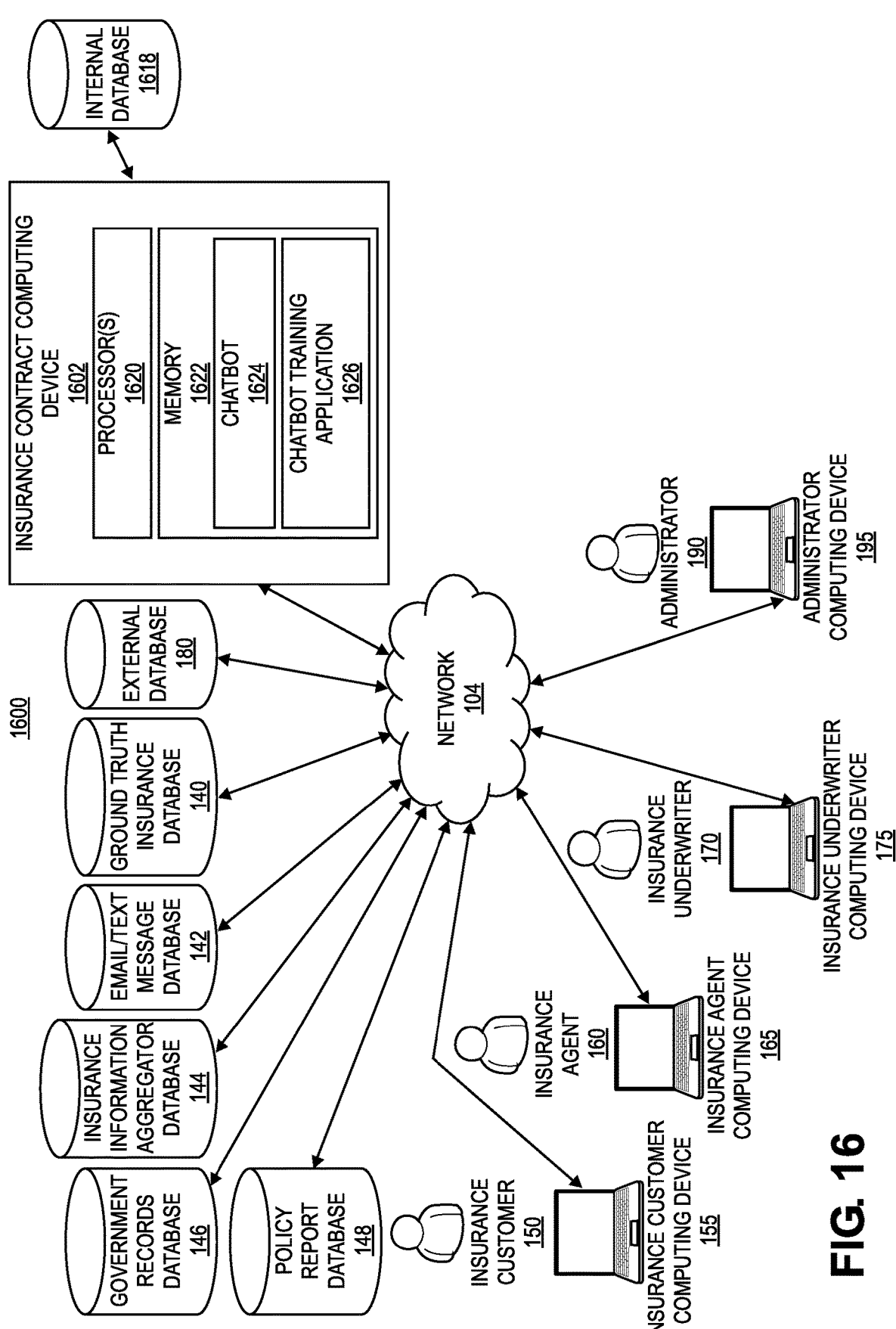
FIG. 16 illustrates an exemplary computer system for using AI and/or ML to build and/or present an insurance contract, according to one embodiment.

To this end, FIG. 16 illustrates an exemplary computer system 1600 for using AI and/or ML to build and/or present an insurance contract in which the exemplary computer-implemented methods described herein may be implemented. The high-level architecture includes both hardware and software applications, as well as various data communications channels for communicating data between the various hardware and software components.

The insurance contract computing device 1602 may include one or more processors 1620 such as one or more microprocessors, controllers, and/or any other suitable type of processor. The insurance contract computing device 1602 may further include a memory 1622 (e.g., volatile memory, non-volatile memory) accessible by the one or more processors 1620, (e.g., via a memory controller). The one or more processors 1620 may interact with the memory 1622 to obtain and execute, for example, computer-readable instructions stored in the memory 1622. Additionally or alternatively, computer-readable instructions may be stored on one or more removable media (e.g., a compact disc, a digital versatile disc, removable flash memory, etc.) that may be coupled to the insurance contract computing device 1602 to provide access to the computer-readable instructions stored thereon. In particular, the computer-readable instructions stored on the memory 1622 may include instructions for executing various applications, such as chatbot 1624 (which may additionally or alternatively be voicebot 1624), and/or chatbot training application 1626. In this regard, it should be understood that although 1624 is labeled as chatbot, 1624 may additionally or alternatively be a voicebot. It should further be understood that chatbot/voicebot 1624 may be an AI and/or ML chatbot/voicebot.

An insurance company that owns the insurance contract computing device 1602 may provide insurance to insurance customers, such as the insurance customer 150. For example, the insurance company may also provide insurance policies, such as a life insurance policy, a homeowners insurance policy, a renters insurance policy, an auto insurance policy, an umbrella insurance policy, and/or a disability insurance policy, etc. As such, in some situations, it may be useful for the insurance company to use AI or ML to write an insurance contract for the insurance customer 150. In some aspects, the insurance contract computing device 1602 is able to build insurance contracts specifically tailored to the needs and/or desires of the insurance customer 150. For example, the chatbot 1624 may ask questions to any of the insurance customer 150, insurance agent 160 and/or the insurance underwriter 170 to obtain the necessary information for writing the insurance contract. In addition, advantageously, the chatbot 1624 may draw on highly reliable information from the ground truth insurance database 140.

Figure 17:
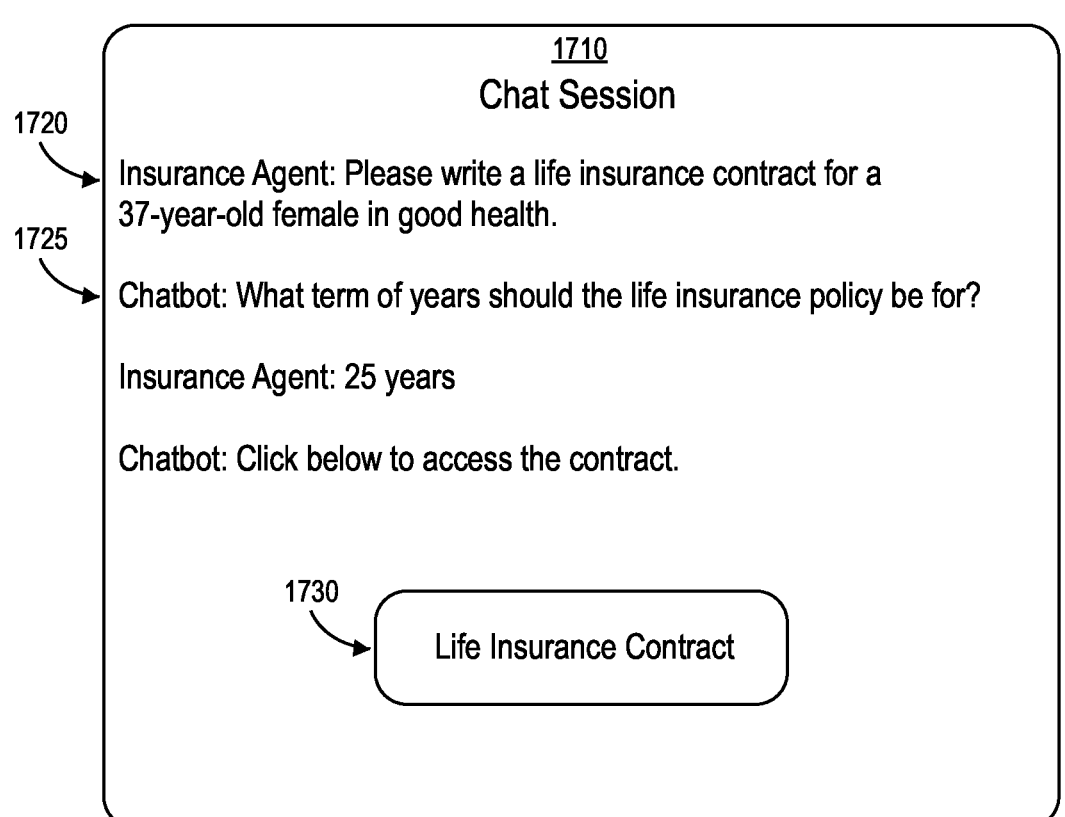
FIG. 17 depicts an exemplary chat session leading to the building of an insurance contract.

To this end, the chatbot 1624 may, inter alia, have a conversation with the insurance customer 150, the insurance agent 160 and/or the insurance underwriter 170. FIG. 17 depicts such an example of a conversation between the chatbot 1624 and the insurance agent 160. More specifically, FIG. 17 illustrates an exemplary screen 1700 of a chat session 1710 between the chatbot 1624 and the insurance agent 160, which may be displayed on the insurance agent computing device 165. In the illustrated example, the chatbot 1624 receives the input statement 1720 asking. "Please write a life insurance contract for a 37-year-old female in good health." In response, the chatbot 1624 asks, "What term of years should the life insurance policy be for?" After receiving the answer 1725 (25 years), the chatbot 1624 writes the insurance contract, which the insurance agent 160 is able to access via the link 1730.

Advantageously, as part of writing the insurance contract, the chatbot 1624 may access an estimation AI algorithm. For instance, in the example of FIG. 17, the chatbot 1624 may access an estimation algorithm to estimate a life insurance premium, and then include the life insurance premium in the contract. For example, the chatbot may enter the inputs of age (37 years), gender (female), health (good), and/or term (25 years) into the estimation AI algorithm to estimate the insurance premium.

Examples of estimation AI algorithms include AI algorithms that estimate: insurance premiums (e.g., of any type of insurance policy), likelihood of an insurance customer filing an insurance claim (e.g., on any type of insurance policy), likelihood that a customer will have additional liability following a complete insurance claim payout (e.g., insurance customer has additional liability for an auto accident following a complete payout of the customer's auto insurance policy), value of a home, etc.

Further advantageously, to write the insurance contract, the chatbot 1624 may use information from the ground truth database 140. Further advantageously, the chatbot 1624 may be trained using information from the ground truth insurance database 140. In particular, this is advantageous because the ground truth insurance database 140 holds information that is more reliable than other sources; and, more specifically, holds information that is more reliable and particularly useful for insurance purposes. The ground truth insurance database 140 is described in more detail elsewhere herein.

As described elsewhere herein, the ground truth insurance database 140 may hold any suitable information. Examples of the information held by the ground truth insurance database 140 include (i) insurance company application (app) information, (ii) anonymized insurance claim information, (iii) police report information, and/or (iv) auxiliary information. The information held by the ground truth database 140 may include information of any type, such as text information, imagery information (e.g., images, video, etc.), audio information, etc.

The chatbot 1624 may be trained by the chatbot training application 1626. It should be appreciated that the techniques discussed herein with respect to training a chatbot via the chatbot training application 1626 apply equally as well to training a voice bot. Broadly speaking, the chatbot training application 1626 may train the chatbot 1624 to build insurance contracts and/or converse with a human (e.g., the insurance agent 160). The training of the chatbot 1624 is described in more detail elsewhere herein.

The email/text message database 142, the insurance information aggregator database 144 the government records database 146, the police reports database 148 and the external database 180 are also described in more detail elsewhere herein.

In addition, further regarding the example system 1600, the illustrated exemplary components may be configured to communicate, e.g., via the network 104 (which may be a wired or wireless network, such as the internet), with any other component. Furthermore, although the example system 1600 illustrates only one of each of the components, any number of the example components are contemplated (e.g., any number of external databases, ground truth insurance databases, email/text message databases, insurance information aggregator databases, government records databases, police reports databases, insurance customers, insurance customer computing devices, insurance agents, insurance agent computing devices, insurance underwriters, insurance underwriter computing devices, administrators, administrator computing devices, insurance chatbot computing devices, etc.).

Exemplary Training of an Exemplary Chatbot

An insurance company may use chatbot 1624 to, inter alia (i) provide tailored, conversational-like services (e.g., communicating with the insurance customer 150, the insurance agent 160 and/or the insurance underwriter 170, etc.) (e.g., in order to obtain information for building the insurance contract), and/or (ii) build insurance contracts. The chatbot 1624 may be capable of understanding requests, providing relevant information, escalating issues. Additionally, the chatbot 1624 may generate data from interactions which the enterprise may use to personalize future support and/or improve the chatbot's functionality, e.g., when retraining and/or fine-tuning the chatbot. Moreover, although the following discussion may refer to an ML chatbot or an ML model, it should be understood that it applies equally to an AI chatbot or an AI model.

The chatbot 1624 may be trained by chatbot training application 1626 using large training datasets of text which may provide sophisticated capability for natural-language tasks, such as answering questions and/or holding conversations. The chatbot 1624 may include a general-purpose pretrained LLM which, when provided with a starting set of words (prompt) as an input, may attempt to provide an output (response) of the most likely set of words that follow from the input. In one aspect, the prompt may be provided to, and/or the response received from, the chatbot 1624 and/or any other ML model, via a user interface of the insurance contract computing device 1602. This may include a user interface device operably connected to the server via an I/O module. Exemplary user interface devices may include a touchscreen, a keyboard, a mouse, a microphone, a speaker, a display, and/or any other suitable user interface devices.

Multi-turn (i.e., back-and-forth) conversations may require LLMs to maintain context and coherence across multiple user utterances, which may require the chatbot 1624 to keep track of an entire conversation history as well as the current state of the conversation. The chatbot 1624 may rely on various techniques to engage in conversations with users, which may include the use of short-term and long-term memory. Short-term memory may temporarily store information (e.g., in the memory 1602 of the insurance contract computing device 1602) that may be required for immediate use and may keep track of the current state of the conversation and/or to understand the user's latest input in order to generate an appropriate response. Long-term memory may include persistent storage of information (e.g., the internal database 1618 of the insurance contract computing device 1602) which may be accessed over an extended period of time. The long-term memory may be used by the chatbot 1624 to store information about the user (e.g., preferences, chat history, etc.) and may be useful for improving an overall user experience by enabling the chatbot 1624 to personalize and/or provide more informed responses.

In some embodiments, the system and methods to generate and/or train an ML chatbot model (e.g., via the chatbot training application 1626) which may be used in the chatbot 1624, may include three steps: (1) a supervised fine-tuning (SFT) step where a pretrained language model (e.g., an LLM) may be fine-tuned on a relatively small amount of demonstration data curated by human labelers to learn a supervised policy (SFT ML model) which may generate responses/outputs from a selected list of prompts/inputs. The SFT ML model may represent a cursory model for what may be later developed and/or configured as the ML chatbot model; (2) a reward model step where human labelers may rank numerous SFT ML model responses to evaluate the responses which best mimic preferred human responses, thereby generating comparison data. The reward model may be trained on the comparison data; and/or (3) a policy optimization step in which the reward model may further fine-tune and improve the SFT ML model. The outcome of this step may be the ML chatbot model using an optimized policy. In one aspect, step one may take place only once, while steps two and three may be iterated continuously, e.g., more comparison data is collected on the current ML chatbot model, which may be used to optimize/update the reward model and/or further optimize/update the policy.

Supervised Fine-Tuning ML Model

Figure 18:
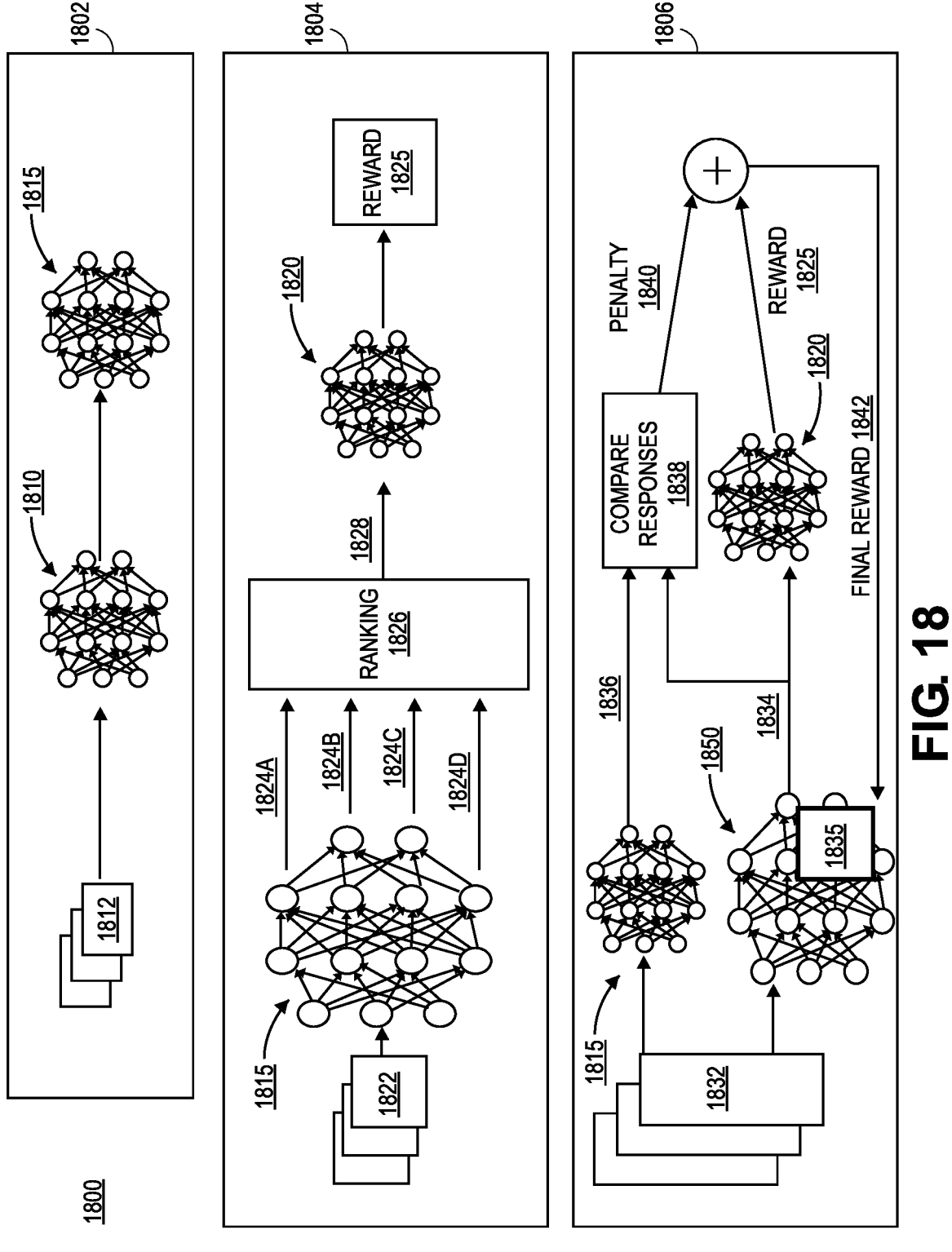
FIG. 18 depicts an exemplary combined block and logic diagram for exemplary training of an exemplary chatbot.

FIG. 18 depicts a combined block and logic diagram 1800 for training an ML chatbot model, in which the techniques described herein may be implemented, according to some embodiments. It should be understood that FIG. 18 may apply to training any chatbot described herein, and FIG. 18 should not be considered to be restricted to the chatbot 1624. In addition, the chatbot 1624 may be trained in accordance with any of the other techniques described herein; and the training of chatbot 1624 should not be considered restricted to the teachings of FIG. 18.

Some of the blocks in FIG. 18 may represent hardware and/or software components, other blocks may represent data structures or memory storing these data structures, registers, or state variables (e.g., 1812), and other blocks may represent output data (e.g., 1825). Input and/or output signals may be represented by arrows labeled with corresponding signal names and/or other identifiers. The methods and systems may include one or more blocks 1802, 1804, 1806, which will be described in further detail below.

In one aspect, at block 1802, a pretrained language model 1810 may be fine-tuned. The pretrained language model 1810 may be obtained at block 1802 and be stored in a memory, such as memory 1622 and/or internal database 1618. The pretrained language model 1810 may be loaded into an ML training module at block 1802 for retraining/fine-tuning. A supervised training dataset 1812 may be used to fine-tune the pretrained language model 1810 wherein each data input prompt to the pretrained language model 1810 may have a known output response for the pretrained language model 1810 to learn from. The supervised training dataset 1812 may be stored in a memory at block 1802, e.g., the memory 1622 or the internal database 1618. In one aspect, the data labelers may create the supervised training dataset 1812 prompts and appropriate responses. The pretrained language model 1810 may be fine-tuned using the supervised training dataset 1812 resulting in the SFT ML model 1815 which may provide appropriate responses to user prompts once trained. The trained SFT ML model 1815 may be stored in a memory, such as the memory 1622 or the internal database 1618.

In some examples, the supervised training dataset 1812 includes historical data (e.g., held by the ground truth insurance database 140, etc.). The historical data may include, for example: (a) historical input statements, (b) historical responses to the input statements, and/or (c) historical insurance contracts. In some embodiments, the chatbot 1624 may be trained using the above (a) as input (e.g., also referred to as an independent variable, or explanatory variable), and the above (b)-(c) used as the output (e.g., also referred to as a dependent variables, or response variables). Put another way, based upon the historical input statements, the chatbot 1624 may be trained to generate responses to the input statements, and/or build instance contracts.

Regarding (a) above, examples of the historical input statements may include requests to write insurance contracts (e.g., 1720 of the example of FIG. 17); questions to an insurance chatbot; etc.

Regarding (b) above, examples of the historical responses to the input statements include requests for additional information (e.g., 1725 of the example of FIG. 17); questions; etc.

Regarding (c) above, examples of the historical insurance contracts include contracts held by the ground truth insurance database 140, the insurance information aggregator database 144, the internal database 1618, etc. In some examples, the chatbot 1624 may need to be updated and/or retrained with a different and/or modified set of historical insurance contracts. For example, if a jurisdiction adds or removes a requirement for homeowners insurance policies to have flood insurance, the chatbot 1624 may need to be accordingly updated and/or retrained with a different and/or modified set of historical insurance contracts.

Further regarding (c) above, in some embodiments, the historical insurance contracts include placeholders to insert various criteria. For example, a historical insurance contract may include a placeholder to insert a life insurance premium. As will become clear, in some examples, this enables the chatbot 1624 to write the insurance contract, including inserting a determined or estimated insurance premium or other criteria into the placeholder. Examples of the criteria are discussed elsewhere herein. In some embodiments, a human (e.g., the insurance agent 160, the insurance underwriter 170, the administrator 190, etc.) indicates where the placeholder is in the historical insurance contract.

Training the Reward Model

In one aspect, training the ML chatbot model 1850 may include, at block 1804, training a reward model 1820 to provide as an output a scaler value/reward 1825. The reward model 1820 may be required to leverage reinforcement learning with human feedback (RLHF) in which a model (e.g., ML chatbot model 1850) learns to produce outputs which maximize its reward 1825, and in doing so may provide improved responses and/or insurance contracts.

Training the reward model 1820 may include, at block 1804, providing a single prompt 1822 to the SFT ML model 1815 as an input. The input prompt 1822 (e.g., a historical input statement) may be provided via an input device (e.g., a keyboard) of the insurance contract computing device 1602. The prompt 1822 may be previously unknown to the SFT ML model 1815, e.g., the labelers may generate new prompt data, the prompt 1822 may include testing data stored on internal database 1618, and/or any other suitable prompt data. The SFT ML model 1815 may generate multiple, different output responses 1824A, 1824B, 1824C, 1824D to the single prompt 1822. In some embodiments, the different output responses 1824A, 1824B, 1824C. 1824D include: (i) suggested responses, and/or (ii) suggested insurance contracts.

At block 1804, the insurance contract computing device 1602 (and/or the insurance customer computing device 155, insurance agent computing device 165, insurance underwriter computing device 175, administrator computing device 195, etc.) may output the responses 1824A, 1824B, 1824C, 1824D via any suitable technique, such as outputting via a display (e.g., as text responses), a speaker (e.g., as audio/voice responses), etc., for review by the data labelers.

The data labelers may provide feedback (e.g., via the insurance contract computing device 1602, the administrator computing device 195, the insurance underwriting computing device 175, the insurance agent computing device 165, etc.) on the responses 1824A, 1824B, 1824C, 1824D when ranking 1826 them from best to worst based upon the prompt-response pairs. The data labelers may rank 1826 the responses 1824A, 1824B, 1824C, 1824D by labeling the associated data. The ranked prompt-response pairs 1828 may be used to train the reward model 1820. In one aspect, the insurance contract computing device 1602 may load the reward model 1820 via the chatbot training application 1626 and train the reward model 1820 using the ranked response pairs 1828 as input. The reward model 1820 may provide as an output the scalar reward 1825.

In one aspect, the scalar reward 1825 may include a value numerically representing a human preference for the best and/or most expected response to a prompt, i.e., a higher scaler reward value may indicate the user is more likely to prefer that response, and a lower scalar reward may indicate that the user is less likely to prefer that response. For example, inputting the "winning" prompt-response (i.e., input-output) pair data to the reward model 1820 may generate a winning reward. Inputting a "losing" prompt-response pair data to the same reward model 1820 may generate a losing reward. The reward model 1820 and/or scalar reward 1836 may be updated based upon labelers ranking 1826 additional prompt-response pairs generated in response to additional prompts 1822.

In one example, a data labeler may provide to the SFT ML model 1815 as an input prompt 1822, "Describe the sky." The input may be provided by the labeler (e.g., via the administrator computing device 195, the insurance underwriting computing device 175, the insurance agent computing device 165, etc.) to the insurance contract computing device 1602 running chatbot 1624 utilizing the SFT ML model 1615. The SFT ML model 1615 may provide as output responses to the labeler (e.g., via their respective devices): (i) "the sky is above" 1824A; (ii) "the sky includes the atmosphere and may be considered a place between the ground and outer space" 1824B; and (iii) "the sky is heavenly" 1824C. The data labeler may rank 1826, via labeling the prompt-response pairs, prompt-response pair 1822/1824B as the most preferred answer; prompt-response pair 1822/1824A as a less preferred answer; and prompt-response 1822/1824C as the least preferred answer. The labeler may rank 1826 the prompt-response pair data in any suitable manner. The ranked prompt-response pairs 1828 may be provided to the reward model 1820 to generate the scalar reward 1825. It should be appreciated that this facilitates training the chatbot 1624 to determine questions corresponding various types of insurance policies, and answers corresponding to the types of insurance policies.

While the reward model 1820 may provide the scalar reward 1825 as an output, the reward model 1820 may not generate a response (e.g., text). Rather, the scalar reward 1825 may be used by a version of the SFT ML model 1815 to generate more accurate responses to prompts, i.e., the SFT model 1815 may generate the response such as text to the prompt, and the reward model 1820 may receive the response to generate a scalar reward 1825 of how well humans perceive it. Reinforcement learning may optimize the SFT model 1815 with respect to the reward model 1820 which may realize the configured ML chatbot model 1850.

RLHF to Train the ML Chatbot Model

In one aspect, the insurance contract computing device 1602 may train the ML chatbot model 1850 (e.g., via the chatbot training application 1626) to generate a response 1834 to a random, new and/or previously unknown user prompt 1832. To generate the response 1834, the ML chatbot model 1850 may use a policy 1835 (e.g., algorithm) which it learns during training of the reward model 1820, and in doing so may advance from the SFT model 1815 to the ML chatbot model 1850. The policy 1835 may represent a strategy that the ML chatbot model 1850 learns to maximize its reward 1825. As discussed herein, based upon prompt-response pairs, a human labeler may continuously provide feedback to assist in determining how well the ML chatbot's 1850 responses match expected responses to determine rewards 1825. The rewards 1825 may feed back into the ML chatbot model 1850 to evolve the policy 1835. Thus, the policy 1835 may adjust the parameters of the ML chatbot model 1850 based upon the rewards 1825 it receives for generating good responses. The policy 1835 may update as the ML chatbot model 1850 provides responses 1834 to additional prompts 1832.

In one aspect, the response 1834 of the ML chatbot model 1850 using the policy 1835 based upon the reward 1825 may be compared 1838 to the SFT ML model 1815 (which may not use a policy) response 1836 of the same prompt 1832. The insurance contract computing device 1602 may compute a penalty 1840 based upon the comparison 1838 of the responses 1834, 1836. The penalty 1840 may reduce the distance between the responses 1834, 1836, i.e., a statistical distance measuring how one probability distribution is different from a second, in one aspect the response 1834 of the ML chatbot model 1850 versus the response 1836 of the SFT model 1815. Using the penalty 1840 to reduce the distance between the responses 1834, 1836 may avoid a server over-optimizing the reward model 1820 and deviating too drastically from the human-intended/preferred response. Without the penalty 1840, the ML chatbot model 1850 optimizations may result in generating responses 1834 which are unreasonable but may still result in the reward model 1820 outputting a high reward 1825.

In one aspect, the responses 1834 of the ML chatbot model 1850 using the current policy 1835 may be passed, at block 1806, to the rewards model 1820, which may return the scalar reward 1825. The ML chatbot model 1850 response 1834 may be compared 1838 to the SFT ML model 1815 response 1836 to compute the penalty 1840. A final reward 1842 may be generated which may include the scalar reward 1825 offset and/or restricted by the penalty 1840. The final reward 1842 may be provided to the ML chatbot model 1850 and may update the policy 1835, which in turn may improve the functionality of the ML chatbot model 1850.

To optimize the ML chatbot 1850 over time, RLHF via the human labeler feedback may continue ranking 1826 responses of the ML chatbot model 1850 versus outputs of earlier/other versions of the SFT ML model 1815, i.e., providing positive or negative rewards 1825. The RLHF may allow the chatbot training application 1626 to continue iteratively updating the reward model 1820 and/or the policy 1835. As a result, the ML chatbot model 1850 may be retrained and/or fine-tuned based upon the human feedback via the RLHF process, and throughout continuing conversations may become increasingly efficient.

Although multiple blocks 1802, 1804, 1806 are depicted in the exemplary block and logic diagram 1800, each providing one of the three steps of the overall ML chatbot model 1850 training, fewer and/or additional servers may be utilized and/or may provide the one or more steps of the chatbot 1624 training. In one aspect, one server may provide the entire ML chatbot model 1850 training.

Exemplary Computer-Implemented Methods—Using AI and/or ML to Build and/or Present an Insurance Contract FIG. 19 shows an exemplary computer-implemented method or implementation 1900 for using AI and/or ML to build and/or present an insurance contract.

The exemplary implementation 1900 may begin at block 1905 when the one or more processors 1620 (e.g., via the chatbot 1624) receive an input statement. The input statement may be received from any suitable source, such as the insurance customer computing device 155, the insurance agent computing device 165, the insurance underwriter computing device 175, and/or the administrator computing device 195. The input statement may include any type of data, such as text data, audio data, etc.

At block 1910, the one or more processors 1620 (e.g., via the chatbot 1624) receive location information (e.g., of insurance customer 150). In some embodiments, the location information includes an indication of a location derived from a global positioning system (GPS) signal, a cell phone signal, and/or internet protocol (IP) address data. In some embodiments, the location information includes information of cell phone towers, and a triangulation technique may be used to derive the indication of the location (e.g., of the insurance customer 150). As will be seen, the location information may be useful (e.g., to the chatbot 1624) in writing the insurance contract.

At block 1915, the one or more processors 1620 (e.g., via the chatbot 1624) determine, from the received input statement, a type of insurance policy. Examples of the types of insurance policy include: a homeowners insurance policy, a renters insurance policy, an auto insurance policy, a life insurance policy, a disability insurance policy, and/or an umbrella insurance policy.

At block 1920, the one or more processors 1620 (e.g., via the chatbot 1624) determine and present a response (e.g., present the response by displaying the response on any of the insurance customer computing device 155, the insurance agent computing device 165, the insurance underwriter computing device 175, and/or the administrator computing device 195).

The response may be determined by any suitable technique, such as by using the chatbot 1624, which may be trained in accordance with any of the techniques described herein.

In some embodiments, the response includes a request for confirmation of a location of the insurance customer 150 and/or a jurisdiction for the insurance contract based upon the location information received at block 1910. Examples of such responses include "Are you located in Cook County, Illinois?", "Please confirm that you are located in Texas", "Will this insurance policy be for a residence in Florida?" and/or "Is your primary address in Oklahoma?" As will be seen, this confirmation allows the chatbot 1624 to specifically tailor the insurance contract to the appropriate jurisdiction.

In some examples, the chatbot 1624 determines what information is missing from the input statement to write the insurance contract, and then asks for that information (e.g., asks for additional information) in the response. For instance, in the example of FIG. 17, the chatbot 1624 determines that the term of years is missing from the input statement 1720, and asks for this information in the response 1725.

To further explain, in some examples, the chatbot 1624 will later write the insurance contract based upon a criteria specific to the type of insurance policy. For instance, if the type of insurance policy is a life insurance policy, the criteria may include an amount of life insurance coverage, a term of years of the life insurance policy, a premium amount, an age of a potentially life insured person, a health condition of the potentially life insured person, and/or a gender of the potentially life insured person. Some of the criteria may be derived directly or indirectly from the input statement. For instance, as in the example of FIG. 17, the input statement may include the age and gender of the potentially insurance person, so the chatbot 1624 may directly derive these criteria from the input statement. However, if the criteria is not included in the input statement, the criteria may still sometimes be indirectly derived from the input statement (e.g., the insurance premium amount calculated from the other input criteria).

Therefore, in some embodiments, based upon the type of insurance policy and/or the criteria, the chatbot 1624 may ask for additional information in the response of block 1920. Examples of the additional information include: information used to calculate insurance premiums, desired terms of the insurance policy, etc.

At block 1925, the one or more processors 1620 (e.g., via the chatbot 1624) may receive an answer to the response. For instance, in the example of FIG. 17, the chatbot 1624 receives the answer "25 years." From here, the exemplary method 1900 may proceed to block 1930. However, it should be appreciated that, instead of proceeding to block 1930, the chatbot 1624 may continue to converse with the person (e.g., the insurance customer 150, the insurance agent 160, the insurance underwriter 170, and or the administrator 190). For example, if the chatbot 1624 determines that there is still more information needed to write the insurance contract (e.g., missing criteria, etc.), the chatbot 1624 may ask (possibly again) for this information before proceeding to block 1930.

At block 1930, the one or more processors 1620 (e.g., via the chatbot 1624) access an estimation AI algorithm and/or retrieve insurance information. This may be done so that the one or more processors 1620 (e.g., via the chatbot 1624) will have the necessary information to build the insurance contract.

Examples of estimation AI algorithms are discussed elsewhere herein. However, briefly, in some examples, the estimation AI algorithm may estimate or determine one or more of the criteria for building the insurance contract. For example, the estimation AI algorithm may estimate and/or determine an insurance premium to be used in the insurance contract. For instance, in the example of FIG. 17, the chatbot 1624 may input the age, gender and health status of the potentially insured person, and the term of years into the estimation AI algorithm to estimate or determine the insurance premium. The insurance premium may then be included when building the insurance contract.

Regarding retrieving insurance information, the insurance information may be retrieved from any suitable source, such as the ground truth insurance database 140, email/text message database 142, insurance information aggregator database 144, government records database 146, police reports database 148, external database 180 (such as an insurance contracts database, an insurance claims database, etc.), a blockchain, and/or internal database 1618.

The insurance information may include any suitable information. Examples of the insurance information include insurance contracts information, insurance claims information, legal information (e.g., laws of a particular jurisdiction, such as a particular jurisdiction requiring flood insurance for a homeowners insurance policy, minimum amounts of auto insurance required by the particular jurisdiction, etc.), insurance profile information (e.g., information from a profile of an insurance customer, such as gender, age, height, weight, occupation, income, health status, health history, etc.), home values, police reports, government records, laws of a particular jurisdiction, etc.

In some embodiments, the retrieved insurance information may be used to determine one or more of the criteria. In one working example, the input statement is "please write a life insurance contract for Jane Doe insurance customer number XYZ." The chatbot 1624 may then retrieve (e.g., based upon Jane Doe's name and/or insurance customer number) Jane Doe's insurance profile (e.g., from the internal database 1618, the ground truth database 140, etc.). The information from Jane Doe's profile (e.g., her gender, age, health status, etc.) may then be used at least in part to determine the insurance premium for the life insurance contract. For example, the information from her profile may be input into the estimation AI algorithm to determine the life insurance premium; or the information from the profile may be input into a lookup table to determine the life insurance premium.

As this illustrates, in some embodiments, a lookup table may be used to determine at least one of the criteria. In some examples, there may be a different lookup table for each type of insurance policy.

In some examples, the lookup table may be used to determine an insurance premium (e.g., of any of the types of insurance policies).

In some examples, the chatbot 1624 determines the inputs to a particular lookup table (e.g., a lookup table for a particular type of insurance policy); and, if the input statement (e.g., of block 1905) does not indicate any of the inputs, the chatbot 1624 asks for these inputs (e.g., via the response at block 1920).

In some embodiments, the lookup tables are also specific to a particular jurisdiction (e.g., because of the jurisdiction's laws). For example, if a particular jurisdiction requires coverage for floods on a homeowners insurance policy, the lookup table may include an input for flood risk (e.g., possibly as a normalized value from 0 to 1 with 0 being a low risk, and 1 being a high risk).

In some examples, the location information of block 1910 is used to determine a jurisdiction of the insurance contract. For example, if the location information indicates that an insurance customer 150 is in a particular jurisdiction, the chatbot 1624 may query the ground truth insurance database 140 (or any other database) for laws of that jurisdiction. The retrieved laws may then be used as part of writing the insurance contract.

At block 1935, the one or more processors 1620 (e.g., via the chatbot 1624) may build the insurance contract. The insurance contract may be built by any suitable technique. For instance, the chatbot 1624 trained in accordance with the techniques described herein may build the contract. Additionally or alternatively, the contract may be built based upon the type of insurance policy, the estimation AI algorithm, the lookup table, the criteria, the location, the laws of a particular jurisdiction, etc.

As mentioned above, in some embodiments, the chatbot 1624 is trained using historical insurance contracts with placeholders. As such, in some embodiments, when building the contract, criteria may be inserted into the placeholder. For example, an insurance premium may be calculated as described above (e.g., via a lookup table and/or an estimation AI algorithm), and then inserted into the placeholder as part of building the contract.

The criteria may be any suitable criteria. In some embodiments, the criteria is specific to the type of insurance policy.

When the type of insurance policy is a homeowners insurance policy, examples of the criteria may include: a level of homeowners insurance coverage, a deductible amount, a premium amount, a value of a potentially insured home, a building material of the potentially insured home, a geographic area of the potentially insured home, a crime rate of the geographic area, a flood rate of the geographic area, and/or a natural disaster rate of the geographic area.

When the type of insurance policy is a renters insurance policy, examples of the criteria include: a level of renters insurance coverage, a deductible amount, a premium amount, a value of items in a potentially insured dwelling, a geographic area of the potentially insured dwelling, a crime rate of the geographic area, a flood rate of the geographic area, and/or a natural disaster rate of the geographic area.

When the type of insurance policy is an auto insurance policy, examples of the criteria include: a year of a potentially insured vehicle, a make of the potentially insured vehicle, a model of the potentially insured vehicle, a safety feature of the potentially insured vehicle, and/or a premium amount.

When the type of insurance policy is a life insurance policy, examples of the criteria include: an amount of life insurance coverage, a term of years of the life insurance policy, a premium amount, an age of a potentially life insured person, a health condition of the potentially life insured person, and/or a gender of the potentially life insured person.

When the type of insurance policy is the a disability insurance policy, examples of the criteria include: a disability insurance level, a premium amount, an age of a potentially disability insured person, a health condition of the potentially disability insured person, and/or a gender of the potentially disability insured person.

When the type of insurance policy is the umbrella insurance policy, examples of the criteria includes a level of umbrella coverage, a premium amount, and/or a deductible amount.

In some examples, the chatbot 1624 may determine the criteria from the input statement (e.g., insurance customer 150 includes the amount of life insurance coverage into the input statement). In other examples, the chatbot 1624 determines the criteria indirectly from the input statement (e.g., chatbot 1624 inputs data from the input statement to a lookup table and/or estimation AI algorithm).

The building the insurance contract (e.g., at block 1935) may thus include building the insurance contract based upon the criteria (e.g., with or without the use of a placeholder).

Furthermore, the insurance contract may be built at least in part based upon a jurisdiction of the insurance contract (e.g., as indicated by the location information at block 1910). In one working example, the chatbot 1624 receives the input statement "write me the cheapest possible auto insurance contract," and further receives location information indicating that the insurance customer 150 is in a particular jurisdiction. The chatbot then retrieves insurance information (e.g., by querying the ground truth insurance database 140 or any other database) including laws of that particular jurisdiction indicating a minimum amount of auto insurance coverage, and uses the indicated minimum amount to write the insurance contract.

At block 1940, the built insurance contract may be presented to a human (e.g., the insurance agent 160, the insurance underwriter 170, the administrator 190, etc.) for approval, denial, or modification of the insurance contract. For example, the insurance contract may be sent to any of the insurance agent computing device 165, the insurance underwriter computing device 175, and/or the administrator computing device 195.

If the human denies the contract, the chatbot 1624 may either (i) build a new insurance contract, or (ii) request more information. If the chatbot 1624 builds a new insurance contract, chatbot 1624 may build the new insurance contract according to a different randomness parameter (e.g., "temperature" value) than the initial insurance contract, thus advantageously generating a different insurance contract for the human to review.

If the chatbot 1624 requests more information, the request may be general "can you please provide more information so that I can write a better insurance contract." Or the request may be more specific, "can you please provide me with the age of the potentially insured person." or "can you please let me know the state that the potentially insured person resides in?"

At block 1950, the insurance contract is presented to the insurance customer 150. For example, the one or more processors 1620 (e.g., via the chatbot 1624) may cause the insurance contract to be presented on a display, such as a display device of the insurance customer computing device 155. Additionally or alternatively, a link 1730 may be presented for the insurance customer 150 to click on to access the insurance contract.

In addition, as described above, some embodiments use query vectors, key vectors, and/or value vectors. For example, the one or more processors 1620 (e.g., via the chatbot 1624) may generate tokens (e.g., by applying an NLP algorithm to text of the input statement; or by first applying an audio recognition program to the input statement, and then applying the NLP algorithm) from the input statement, with each token comprising a word or phrase. The one or more processors 1620 (e.g., via the chatbot 1624) may then build a query vector, a key vector, and/or a value vector for each token. The one or more processors 1620 (e.g., via the chatbot 1624) may then determine a similarity metric between a particular query vector and each key vector by taking respective dot products of the particular query vector and each key vector. The one or more processors 1620 (e.g., via the chatbot 1624) may then generate normalized weights by routing the respective dot products into a softmax function; and may then generate a final vector by multiplying the normalized weights by the value vector of the token, with the final vector representing an importance of the token. The one or more processors 1620 (e.g., via the chatbot 1624) may then base the determination(s) of any of: the type of insurance policy (e.g., block 1915), and/or the response (e.g., 1920) upon the final vector. Additionally or alternatively, one or more processors 1620 (e.g., via the chatbot 1624) may build the insurance contract based upon the final vector.

Moreover, although the preceding discussion refers to block of the exemplary method or implementation 1900 as being performed by the chatbot 1624 and/or the one or more processors 1620, it should be understood that any or all of the blocks may be alternatively or additionally performed by any other suitable component as well (e.g., the insurance customer computing device 155, the insurance agent computing device 165, the insurance underwriter computing device 175, the administrator computing device 195, etc.). Additional Exemplary Embodiments Using AI and/or ML to Build and/or Present an Insurance Contract In one aspect, a computer-implemented method for presenting an insurance contract created by an artificial intelligence (AI) chatbot to a potential insurance customer may be provided. The method may be implemented via one or more local or remote processors, sensors, transceivers, servers, memory units, mobile devices, augmented reality glasses or headsets, extended or virtual reality headsets, smart glasses or watches, smart contacts, voice bots, chatbots, ChatGPT bots, wearables, and/or other electronic or electrical components. In one example, the method may include, via one or more processors: (1) receiving, with an AI chatbot of the one or more processors, an input statement; (2) determining, with the AI chatbot, from the received input statement, a type of insurance policy, wherein the type of insurance policy comprises a homeowners insurance policy, a renters insurance policy, an auto insurance policy, a life insurance policy, a disability insurance policy, and/or an umbrella insurance policy; (3) building, with the AI chatbot, an insurance contract based upon the type of insurance policy; and/or (4) presenting, via the AI chatbot, the insurance contract to the potential insurance customer. The method may include additional, fewer, or alternate actions, including those discussed elsewhere herein.

In some embodiments, the method further comprises training, via the one or more processors, the AI chatbot based upon historical data comprising: (i) independent variables comprising historical input statements, and/or (ii) dependent variables comprising historical insurance contracts.

In some embodiments, the training further comprises routing, via the one or more processors, the historical data into the machine learning algorithm from a ground truth insurance database.

In some embodiments, the training further comprises a supervised, reward-based learning process comprising: for at least one historical input statement: (i) producing a plurality of suggested outputs comprising suggested insurance contracts, and/or (ii) sending the plurality of suggested outputs to an administrator computing device; receiving, from the administrator computing device, rankings of suggested outputs of the plurality of outputs; and/or feeding the rankings of the suggested outputs into the AI chatbot to thereby train the AI chatbot.

In some embodiments, the method further comprises: prior to presenting the insurance contract to the potential insurance customer, sending the insurance contract to an insurance underwriter computing device or an insurance agent computing device for approval, denial, or modification of the insurance contract.

In some embodiments, the method further comprises: receiving, with the AI chatbot, an indication of a location derived from a global positioning system (GPS) signal, and/or a cell phone signal; and/or wherein the building the insurance contract further comprises building the insurance contract based upon the indication of the location.

In some embodiments, the building the insurance contract based upon the indication of the location comprises building the insurance contract based upon a jurisdiction of the indication of the location; the jurisdiction comprises a state; and/or the insurance contract is built based upon at least one law of the state by retrieving state law information from a database of a government entity and/or a ground truth insurance database.

In some embodiments, the method further comprises: receiving, with the AI chatbot, an indication of a location derived from a global positioning system (GPS) signal, and/or a cell phone signal; prompting the potential insurance customer to confirm that the insurance contract is for an insurance policy corresponding to a jurisdiction of the location; and/or wherein the building the insurance contract further comprises building the insurance contract based upon at least one law of the jurisdiction.

In some embodiments, the method further comprises determining, with the AI chatbot, a criteria from the input statement; and/or wherein the building the insurance contract further comprises building the insurance contract further based upon the criteria.

In some embodiments: the type of insurance policy is the homeowners insurance policy, and the criteria comprises a level of homeowners insurance coverage, a deductible amount, a premium amount, a value of a potentially insured home, a building material of the potentially insured home, a geographic area of the potentially insured home, a crime rate of the geographic area, a flood rate of the geographic area, and/or a natural disaster rate of the geographic area; the type of insurance policy is the renters insurance policy, and the criteria comprises a level of renters insurance coverage, a deductible amount, a premium amount, a value of items in a potentially insured dwelling, a geographic area of the potentially insured dwelling, a crime rate of the geographic area, a flood rate of the geographic area, and/or a natural disaster rate of the geographic area; the type of insurance policy is the auto insurance policy, and the criteria comprises a year of a potentially insured vehicle, a make of the potentially insured vehicle, a model of the potentially insured vehicle, a safety feature of the potentially insured vehicle, and/or a premium amount; the type of insurance policy is the life insurance policy, and the criteria comprises an amount of life insurance coverage, a term of years of the life insurance policy, a premium amount, an age of a potentially life insured person, a health condition of the potentially life insured person, and/or a gender of the potentially life insured person; the type of insurance policy is the a disability insurance policy, and the criteria comprises a disability insurance level, a premium amount, an age of a potentially disability insured person, a health condition of the potentially disability insured person, and/or a gender of the potentially disability insured person; or the type of insurance policy is the umbrella insurance policy, and the criteria includes a level of umbrella coverage, a premium amount, and/or a deductible amount.

In some embodiments, the building the insurance contract further comprises: retrieving insurance information from: (i) an insurance contracts database, (ii) a ground truth insurance database, (iii) an insurance information aggregator database, (iv) an insurance claims database, (v) a government records database, (vi) a police reports database, and/or (vii) a blockchain; and/or building the insurance contract further based upon the retrieved insurance information.

In some embodiments, the AI chatbot includes: a generative AI chatbot, a deep learning algorithm, a generative pre-trained transformer (GPT), long-short-term-memory (LSTM), and/or a transformer neural network.

In some embodiments, the method further comprises, via the one or more processors: with the AI chatbot, applying a natural language processing (NLP) algorithm to text of the input statement to generate a plurality of tokens, each token comprising a word or phrase; building, with the AI chatbot, a query vector, a key vector, and/or a value vector for each token of the plurality of tokens; determining, with the AI chatbot, a similarity metric between a built query vector of a token of the plurality of tokens and each built key vector by taking respective dot products of the built query vector and each built key vector; generating, with the AI chatbot, normalized weights by routing the respective dot products into a softmax function; and/or generating, with the AI chatbot, a final vector by multiplying the normalized weights by the value vector of the token of the plurality of token, wherein the final vector represents an importance of the token of the plurality of tokens.

In some embodiments, the determining the type of insurance policy comprises determining the type of insurance policy based upon the final vector; and/or the insurance contract is built based upon the final vector.

In some embodiments, the input statement comprises text; the method further comprises, with the AI chatbot, applying a natural language processing (NLP) algorithm to the text to generate a word or phrase; and/or (i) the determining the type of insurance policy comprises determining the type of insurance policy based upon the word or phrase; and/or (ii)

the building the insurance contract comprises building the insurance contract based upon the word or phrase.

In some embodiments, the input statement comprises audio data; the method further comprises, with the AI chatbot, (i) applying an audio recognition program to the audio data to generate text, and (ii) applying a natural language processing (NLP) algorithm to the text to generate a word or phrase; and/or (i) the determining the type of insurance policy comprises determining the type of insurance policy based upon the word or phrase; and/or (ii) the building the insurance contract comprises building the insurance contract based upon the word or phrase.

In another aspect, a computer system for presenting an insurance contract created by an artificial intelligence (AI) chatbot to a potential insurance customer may be provided. The computer system may include one or more local or remote processors, sensors, transceivers, servers, memory units, mobile devices, augmented reality glasses or headsets, extended or virtual reality headsets, smart glasses or watches, smart contacts, chatbots, voice bots, ChatGPT bots, wearables, and/or other electronic or electrical components. In one example, the computer system may include one or more processors configured to: (1) receive, with an AI chatbot of the one or more processors, an input statement; (2) determine, with the AI chatbot, from the received input statement, a type of insurance policy, wherein the type of insurance policy comprises a homeowners insurance policy, a renters insurance policy, an auto insurance policy, a life insurance policy, a disability insurance policy, and/or an umbrella insurance policy; (3) build, with the AI chatbot, an insurance contract based upon the type of insurance policy; and/or present, via the AI chatbot, the insurance contract to the potential insurance customer. The computer system may include additional, less, or alternate functionality, including that discussed elsewhere herein.

In some embodiments, the computer system further comprises a display device, and/or wherein the one or more processors are further configured to perform the present of the insurance contract by displaying, on the display device, the answer.

In yet another aspect, a computer device for presenting an insurance contract created by an artificial intelligence (AI) chatbot to a potential insurance customer may be provided. The computer device may include one or more local or remote processors, sensors, transceivers, servers, memory units, mobile devices, augmented reality glasses or headsets, extended or virtual reality headsets, smart glasses or watches, wearables, and/or other electronic or electrical components. In one example, the computer device may include: one or more processors; and/or one or more memories. The one or more memories having stored thereon computer-executable instructions that, when executed by the one or more processors, may cause the computer device to: (1) receive, with an AI chatbot of the one or more processors, an input statement; (2) determine, with the AI chatbot, from the received input statement, a type of insurance policy, wherein the type of insurance policy comprises a homeowners insurance policy, a renters insurance policy, an auto insurance policy, a life insurance policy, a disability insurance policy, and/or an umbrella insurance policy; (3) build, with the AI chatbot, an insurance contract based upon the type of insurance policy; and/or (4) present, via the AI chatbot, the insurance contract to the potential insurance customer. The computer device may include additional, less, or alternate functionality, including that discussed elsewhere herein.

In some embodiments, the computer device further comprises a display device, and/or wherein the one or more memories having stored thereon computer executable instructions that, when executed by the one or more processors, further cause the computer device to perform the present of the insurance contract by displaying, on the display device, the insurance contract.

In yet another aspect, a computer-implemented method for presenting an insurance contract created by an artificial intelligence (AI) or machine learning (ML) chatbot to a potential insurance customer may be provided. The method may be implemented via one or more local or remote processors, sensors, transceivers, servers, memory units, mobile devices, augmented reality glasses or headsets, extended or virtual reality headsets, smart glasses or watches, smart contacts, wearables, voice bots, chatbots, ChatGPT bots, and/or other electronic or electrical components. In one example, the method may include, via one or more processors: (1) receiving, with an AI or ML chatbot of the one or more processors, an input statement; (2) determining, with the AI or ML chatbot, from the received input statement, a type of insurance policy, wherein the type of insurance policy comprises a homeowners insurance policy, a renters insurance policy, an auto insurance policy, a life insurance policy, a disability insurance policy, and/or an umbrella insurance policy; (3) building, with the AI or ML chatbot, an insurance contract based upon the type of insurance policy; and/or (4) presenting, via the AI or ML chatbot, the insurance contract to the potential insurance customer (such as via voice or text-based interaction, or via a display screen). The method may include additional, fewer, or alternate actions, including those discussed elsewhere herein.

Exemplary Technology

In some embodiments, the voice bots or chatbots discussed herein may be configured to utilize artificial intelligence and/or machine learning techniques. For instance, the voice bot or chatbot may be a ChatGPT chat bot. The voice bot or chatbot may employ supervised or unsupervised machine learning techniques, which may be followed or used in conjunction with reinforced or reinforcement learning techniques. The voice bot or chatbot may employ the techniques utilized for ChatGPT. The voice bot, chatbot, ChatGPT-based bot, ChatGPT bot, and/or other bots may generate audible or verbal output, text or textual output, visual or graphical output, output for use with speakers and/or display screens, and/or other types of output for user and/or other computer or bot consumption.

Noted above, in some embodiments, a chat bot or other computing device may be configured to implement machine learning, such that server computing device "learns" to analyze, organize, and/or process data without being explicitly programmed. Machine learning may be implemented through machine learning ("ML") methods and algorithms ("ML methods and algorithms"). In one exemplary embodiment, a machine learning module ("ML module") may be configured to implement ML methods and algorithms.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiment, a processing element may be trained by providing it with a large sample of data with known characteristics or features.

In another embodiment, a ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer system for building a ground truth insurance database via a generative pre-trained transformer with a multi-head self-attention mechanism, the computer system comprising one or more processors configured to:

receive potential insurance database information, wherein the potential insurance database information comprises: (i) insurance company application (app) information, (ii) anonymized insurance claim information, and/or (iii) police report information;

retrieve, from the ground truth insurance database, existing ground truth insurance information by querying the ground truth insurance database based upon the potential insurance database information;

determine if the potential insurance database information should be added to the ground truth insurance database by comparing the potential insurance database information to the existing ground truth insurance information by:

generating, via the generative pre-trained transformer: (i) a first summary document summarizing the potential insurance database information, and (ii) a second summary document summarizing the existing ground truth insurance information, wherein the generative pre-trained transformer is configured to generate the first summary document by, with the multi-head self-attention mechanism: (i) receiving, as an input, tokens included in the potential insurance database information, and (ii) performing, in parallel:

(a) generating a query vector, a key vector, and a value vector for each token, (b) generating normalized weights based upon similarities between query vectors and key vectors, and (c) generating final vectors based upon (i) the normalized weights and (ii) the value vectors;

generating the first summary document based upon the final vectors;

sending the first and second summary documents to an administrator computing device;

receiving, from the administrator computing device, a selection of the potential insurance database information or the existing ground truth insurance information; and determining to add the potential insurance database information to the ground truth insurance database if the selection indicates the potential insurance database information; and if the potential insurance database information should be added to the ground truth insurance database, add the potential insurance database information to the ground truth insurance database.

2. The computer system of claim 1, wherein the one or more processors are further configured to perform the comparing of the potential insurance database information to the existing ground truth insurance information further by:

generating, via an artificial intelligence (AI) and/or machine learning (ML) chatbot, a comparison document indicating at least one difference between the potential insurance database information and the existing ground truth insurance information;

sending the comparison document to the administrator computing device;

receiving, from the administrator computing device, a selection of the potential insurance database information or the existing ground truth insurance information; and determining to add the potential insurance database information to the ground truth insurance database if the selection indicates the potential insurance database information.

3. The computer system of claim 2, wherein the one or more processors are further configured to perform the generating the comparison document by, via the AI or ML chatbot:

generating a template including the existing ground truth insurance information; and highlighting at least a portion of the template to indicate the at least one difference between the potential insurance database information and the existing ground truth insurance information.

4. The computer system of claim 3, wherein:

the generated comparison further includes: (i) an indication of a source of the potential insurance database information, and/or (ii) an indication of a source of the existing ground truth insurance information; and the one or more processors are further configured to display, on a display of the administrator computing device, the generated comparison document including (i) the indication of the source of the potential insurance database information, and/or (ii) the indication of the source of the existing ground truth insurance information.

5. The computer system of claim 2, wherein the at least one difference comprises a difference in:

a date that an auto accident occurred;

a date that property damage occurred;

a date of a house fire;

vehicle information including vehicle: year, make, model, color, trim level, milage, and/or safety feature information;

an amount paid for an insurance claim;

an amount of a subrogation demand;

a name of a person;

a name of a police officer;

a weather condition on a date of an event of an insurance claim;

if an insurance customer has additional insurance;

insurance policy information of the insurance customer;

a beneficiary of an insurance policy;

a determination of fault in an auto accident;

a record of criminal liability;

items in a home on a date of damage to the home; and/or personal injury information.

6. The computer system of claim 1, wherein the one or more processors are further configured to perform the comparing of the potential insurance database information to the existing ground truth insurance information further by:

comparing a reliability rating of a source of the potential insurance database information to a reliability rating of a source of the existing ground truth insurance information; and/or comparing (i) a rank of the source of the potential insurance database information from a list of ranked sources to (ii) a rank of a source of the existing ground truth insurance information from the list of ranked sources.

7. The computer system of claim 1, wherein the one or more processors are further configured to perform the comparing of the potential insurance database information to the existing ground truth insurance information further by:

determining a type of information of the potential insurance database information;

determining a type of the existing ground truth insurance information;

determining a first reliability rating corresponding to the type of information of the potential database information and a source of the potential insurance database information;

determining a second reliability rating corresponding to the type of information of the existing ground truth insurance information and a source of the existing ground truth insurance information; and comparing the first reliability rating to the second reliability rating.

8. The computer system of claim 7, wherein the one or more processors are further configured to, if the type of information of the potential insurance database information and the type of the existing ground truth insurance information are both imagery information:

determine a higher reliability rating for a police report source than for information from:

a vehicle camera;

a traffic camera;

a camera attached to a building;

an infrastructure device;

a vehicle-to-infrastructure (V2I) device;

a vehicle-to-network (V2N) device;

a vehicle-to-vehicle (V2V) device;

a vehicle-to-pedestrian (V2P) device;

a vehicle-to-device (V2D) device;

a smartwatch;

a smartphone;

a smart home device;

a smart home camera;

an email server;

a weather device;

a government database;

a drone; and/or a newscast database.

9. The computer system of claim 1, wherein the one or more processors are further configured to:

if the potential insurance database information should be added to the ground truth insurance database, further remove the existing ground truth insurance information from the ground truth insurance database.

10. The computer system of claim 1, wherein:

the potential insurance database information comprises the insurance company app information, and the insurance company app information comprises a profile of an insurance customer; and the one or more processors are further configured to receive the insurance company app information from an insurance company app.

11. The computer system of claim 1, wherein:

the potential insurance database information comprises the anonymized insurance claim information, and the anonymized insurance claim information includes: a date of a first notice of loss, an amount of an insurance payout, and/or a type of insurance claim.

12. The computer system of claim 1, wherein:

the potential insurance database information comprises police report information; and the police report information includes a name of a police department of the police report, a name of a police officer of the police report, a type of vehicle involved in an accident, imagery information of the accident, a percentage of fault of the accident, imagery information of a home, an identity of a deceased person, and/or an identity of a person filing a police report.

13. The computer system of claim 1, wherein the potential insurance database information further comprises information from:

a vehicle camera;

a traffic camera;

a camera attached to a building;

an infrastructure device;

a vehicle-to-infrastructure (V2I) device;

a vehicle-to-network (V2N) device;

a vehicle-to-vehicle (V2V) device;

81 a vehicle-to-pedestrian (V2P) device;
a vehicle-to-device (V2D) device;
a smartwatch;
a smartphone;
a smart home device;
a smart home camera;
an email server;
a weather device;
a government database;
a drone; and/or
a newscast database.

14. The computer system of claim 1, wherein the tokens comprise respective text strings from the potential insurance database information.

15. A computer-implemented method for building a ground truth insurance database via a generative pre-trained transformer with a multi-head self-attention mechanism, the method comprising:

receiving, via one or more processors, potential insurance database information, wherein the potential insurance database information comprises: (i) insurance company application (app) information, (ii) anonymized insurance claim information, and/or (iii) police report information;

retrieving, via the one or more processors, from the ground truth insurance database, existing ground truth insurance information by querying the ground truth insurance database based upon the potential insurance database information;

determining, via the one or more processors, that the potential insurance database information should be added to the ground truth insurance database by comparing the potential insurance database information to the existing ground truth insurance information by:

generating, via the generative pre-trained transformer: (i) a first summary document summarizing the potential insurance database information, and (ii) a second summary document summarizing the existing ground truth insurance information, wherein the generative pre-trained transformer is configured to generate the first summary document by, with the multi-head self-attention mechanism: (i) receiving, as an input, tokens included in the potential insurance database information, and (ii) performing, in parallel:

(a) generating a query vector, a key vector, and a value vector for each token, (b) generating normalized weights based upon similarities between query vectors and key vectors, and (c) generating final vectors based upon (i) the normalized weights and (ii) the value vectors;

generating the first summary document based upon the final vectors;

sending the first and second summary documents to an administrator computing device;

receiving, from the administrator computing device, a selection of the potential insurance database information or the existing ground truth insurance information; and determining to add the potential insurance database information to the ground truth insurance database if the selection indicates the potential insurance database information; and in response to the determination that the potential insurance database information should be added to the ground truth insurance database, adding, via the one or more processors, the potential insurance database information to the ground truth insurance database.

16. The computer-implemented method of claim 15, wherein the potential insurance database information comprises the police report information, and the method further comprises, via the one or more processors:

with an artificial intelligence (AI) or machine learning (ML) chatbot, requesting the police report information from a police station.

17. The computer-implemented method of claim 15, wherein the method further comprises, via the one or more processors:

with an artificial intelligence (AI) or machine learning (ML) chatbot, requesting information from:

(i) a government entity storing death records and/or vehicle registration records, (ii) an entity storing data from a vehicle-to-infrastructure (V2I) device, a vehicle-to-network (V2N) device, a vehicle-to-vehicle (V2V) device, a vehicle-to-pedestrian (V2P) device, and/or a vehicle-to-device (V2D) device, and/or (iii) a news source; and adding the requested information to the potential insurance database information.

18. A computer device for building a ground truth insurance database via a generative pre-trained transformer with a multi-head self-attention mechanism, the computer device comprising:

one or more processors; and one or more memories;

the one or more memories having stored thereon computer-executable instructions that, when executed by the one or more processors, cause the computer device to:

receive potential insurance database information, wherein the potential insurance database information comprises: (i) insurance company application (app) information, (ii) anonymized insurance claim information, and/or (iii) police report information;

retrieve, from the ground truth insurance database, existing ground truth insurance information by querying the ground truth insurance database based upon the potential insurance database information;

determine if the potential insurance database information should be added to the ground truth insurance database by comparing the potential insurance database information to the existing ground truth insurance information by:

generating, via the generative pre-trained transformer: (i) a first summary document summarizing the potential insurance database information, and (ii) a second summary document summarizing the existing ground truth insurance information, wherein the generative pre-trained transformer is configured to generate the first summary document by, with the multi-head self-attention mechanism: (i) receiving, as an input, tokens included in the potential insurance database information, and (ii) performing, in parallel:

(a) generating a query vector, a key vector, and a value vector for each token, (b) generating normalized weights based upon similarities between query vectors and key vectors, and (c) generating final vectors based upon (i) the normalized weights and (ii) the value vectors;

generating the first summary document based upon the final vectors;

sending the first and second summary documents to an administrator computing device;

receiving, from the administrator computing device, a selection of the potential insurance database information or the existing ground truth insurance information; and determining to add the potential insurance database information to the ground truth insurance database if the selection indicates the potential insurance database information; and if the potential insurance database information should be added to the ground truth insurance database, add the potential insurance database information to the ground truth insurance database.

19. The computer device of claim 18, wherein the potential insurance database information comprises the police report information, and wherein the one or more memories having stored thereon computer executable instructions that, when executed by the one or more processors, further cause the computer device to:

with an artificial intelligence (AI) chatbot, prepare a draft communication to request the police report information from a police department;

present the draft communication to an administrator on the administrator computing device;

receive, from the administrator computing device, a final communication, wherein the final communication comprises an edited version of the draft communication edited by the administrator; and send the final communication to the police department.

20. The computer device of claim 19, wherein the draft communication and final communication each comprise an email and/or text message.

21. The computer device of claim 18, wherein the one or more memories having stored thereon computer executable instructions that, when executed by the one or more processors, further cause the computer device to perform the querying of the ground truth insurance database based upon an insurance claim identifier, wherein the insurance claim identifier comprises an insurance claim number.

22. The computer device of claim 18, wherein the one or more memories having stored thereon computer executable instructions that, when executed by the one or more processors, further cause the computer device to:

use a natural language processing algorithm (NLP) to determine a word or phrase from the potential insurance information; and perform the querying of the ground truth insurance database by querying the ground truth insurance database based upon the word or phrase.

23. The computer device of claim 19, wherein the AI chatbot comprises: a generative AI chatbot, and/or a deep learning algorithm.

* * * * *